US007224682B2

(12) United States Patent
Kuroda et al.

(10) Patent No.: US 7,224,682 B2
(45) Date of Patent: May 29, 2007

(54) TERMINAL APPARATUS FOR ENABLING A PLURALITY OF DIFFERENT COMMUNICATION SYSTEMS TO COEXIST

(75) Inventors: Go Kuroda, Izumisano (JP); Akio Kurobe, Tondabayashi (JP); Hiroshi Harada, Newport (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 151 days.

(21) Appl. No.: 11/063,872

(22) Filed: Feb. 23, 2005

(65) Prior Publication Data

US 2005/0185629 A1 Aug. 25, 2005

(30) Foreign Application Priority Data

Feb. 24, 2004 (JP) ............... 2004-048374

(51) Int. Cl.
*H04B 7/212* (2006.01)
(52) U.S. Cl. .................. 370/347; 370/463; 370/474
(58) Field of Classification Search ............... None
See application file for complete search history.

(56) References Cited

U.S. PATENT DOCUMENTS

| | | | |
|---|---|---|---|
| 6,854,059 B2* | 2/2005 | Gardner ............ | 713/171 |
| 2002/0067721 A1 | 6/2002 | Kye | |
| 2002/0136233 A1 | 9/2002 | Chen et al. | |
| 2002/0163933 A1 | 11/2002 | Benveniste | |
| 2004/0174851 A1* | 9/2004 | Zalitzky et al. ....... | 370/338 |
| 2005/0180453 A1* | 8/2005 | Gaskill ............. | 370/465 |
| 2005/0193116 A1* | 9/2005 | Ayyagari et al. ....... | 709/226 |

FOREIGN PATENT DOCUMENTS

WO  WO 03/063459  * 7/2003

OTHER PUBLICATIONS

Lee et al, HomePlug 1.0 Performance Communication LANs-Protocol Description and Performance Results, International Journal of Communication Systems, pp. 1-25, 2000.*
Ayyagari, High Speed Home Networking for AV and IP Applications using existing Powerline Infrastructure, Sharp Laboratories, pp. 65-72, 2004.*

(Continued)

*Primary Examiner*—Frank Duong
(74) *Attorney, Agent, or Firm*—Wenderoth, Lind & Ponack, L.L.P.

(57) ABSTRACT

The present invention provides a terminal apparatus connectable to a communication network capable of comprising a plurality of different communication systems. The terminal apparatus comprises a coexistence header generation section of generating at least a portion of a head portion of a frame used in a communication system to be suppressed from frame transmission of the plurality of communication systems, as a coexistence header, a coexistence header transmission section of transmitting the coexistence header generated by the coexistence header generation section in a manner which enables a terminal apparatus belonging to the communication system to be suppressed to receive the coexistence header, a coexistence header transmission timing determination section of determining a timing of transmitting the coexistence header, and a communication control section of causing the coexistence header transmission section to transmit the coexistence header generated by the coexistence header generation section at the timing determined by the coexistence header transmission timing determination section.

22 Claims, 36 Drawing Sheets

OTHER PUBLICATIONS

Tetsu Sakata, "Interface", Feb. 1, 2003, p. 43, CQ Publishing, (NTT Access Network Service Systems Laboratories), with English translation.

Yu-Ju Lin et al., "A Comparative Performance Study of Wireless and Power Line Networks", pp. 54-63, IEEE Communications Magazine, Apr. 2003.

* cited by examiner

FIG. 4

| FIELD | BIT WIDTH | DEFINITION |
|---|---|---|
| ⋮ | ⋮ | ⋮ |
| CoexistHeaderNum | 8 | THE NUMBER OF CoexistHeaderTime FIELDS |
| CoexistHeaderTime1 | 16 | TIME TO TRANSMIT COEXISTENCE HEADER (FIRST TIME) |
| ⋮ | ⋮ | ⋮ |
| CoexistHeaderTimeN | 16 | TIME TO TRANSMIT COEXISTENCE HEADER (N-TH TIME) |
| ⋮ | ⋮ | |

FIG. 5

| |
|---|
| ⋮ |
| CoexistHeaderNum = 3 |
| CoexistHeaderTime1 = t21 |
| CoexistHeaderTime2 = t22 |
| CoexistHeaderTime3 = t23 |
| ⋮ |

FIG. 15

| FIELD | BIT WIDTH | DEFINITION |
|---|---|---|
| ⋮ | ⋮ | ⋮ |
| NAV | 16 | TIME FOR WHICH COMMUNICATION MEDIUM IS OCCUPIED BY THE FRAME |
| ⋮ | ⋮ | ⋮ |

FIG. 16

| COEXISTENCE HEADER NUMBER | NAV VALUE |
|---|---|
| 611 | t61 |
| 612 | t62 |
| 613 | t63 |

TERMINAL APPARATUS FOR ENABLING A PLURALITY OF DIFFERENT COMMUNICATION SYSTEMS TO COEXIST

BACKGROUND OF THE INVENTION

1. Field of the Invention

The present invention relates to a terminal apparatus for transmitting/receiving data on a communication network. More particularly, the present invention relates to a terminal apparatus for transmitting/receiving data on a communication network having a plurality of communication systems different from one another (hereinafter also simply referred to as "different communication systems").

2. Description of the Background Art

Conventionally, wireless LAN systems and power line communication systems have been commercialized as communication systems in which data is transmitted in packets among a plurality of terminals. For wireless LAN systems, there are IEEE802.11, IEEE802.11b and IEEE802.11g standards which utilize a 2.4-GHz band. These wireless LAN systems adopt different modulation techniques to improve communication speed every time the specification is extended. Further, the wireless LAN systems are standardized in a manner which enables the different standard systems to coexist and be connected to one another.

In IEEE802.11, an autonomous distributed access control is achieved by performing an access control called DCF (Distributed Coordination Function) using a CSMA/CA (Carrier Sense Multiple Access with Collision Avoidance) scheme. In the CSMA/CA scheme, a terminal which tries to transmit a signal checks (carrier sense) the state of use of a wireless channel before transmission of the signal in order to avoid collision with a signal transmitted by another terminal. When the wireless channel is not used (idle), a signal is immediately transmitted. When the wireless channel is used (busy), transmission is postponed until the wireless channel is idle.

To determine whether or not the wireless channel is idle, IEEE802.11 defines an IFS (Inter Frame Space). When no signal is detected over the defined IFS time or more, a terminal which tries to transmit a signal determines that the wireless channel is idle. The IFS is defined to have a fixed length. A plurality of lengths of IFS may be defined. In this case, the priorities of terminals or frames are controlled by assigning each terminal an IFS having a length corresponding to the priority thereof.

FIG. 36 is a diagram for explaining a control of the priority using IFS. IFSs (SIFS, PIFS, DIFS) having different lengths are assigned to frames, depending on the priority. The priorities of the frames are increased in order of SIFS, PIFS and DIFS. For example, it takes a short time for a terminal which wants to transmit a frame assigned with the short IFS to determine whether or not the wireless channel is idle. Therefore, a frame assigned with the short IFS is transmitted earlier than a frame assigned with a low priority. Therefore, a frame having a high priority has more opportunities of transmission than a frame having a low priority.

When the wireless channel is busy, a terminal waits until the wireless channel is idle. When the wireless channel is idle, a backoff algorithm is executed so as to avoid subsequent collision. The backoff algorithm is used to avoid the collision of packets which is caused by simultaneous transmission by a plurality of terminals. The probability of collision is highest at a time immediately after a certain terminal completes transmission and a wireless channel is then transitioned from the busy state to the idle state. This is because terminals ready for transmission which recognizes that the wireless channel comes to be the idle state start transmitting a signal simultaneously.

FIG. 37 is a diagram for explaining an access control method using a conventional CSMA/CA scheme. Hereinafter, an access control method using a CSMA/CA scheme, to which the backoff algorithm is applied, will be described with reference to FIG. 37.

An access point AP and stations STA1, STA2 and STA3 always perform carrier sense and monitor the state of use of a wireless channel. Here, it is assumed that DIFS (Distributed IFS) is used as IFS. When the wireless channel is in the busy state, each station generates a random number within the range of zero to CW (Contention Window: a range in which random numbers from zero to uniform distribution are generated in the backoff algorithm). Each station determines a backoff time based on the random number thus generated. Thereafter, each station decreases the backoff time during a time when the wireless channel is idle. At a time when the decreased backoff time becomes zero, packet transmission is started. In FIG. 37, the backoff time of the access point AP is the first to become zero, and therefore, the access point AP transmits a packet. When another terminal starts transmission before the remaining time becomes zero, the other stations (in FIG. 37, the stations STA1, STA2 and STA3) become ready for transmission again. The remaining backoff time is decreased again from a time when the wireless channel becomes idle. In FIG. 37, by decreasing the remaining backoff time again, the backoff time of the station STA2 is the first to become zero, and therefore, the station STA2 transmits a packet. Note that a time until the wireless channel becomes idle is stored as an NAV (Network Allocation Vector) value in a header of a transmission packet. A terminal ready for transmission can know the next idle time by waiting for a time matching the NAV value stored in the transmitted packet. The NAV value varies depending on the length of data constituting a packet or a modulation rate used in transmission.

The backoff algorithm of IEEE802.11 is called a "binary exponential backoff algorithm". The range CW of a random number generated is given by parameters, i.e., a minimum value CWmin and a maximum value CWmax. In the initial random number generation, the value of CW is set to be CWmin. The CW value is doubled as the number of retransmissions is increased by one. After the CW value reaches CWmax, CW becomes a constant value. Thus, the CW value is increased with an increase in the number of retransmissions. In other words, as traffic increases and becomes denser, the number of variations of backoff time is increased. Therefore, data collision is more likely avoided.

When normally receiving a packet, a station returns ACK (Acknowledgement) to the sender after the SIFS (Short IFS) interval from the time of completion of the reception. SIFS is the shortest IFS. Therefore, the ACK signal is transmitted with the highest priority. After transmitting a packet, if an ACK signal is not returned within a predetermined time from the time of completion of data transmission, a terminal determines that the transmission has failed and retransmits the packet.

A physical layer of IEEE802.11 is divided into a PMD (Physical Medium Dependent) sub-layer and a PLCP (Physical Layer Convergence Protocol) sub-layer. The PLCP sub-layer is positioned between the PMD sub-layer and an MAC layer, and absorbs the difference among three modulation/demodulation schemes defined in the PMD sub-layer to unify the interface between the MAC layer and the physical layer. The IEEE802.11b standard is the conventional IEEE802.11 standard with an extended DS-SS scheme and is downwardly compatible with IEEE802.11. In the IEEE802.11b standard, 5.5 Mbps and 11 Mbps are defined as transmission rates in addition to 1M bps and 2M bps of the DS-SS scheme. The DS-SS scheme uses an 11-bit Barker code for spread spectrum modulation. In the IEEE802.11b standard, the transmission rate is increased by adding the CCK scheme which uses a complementary code. IEEE802.11b defines four transmission rates. In IEEE802.11b, the transmission rate of a preamble portion and a header portion is fixed to 1 Mbps. The header region stores information about a transmission rate used for a data portion. Thereby, data can be correctly demodulated by a receiver.

FIG. 38 is a diagram showing a packet structure of the conventional IEEE802.11b. In FIG. 38, "SYNC" is a field for indicating a synchronization signal and "SFD" is a field for indicating the start of a frame and the head of a physical layer, which is an abbreviation of "Start Frame Delimiter". These fields constitute a PLCP preamble portion.

"SIGNAL" is a field for indicating the transmission rate of the data portion. "SERVICE" is a field (CCK, PBCC) for identifying a high-speed modulation scheme. "LENGTH" is a field for indicating a time required to transmit data (unit: mS). "CRC" is a field for indicating a cyclic redundancy check code. These fields constitute a PLCP header portion.

The PLCP preamble portion and the PLCP header portion constitute a long preamble.

"MPDU" is a MAC protocol data unit and is a field for storing data. The data is modulated by any of 1-Mbps DBPSK (spread with a Barker code), 2-Mbps DBPSK (spread with a Barker code), and 5.5- or 11-Mbps CCK modulation.

"PPDU" is a PHY protocol data unit.

FIG. 39 is a diagram showing packet structures of IEEE802.11, 802.11b and 802.11g. The heads of the packet structures each have a 1-Mbps preamble which is DS-modulated. Since the preamble is DS-modulated, a terminal can recognize it no matter which standard is employed in the terminal. Data is subjected to DS modulation, CCK modulation or OFDM modulation, depending on a standard to which a destination terminal belongs. Thereby, the coexistence and compatibility of these standards are held.

As a power line communication system, HomePlug 1.0 has been developed and commercialized by HomePlug Alliance, US (see Yu-Ju Lin et al., A Comparative Performance Study of Wireless and Power Line Networks, IEEE Communication Magazine, April 2003, p54–p63). The power line communication system achieves 14-Mbps communication using a power line in a room.

FIG. 40 is a diagram showing a frame structure and a protocol of HomePlug 1.0. In FIG. 40, as with "DIFS" of IEEE802.11, "CIFS" is an inter-frame spacing. "Priority Resolution0" and "Priority Resolution1" are priority times. A terminal which transmits a symbol for a priority time has a higher priority than that of a terminal which does not transmit a symbol during the priority time. The two priority times can be used to indicate four priorities. Terminals having the highest priority can be transitioned to the subsequent "Contention" phase. In the "Contention" phase, an algorithm similar to the backoff algorithm of IEEE802.11 is executed to avoid collision. A terminal which has started earliest in the "Contention" period transmits the subsequent data packet. "Data" has "preamble" and "frame control" at a head thereof. These have functions similar to those of the PLCP preamble and PLCP header of IEEE802.11. "Frame body" has a variable length which varies between 313.5 µSec to 1489.5 µSec, depending on the data length and the modulation rate. A busy time substantially corresponding to the length of the "frame body" is stored in NAV information within the "frame control". A terminal which has received the "frame control" waits for the busy time indicated by the NAV before starting measuring CIFS for the next transmission.

As described above, the conventional IEEE802.11, IEEE802.11b and IEEE802.11g use the DS-SS scheme common to the preamble portion and the header portion, and apply a high-efficiency modulation scheme to data, thereby holding the compatibility and the coexistence. However, in this method, the growth rate of the throughput of data transmission in an upper layer is made very small in spite of the increased speed of the physical layer. This is because, as the speed of the physical layer is increased, a time occupied by the preamble portion and the header portion is relatively elongated.

FIG. 41 is a diagram for explaining that the time occupied by the preamble portion and the header portion is relatively elongated. As shown in FIG. 41, the preamble is DS-modulated in all of IEEE802.11, IEEE802.11b and IEEE802.11g, and therefore, a time required to transmit the preamble is the same. On the other hand, data is DS-modulated in IEEE802.11, CCK-modulated in IEEE802.11b, and OFDM-modulated in IEEE802.1g. Therefore, as the standard is extended, a time occupied by the preamble portion and the header portion is relatively elongated.

According to a quantitative calculation, in IEEE802.11b, the PHY speed is 11 Mbps, while the throughput of an upper layer is about 5 Mbps. However, even if the PHY speed is increased by a factor of about 5 to 54 Mbps, the throughput of the upper layer is increased by a factor of 2 to about 10 Mbps (Tetsu Sakata (NTT Access Network Service Systems Laboratories), Interface, P. 43, FIG. 32, Feb. 1, 2003, CQ Publishing). Particularly in VoIP (Voice Over IP: voice communication utilized in IP telephone or the like), a small amount of data (32 kbps, etc.) is regularly transmitted, so that the proportion of the header in each packet is further increased, resulting in very poor efficiency.

In the high-speed communication system of IEEE802.11b or later, DS-SS scheme packets of IEEE802.11 need to be received. In order to coexist with a conventional scheme, a conventional scheme transmission/reception circuit needs to be mounted. Therefore, the circuit area of LSI is increased, leading to an increase in cost. Particularly, the reception circuit needs to comprise components, such as an AGC circuit, an AD conversion circuit, a demodulation circuit, an error correction circuit and the like, which have a large influence on cost.

SUMMARY OF THE INVENTION

Thus, an object of the present invention is to provide a terminal apparatus capable of causing a plurality of different communication systems to coexist without a reduction in throughput of an upper layer. Another object of the present invention is to provide a terminal apparatus capable of causing a plurality of different communication systems to coexist without comprising a reception circuit having a conventional scheme.

The present invention has the following features to attain the objects mentioned above. The present invention provides a terminal apparatus connectable to a communication network capable of comprising a plurality of different communication systems. The terminal apparatus comprises a coexistence header generation section of generating at least a portion of a head portion of a frame used in a communication system to be suppressed from frame transmission of the plurality of communication systems, as a coexistence header, a coexistence header transmission section of transmitting the coexistence header generated by the coexistence header generation section in a manner which enables a terminal apparatus belonging to the communication system to be suppressed to receive the coexistence header, a coexistence header transmission timing determination section of determining a timing of transmitting the coexistence header, and a communication control section of causing the coexistence header transmission section to transmit the coexistence header generated by the coexistence header generation section at the timing determined by the coexistence header transmission timing determination section.

According to the present invention, the communication system to be suppressed can be caused to be in the busy state by transmitting the coexistence header. As a result, a terminal apparatus in a communication system to which the terminal apparatus of the present invention belongs can occupy a communication medium without transmission of a low-speed header or the like of the communication system to be suppressed every frame transmission, as is different from conventional techniques. As a result, a temporal portion of a communication medium occupied by the slow-speed header of the communication system to be suppressed is reduced, thereby making it possible to cause a plurality of different communication systems to coexist without a reduction in throughput of an upper layer.

Preferably, of the plurality of communication systems, in a communication system to which the terminal apparatus belongs, an access to a communication medium on the communication network may be controlled in accordance with a control frame. Information about the timing of transmitting the coexistence header may be described in the control frame. The coexistence header transmission timing determination section may determine the timing of transmitting the coexistence header in accordance with the information described in the control frame.

According to this, the timing of transmitting the coexistence header is described in the control frame. Therefore, the controlled terminal which controls an access to a communication medium in accordance with the control frame can recognize a time in which the communication system to be suppressed is suppressed from frame transmission without having a function of receiving the coexistence header. Therefore, it is possible to cause a plurality of different communication systems to coexist without comprising a reception circuit having a conventional scheme.

Preferably, of the plurality of communication systems, in a communication system to which the terminal apparatus belongs, an access to a communication medium on the communication network may be controlled in accordance with a control frame. The coexistence header transmission timing determination section may determine the timing of transmitting the coexistence header in a period in which the control frame is transmitted, in accordance with a predetermined rule.

In a period in which the control frame is transmitted, the timing of transmitting the coexistence header is previously defined. Therefore, the controlled terminal which controls an access to a communication medium in accordance with the control frame can recognize a time in which the communication system to be suppressed is suppressed from frame transmission without comprising a function of receiving the coexistence header. Therefore, it is possible to cause a plurality of different communication systems to coexist without comprising a reception circuit having a conventional scheme. Further, since the coexistence header is transmitted in accordance with the predetermined rule, the timing of transmitting the coexistence header can be recognized at the previous timing, thereby providing a terminal apparatus robust to error.

Preferably, the coexistence header generation section may cause the coexistence header to include network allocation vector information indicating a time for which the communication system to be suppressed is used.

Thereby, the communication system to be suppressed can be suppressed from frame transmission for an intended time.

Preferably, the coexistence header transmission timing determination section may determine that a timing of transmitting a next coexistence header arrives within a network use time, based on the network allocation vector information included in the coexistence header.

Thereby, the communication system to be suppressed can be suppressed from frame transmission continuously.

Preferably, the network allocation vector information may be a maximum value which can be designated.

Thereby, the communication system to be suppressed can be suppressed from frame transmission at a maximum time, thereby making it possible to reduce the number of transmissions of the coexistence header. Therefore, a proportion of frame transmission occupied by the coexistence header can be minimized. Particularly, when a short packet, such as a VoIP, is transmitted, the effect of the present invention is significant.

Preferably, the terminal apparatus may further comprises a frame transmission section of framing data to be transmitted and transmitting the frame data. The communication control section may control frame transmission by the frame transmission section, and when the timing of transmitting the coexistence header determined by the coexistence header transmission timing determination section arrives during the frame transmission by the frame transmission section, may cause the frame transmission section to suspend the frame transmission and causes the coexistence header transmission section to transmit the coexistence header, and when the transmission of the coexistence header is completed, may cause the frame transmission section to resume the frame transmission.

Thereby, a large-size frame can be transmitted without an influence of the timing of transmitting the coexistence header. As a result, the number of transmissions of the coexistence header can be reduced, thereby improving transfer efficiency.

Preferably, the communication control section may give the communication system to be suppressed an opportunity of frame transmission by causing the coexistence header transmission section not to transmit the coexistence header.

Thereby, frame transmission can be executed in the communication system to be suppressed. For example, even if the time for which the communication system to be suppressed is suppressed due to the coexistence header is expired, frame transmission can be executed in the communication system to be suppressed by not transmitting the next coexistence header.

Preferably, the communication control section may cause the coexistence header transmission section to transmit the coexistence header if, after the communication system to be suppressed is given an opportunity of frame transmission, it is desired to suppress the communication system from frame transmission again.

Thereby, the communication system to be suppressed can be suppressed from frame transmission again.

Preferably, the terminal apparatus may further comprise a frame transmission section of transmitting a frame to another terminal apparatus on a communication system to which the terminal apparatus belongs, in accordance with an instruction of the communication control section. The communication control section may cause the frame transmission section to transmit an informing frame containing information about a time for which frame transmission is suppressed in the communication system to be suppressed.

Thereby, the controlled terminal can recognize the time for which frame transmission is suppressed in the communication system to be suppressed without having a function of detecting the header or the like of the communication system to be suppressed. Therefore, during the suppression, a process required for frame transmission/reception can be executed.

Preferably, in the communication system to be suppressed, a priority may be set in a frame to be transmitted/received. The coexistence header generation section may set in the coexistence header a highest priority in the communication system to be suppressed.

Thereby, it can be expected that frame transmission is reliably suppressed with a higher probability in the communication system to be suppressed.

Preferably, the terminal apparatus may further comprises an other system detection section of detecting the presence of another communication system, and an operation mode switch section of switching the terminal apparatus to a coexistence operation mode in which, when the other system detection section detects the other communication system, a terminal apparatus belonging to the communication system to be suppressed is suppressed from frame transmission, where the other communication system is the communication system to be suppressed, and switching the terminal apparatus to an independent operation mode in which, when the other system detection section detects no other communication system, the other terminal apparatus is not suppressed from frame transmission. The communication control section executes transmission of the coexistence header only in the coexistence operation mode.

Thereby, only when there is another communication system, the coexistence header is transmitted. Therefore, when there are no other communication systems, transfer efficiency is improved.

Preferably, the terminal apparatus may further comprise a coexistence header storage section of storing a definite number of coexistence headers. The coexistence header generation section may generate the coexistence header with reference to the coexistence header storage section.

Thereby, a structure for transmitting the coexistence header can be simplified, whereby a reduction in circuit scale of the terminal apparatus can be expected.

For example, the coexistence header storage section stores only one coexistence header.

Thereby, the contents of the coexistence header can be fixed, thereby making it possible to reduce the memory amount and simplify the structure.

Preferably, the coexistence header may be a preamble and/or a header of the frame in the communication system to be suppressed.

Further, the present invention provides a controlled terminal apparatus capable of communicating with a control terminal connectable to a communication network capable of comprising a plurality of different communication systems, wherein at least a portion of a head portion of a frame used in a communication system to be suppressed from frame transmission of the plurality of communication systems is transmitted as a coexistence header. The controlled terminal apparatus comprises a frame transmission section of framing data to be transmitted and transmitting the frame data, and a communication control section of controlling the frame transmission by the frame transmission section. The communication control section causes the frame transmission section to suspend the frame transmission when a timing of the control terminal transmitting the coexistence header arrives during the frame transmission by the frame transmission section, and when transmission of the coexistence header is completed, causes the frame transmission section to resume the frame transmission.

Thereby, the controlled terminal can recognize the time for which frame transmission is suppressed without having a function of receiving a header or the like used in the communication system to be suppressed. Therefore, the controlled terminal can execute a frame transmission/reception process in a communication system to which the controlled terminal belongs.

Further, the present invention provides a communication system in a communication network capable of comprising a plurality of different communication systems. The communication system comprises a control terminal of generating at least a portion of a head portion of a frame used in a communication system to be suppressed from frame transmission of the plurality of communication systems as a coexistence header, and transmitting the generated coexistence header in a manner which enables a terminal apparatus belonging to the communication system to be suppressed to receive the coexistence header, and a controlled terminal of previously recognizing a timing of the control terminal transmitting the coexistence header, determining whether or not the coexistence header is transmitted from the control terminal in accordance with a content of the recognition, and after the coexistence header is transmitted from the control terminal, executing an access to a communication medium on the communication network.

Thereby, only a control terminal is required as a terminal apparatus which can transmit a header or the like of the communication system to be suppressed. A controlled terminal does not have to be able to transmit the header or the like of the communication system to be suppressed. Therefore, it is possible to reduce cost in terminals required for a communication system.

Preferably, the controlled terminal may previously recognize the timing of transmitting the coexistence header based on information described in a control frame.

Preferably, the controlled terminal may previously recognize the timing of transmitting the coexistence header based on a predetermined rule.

Further, the present invention provides a method for causing a plurality of different communication systems to coexist on a common communication medium. The method comprises generating at least a portion of a head portion of a frame used in a communication system to be suppressed from frame transmission of the plurality of communication systems as a coexistence header, and transmitting the generated coexistence header in a manner which enables a terminal apparatus belonging to the communication system to be suppressed to receive the coexistence header.

Further, the present invention provides an integrated circuit for use in a terminal apparatus connectable to a communication network capable of comprising a plurality of different communication systems. The integrated circuit comprises a coexistence header generation section of generating at least a portion of a head portion of a frame used in a communication system to be suppressed from frame transmission of the plurality of communication systems, as a coexistence header, a coexistence header transmission section of transmitting the coexistence header generated by the coexistence header generation section in a manner which enables a terminal apparatus belonging to the communication system to be suppressed to receive the coexistence header, a coexistence header transmission timing determination section of determining a timing of transmitting the coexistence header, and a communication control section of causing the coexistence header transmission section to transmit the coexistence header generated by the coexistence header generation section at the timing determined by the coexistence header transmission timing determination section.

As described above, according to the present invention, when a plurality of communication systems using modulation schemes or the like without compatibility are present on a communication medium, transmission of a terminal apparatus belonging to another communication network can be suppressed or controlled while minimizing an overhead.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an exemplary format of a beacon transmitted by the terminal apparatus 111;

FIG. 5 is a diagram showing an exemplary beacon which the terminal apparatus 111 actually transmits by utilizing the format of FIG. 4;

FIG. 15 is a diagram showing a data structure of a header of the communication system B, and particularly, a definition of a field relating to NAV information included in the header;

FIG. 16 is a diagram showing an exemplary value described in an NAV field having the format of FIG. 15;

DESCRIPTION OF THE PREFERRED EMBODIMENTS

Hereinafter, embodiments of the present invention will be described with reference to the accompanying drawings.

Figure 1:
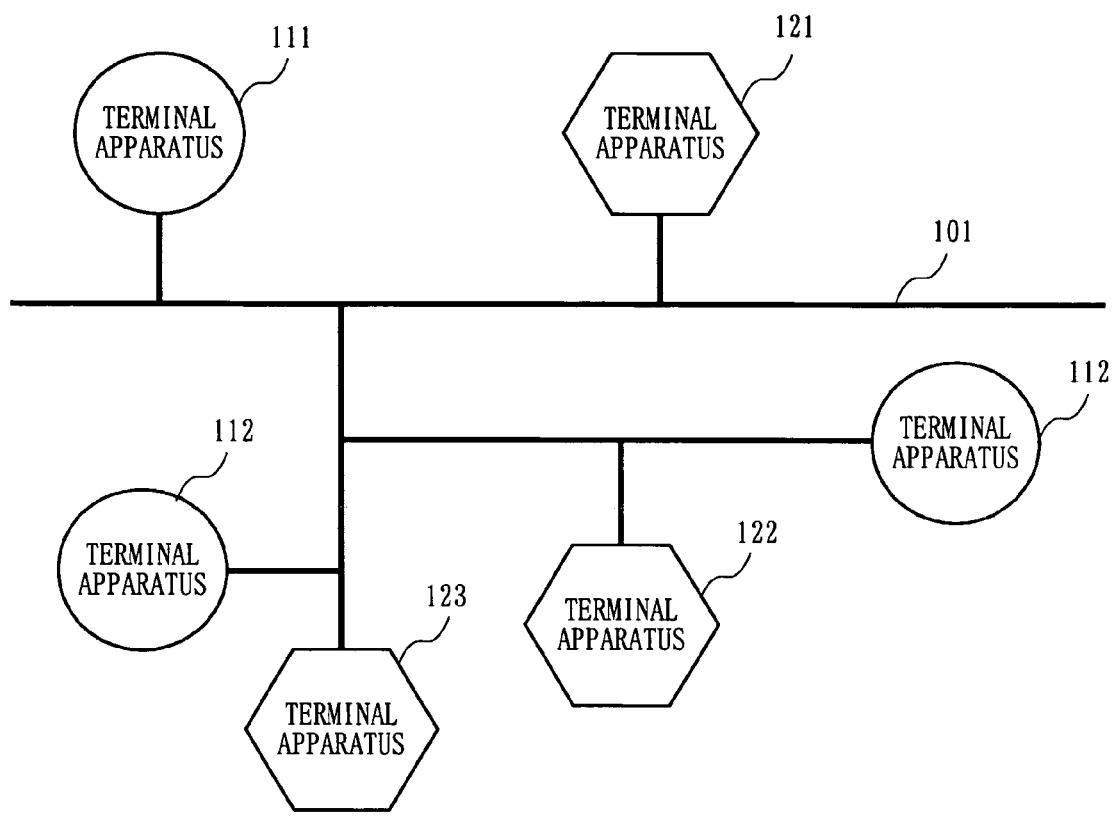
FIG. 1 is a diagram showing an exemplary whole structure of a communication network to which a terminal apparatus according to an embodiment of the present invention is applied.

FIG. 1 is a diagram showing an exemplary whole structure of a communication network to which a terminal apparatus according to an embodiment of the present invention is applied. The communication network can comprise a plurality of different communication systems. The terminal apparatus of the embodiment of the present invention can be connected to the communication network. In FIG. 1, as the plurality of different communication systems, a communication system A and a communication system B which utilize modulation schemes which are not compatible with each other are provided on the communication network. For example, the communication system A and the communication system B use the modulation schemes which are not compatible with each other, in the same frequency band. It is assumed that the communication system A and the communication system B share a communication medium 101. The communication system B is a communication system which is suppressed from transmitting a frame by a terminal apparatus belonging to the communication system A. In FIG. 1, terminal apparatuses 111, 112 and 113 indicated by circles belong to the communication system A. In FIG. 1, terminal apparatuses 121, 122 and 123 indicated by hexagons belong to the communication system B. In the present invention, there are the two communication systems A and B which utilize modulation schemes which are not compatible with each other. However, the number of such communication systems may be three or more. Further, the number of terminal apparatuses belonging to each communication system is not limited to the example of FIG. 1.

First Embodiment

Figure 2:
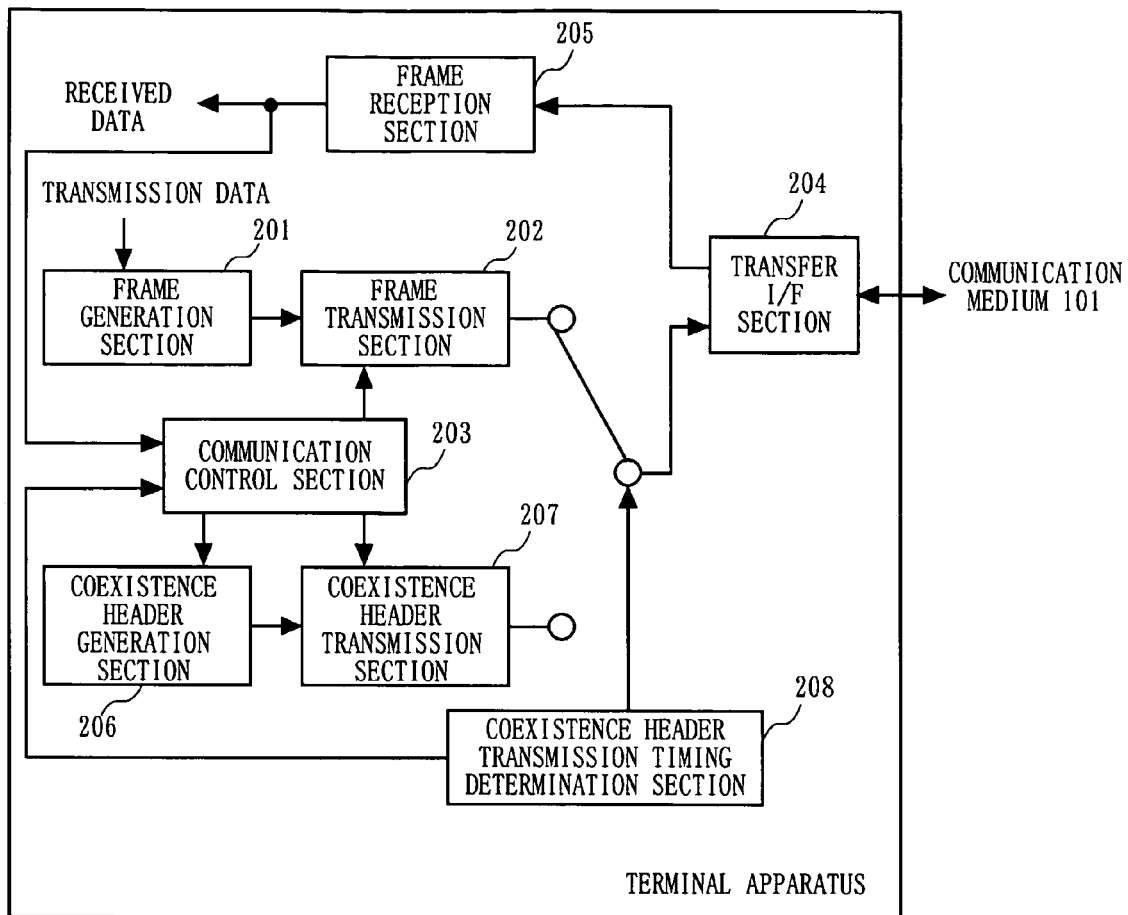
FIG. 2 is a block diagram showing a functional structure of terminal apparatuses 111, 112 and 113 of a first embodiment of the present invention.

FIG. 2 is a block diagram showing a functional structure of terminal apparatuses 111, 112 and 113 of a first embodiment of the present invention. In the embodiment of the present invention, it is assumed that all of the terminal apparatuses 111, 112 and 113 can serve as either a control terminal or a controlled terminal. Therefore, the terminal apparatuses 111, 112 and 113 have a function required for a control terminal and a function required for a controlled terminal. Therefore, the terminal apparatuses 111, 112 and 113 each have a similar functional structure. Note that at least one of the terminal apparatuses 111, 112 and 113 needs to function as a control terminal. Therefore, if a dedicated terminal apparatus which functions as a control terminal is used, a controlled terminal may not have a function required for a control terminal. It is assumed that the terminal apparatuses of the present invention include a terminal apparatus which functions as a control terminal and a controlled terminal, a terminal apparatus which functions only as a control terminal, and a terminal apparatus which functions only as a controlled terminal.

In FIG. 2, the terminal apparatuses 111, 112 and 113 each comprise a frame generation section 201, a frame transmission section 202, a communication control section 203, a transfer I/F section 204, a frame reception section 205, a coexistence header generation section 206, a coexistence header transmission section 207, and a coexistence header transmission timing determination section 208.

The frame generation section 201 frames transmission data. The frame transmission section 202 transmits the frame obtained by the frame generation section 201 via the transfer I/F section 204 to the communication medium 101. The communication control section 203 determines a timing of transmitting the frame. The frame reception section 205 processes the frame received by the transfer I/F section 204 to extract received data. A structure relating to frame transmission/reception, which is composed of the frame generation section 201, the frame transmission section 202, the communication control section 203, the transfer I/F section 204 and the frame reception section 205, is similar to the structure of a general terminal apparatus.

In addition to this structure, in the first embodiment, the terminal apparatuses 111, 112 and 113 belonging to the communication system A each further comprise the coexistence header generation section 206, the coexistence header transmission section 207, and the coexistence header transmission timing determination section 208 so that the communication system A and the communication system B coexist on the same communication medium.

The coexistence header generation section 206 generates a preamble and a header of the communication system B so as to suppress transmission in the terminal apparatuses 121, 122 and 123 belonging to the communication system B before the frame transmission section 202 transmits a frame. When the coexistence header generation section 206 generates the preamble and header of the communication system B, the communication control section 203 informs the coexistence header generation section 206 of a time required to transmit the frame. In response to this, the coexistence header generation section 206 determines a time for which the terminal apparatus belonging to the communication system B is suppressed from transmission and sets required information into the preamble and header of the communication system B. The preamble and header of the communication system B generated by the coexistence header generation section 206 are transmitted to the coexistence header transmission section 207. The coexistence header transmission section 207 uses a modulation scheme of the communication system B. Thus, the coexistence header transmission section 207 can transmit the preamble and header of the communication system B which can be received by a terminal apparatus belonging to the communication system B.

Hereinafter, the preamble and header of the communication system B which are generated by the coexistence header generation section 206 are called a coexistence header.

Figure 3A:
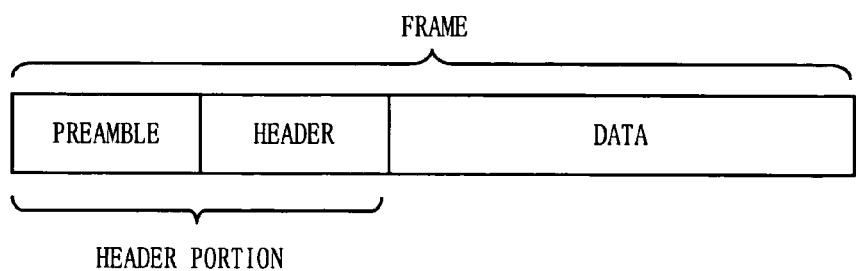
FIG. 3A is a diagram showing a structure of a frame used in a communication system B.

FIG. 3A is a diagram showing a structure of a frame used in the communication system B. Hereinafter, the coexistence header will be described with reference to FIG. 3A. As shown in FIG. 3A, a preamble and a header are stored in a head portion of a frame used in the communication system B. The coexistence header generation section 206 generates data having the same structure as the frame head portion, as a coexistence header. In other words, a coexistence header is composed of a preamble and a header of the communication system B. Note that the coexistence header only needs to suppress transmission in the communication system B, and therefore, may be composed of at least a portion of the frame head portion used in the communication system B. For example, the coexistence header may be composed of only the preamble of the communication system B or only the header of the communication system B. For example, a unique pattern for detecting the head of a frame is described in the preamble. If it is defined that communication is not performed for a predetermined time when a terminal apparatus belonging to the communication system B receives the preamble but not the header, the coexistence header may be composed of only the preamble of the communication system B. Further, in the header, information required for data reception, such as the amount of transmission data, a modulation scheme and the like, is described. If it is defined that a terminal apparatus belonging to the communication system B does not perform communication for a time corresponding to a data amount described in the header, the coexistence header may be composed of the preamble and/or header of the communication system B. Information described in the coexistence header may vary depending on the contents of definition of the communication system B to be suppressed.

The coexistence header transmission timing determination section 208 determines a timing of transmitting a coexistence header. The coexistence header transmission timing determination section 208 switches the frame transmission section 202 and the coexistence header transmission section 207 based on the determined timing. The coexistence header transmission timing determination section 208 informs the communication control section 203 of arrival of the timing of transmitting a coexistence header. In response to this, the communication control section 203 causes the coexistence header generation section 206 to generate a coexistence header and causes the coexistence header transmission section 207 to transmit the coexistence header generated by the coexistence header generation section 206. The coexistence header transmitted by the coexistence header transmission section 207 is transmitted via the transfer I/F section 204 to the communication medium 101.

Figure 3B:
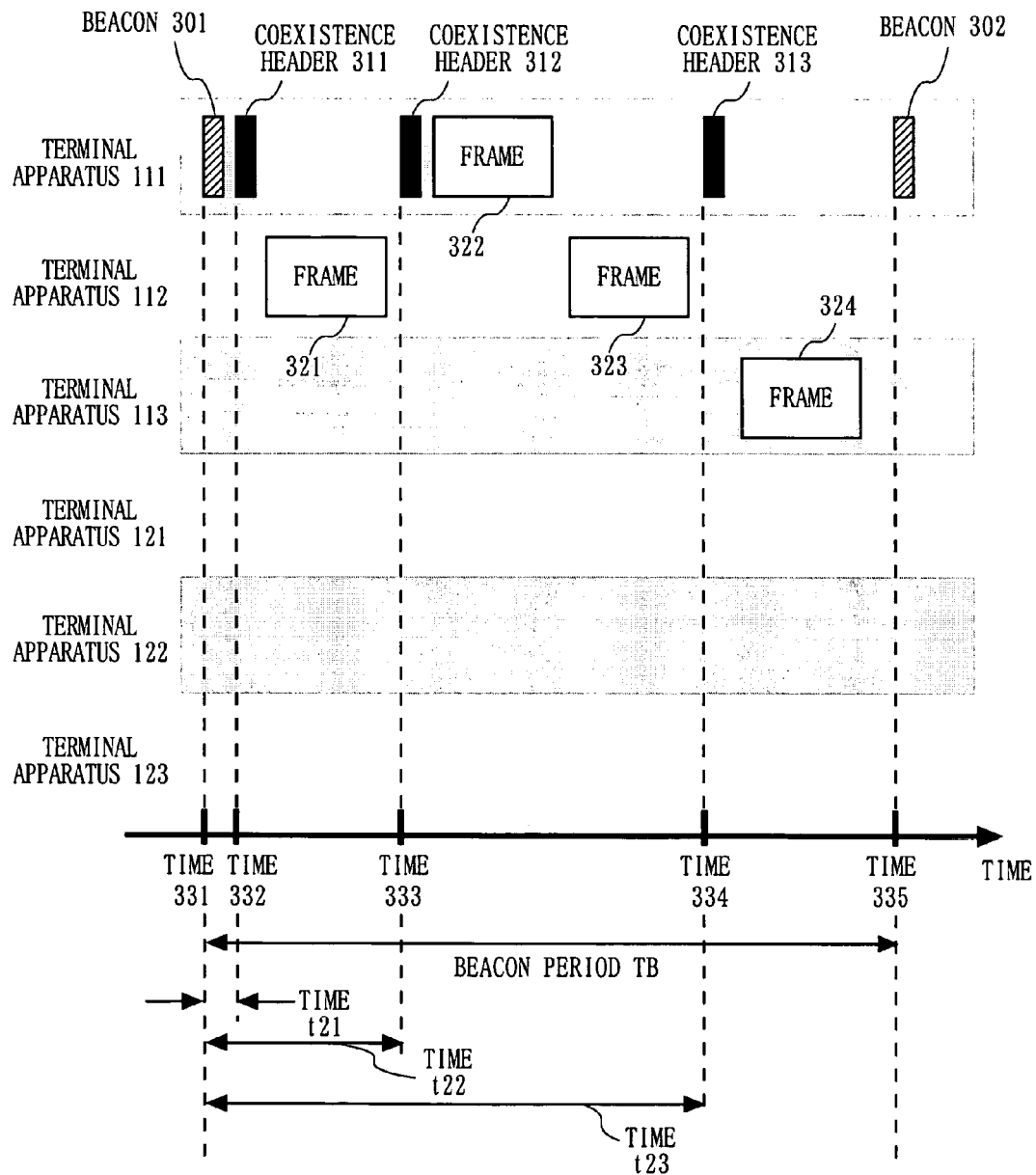
FIG. 3B is a timing chart showing an example of how a terminal apparatus of the first embodiment access the communication medium 101.

FIG. 3B is a timing chart showing an example of how a terminal apparatus of the first embodiment access the communication medium 101.

Of the terminal apparatuses 111, 112 and 113 belonging to the communication system A, the terminal apparatus 111 is a control terminal and has a function of transmitting a beacon every periodic time TB and a function of transmitting a coexistence header. In the beacon transmitted by the terminal apparatus 111, information about a timing at which the terminal apparatus 111 transmits a coexistence header before the next beacon is transmitted, is described. In the communication system A, an access to the communication medium 101 is controlled in accordance with the beacon. Note that an access to a communication medium by a terminal apparatus is herein controlled using a beacon. However, the present invention is not limited to the beacon. A control frame capable of controlling an access to a communication medium may be used.

FIG. 4 is a diagram showing an exemplary format of the beacon transmitted by the terminal apparatus 111. In FIG. 4, a portion of a coexistence header which relates to transmission timing is illustrated. A beacon is provided with two fields for indicating a timing of transmitting a coexistence header. Note that FIG. 4 illustrates a bit width of each field, however, the bit width is not limited to that which is illustrated in FIG. 4. CoexistHeaderNum field is a field indicating the number of transmissions of a coexistence header by the time of transmission of the next beacon. After the CoexistHeaderNum field, there are CoexistHeaderTime fields in the number equal to a value described in the CoexistHeaderNum field. When the value of the CoexistHeaderNum field is N, a CoexistHeaderTime1 field to a CoexistHeaderTimeN field are prepared. In each CoexistHeaderTime field, a time at which a coexistence header is transmitted is described.

FIG. 5 is a diagram showing an exemplary beacon which the terminal apparatus 111 actually transmits by utilizing the format of FIG. 4. In the example of FIG. 5, a value 3 is stored in the CoexistHeaderNum field. This represents that a coexistence header is transmitted three times by the time of transmission of the next beacon. In the following CoexistHeaderTime1 field to CoexistHeaderTime3 field, t21, t22 and t23 are stored, respectively. These represent a first, second and third timings of transmitting a coexistence header, using respective elapsed times from the time of transmission of a beacon.

With reference to FIG. 3B, a description will be given of how each terminal apparatus uses the beacon of FIG. 5 to access the communication medium 101. At time 331, the terminal apparatus 111 of the communication system A transmits the beacon 301 shown in FIG. 5. The terminal apparatus 111 transmits a coexistence header 311 at time 332 which is the time t21 after the time of transmission of the beacon 301, in accordance with information described in the beacon of FIG. 5. Thereby, the terminal apparatuses 121, 122 and 123 belonging to the communication system B receive the coexistence header 311, so that they recognize that the communication medium 101 is in a busy state. Therefore, the terminal apparatuses belonging to the communication system B are suppressed from transmission. Therefore, a terminal apparatus belonging to the communication system A can perform a medium access control in accordance with a procedure defined in the communication system A. Here, the terminal apparatus 112 transmits a frame 321.

Thereafter, the terminal apparatus 111 transmits a second coexistence header 312 at time 333 which is the time t22 after the time of transmission of the beacon 301. Thereby, the terminal apparatuses belonging to the communication system B are suppressed from transmission again. During a time when the terminal apparatus belonging to the communication system B are suppressed from transmission, a terminal apparatus belonging to the communication system A performs a medium access control in accordance with the procedure defined in the communication system A. Here, the terminal apparatuses 111 and 112 transmit frames 322 and 323, respectively.

Thereafter, the terminal apparatus 111 transmits a third coexistence header 313 at time 334 which is the time t23 after the time of transmission of the beacon 301. Thereby, the terminal apparatuses belonging to the communication system B are suppressed from transmission again. During a time when the terminal apparatuses belonging to the communication system B are suppressed from transmission, a terminal apparatus belonging to the communication system A performs a medium access control in accordance with the procedure defined in the communication system A. Here, the terminal apparatus 113 transmits a frame 324.

The terminal apparatus 111 transmits the beacon 302 again at time 335 which is the beacon period TB after the time of transmission of the beacon 301.

Figure 6:
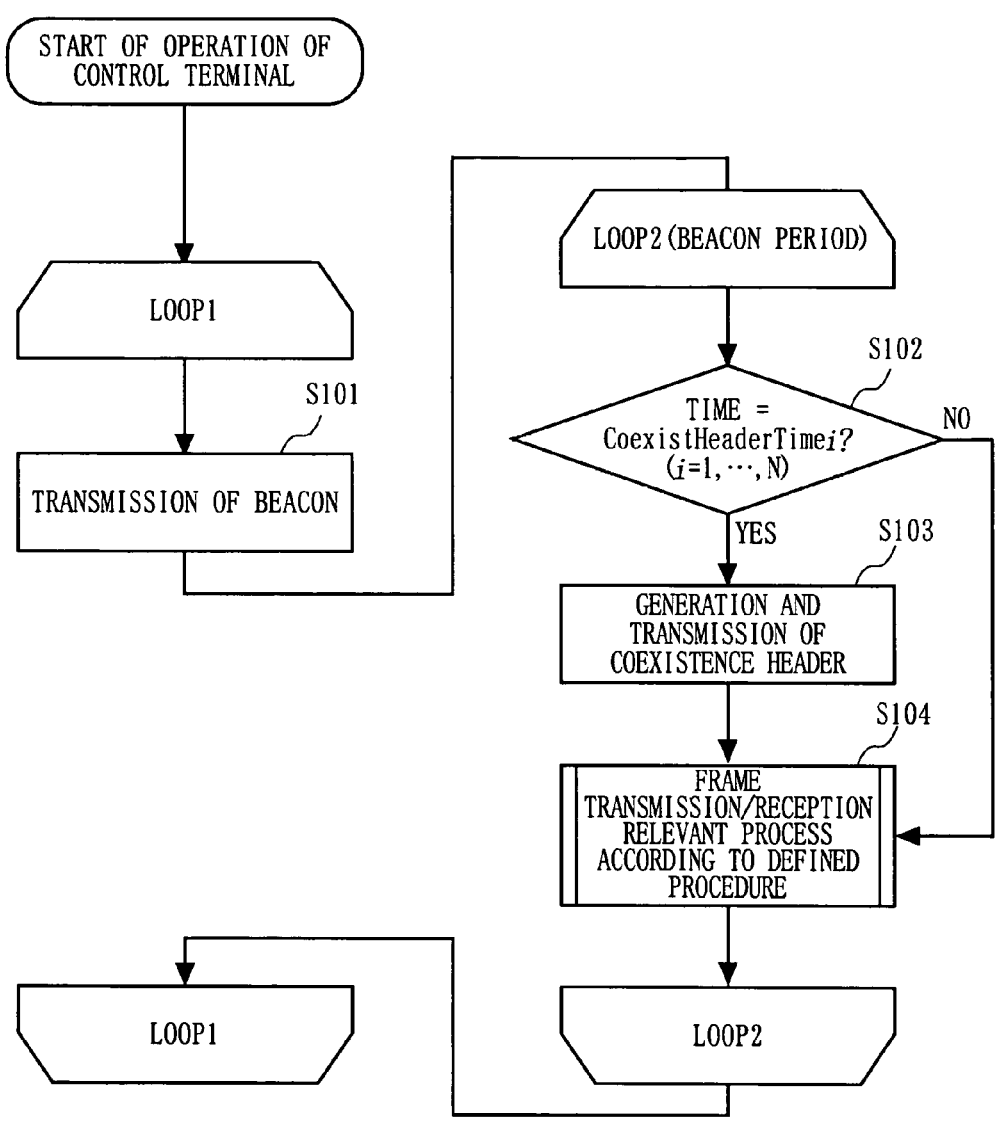
FIG. 6 is a flowchart showing an operation of a terminal apparatus which functions as a control terminal (the terminal apparatus 111 in the example of FIG. 3B)

FIG. 6 is a flowchart showing an operation of a terminal apparatus which functions as a control terminal (the terminal apparatus 111 in the example of FIG. 3B). Hereinafter, the operation of the control terminal will be described with reference to FIG. 6. Note that details or the like of operation termination and frame transmission/reception of the control terminal, which are not directly related to the communication procedure of FIG. 3B, are omitted in FIG. 6.

When the operation of the control terminal is started, the control terminal starts a loop for transmitting a beacon (loop name: LOOP1). It is herein assumed that there is no termination condition for LOOP1. In fact, a certain termination condition is provided. Nevertheless, for the sake of brevity of the description of the operation of the present invention, it is assumed that no termination condition is provided for LOOP1.

In LOOP1, the communication control section 203 of the control terminal causes the frame transmission section 202 to transmit a beacon (step S101). By transmitting the beacon, the control terminal informs a terminal apparatus in the communication system A of a list of times at which the preamble and header (coexistence header) of the communication system B to be suppressed are transmitted (see FIG. 4). After transmission of the beacon, the control terminal starts a loop for transmitting the coexistence header (loop name: LOOP2). A termination condition for LOOP2 is whether or not a beacon period arrives. When the beacon period arrives, the LOOP2 process is ended.

In LOOP2, the coexistence header transmission timing determination section 208 of the control terminal determines, based on information described in the beacon, whether or not the current time is time to transmit a coexistence header (times indicated by CoexistHeaderTime1 to N in FIG. 5) (step S102). When it is not time to transmit a coexistence header, the control terminal goes to an operation of step S104. On the other hand, when it is time to transmit a coexistence header, the coexistence header transmission timing determination section 208 switches on the connection between the transfer I/F section 204 and the coexistence header transmission section 207 to request the communication control section 203 for generation of a coexistence header. In response to the request, the communication control section 203 causes the coexistence header generation section 206 to generate the preamble and header of the communication system B and causes the coexistence header transmission section 207 to transmit the preamble and header of the communication system B (step S103), and goes to an operation of step S104.

In step S104, the communication control section 203 executes a process relating to frame transmission/reception in accordance with a defined procedure. The process in step S104 is executed in accordance with the procedure defined in the communication system A and will not be explained in detail. For example, when the communication system A adopts the CSMA/CD scheme, the communication control section 203 transmits/receives a frame in accordance with the CSMA/CD scheme in step S104.

After step S104, the communication control section 203 returns to the operation of step S102.

Figure 7:
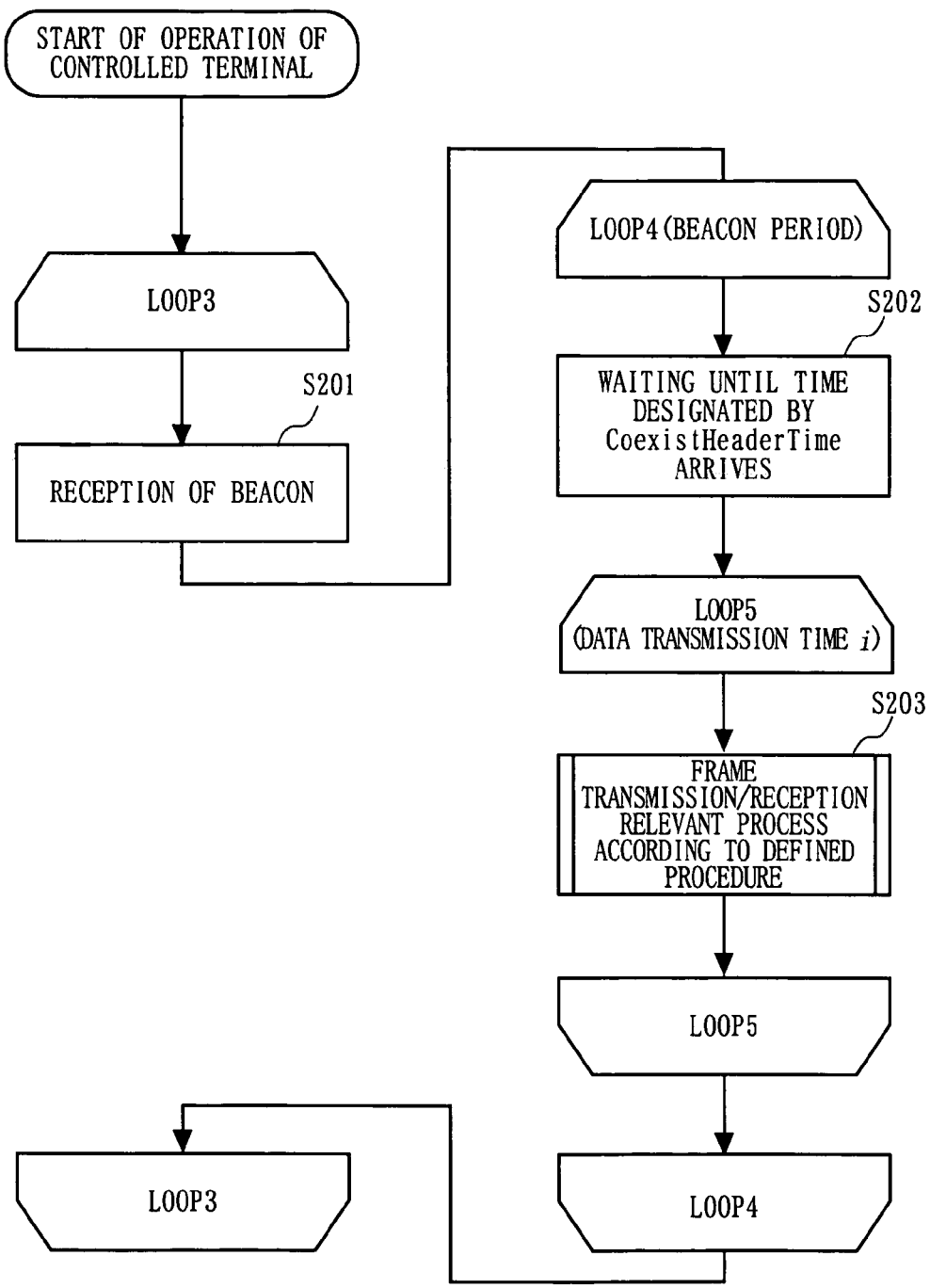
FIG. 7 is a flowchart showing an operation of a controlled terminal which does not transmit a beacon (the terminal apparatuses 112 and 113 in the example of FIG. 3B)

FIG. 7 is a flowchart showing an operation of a controlled terminal which does not transmit a beacon (the terminal apparatuses 112 and 113 in the example of FIG. 3B). Note that details or the like of operation termination and frame transmission/reception of the controlled terminal, which are not directly related to the communication procedure of FIG. 3B, are omitted in FIG. 7.

When the operation of the terminal apparatus 112 is started, the controlled terminal starts a loop for transmitting a beacon (loop name: LOOP3). It is herein assumed that there is no termination condition for LOOP3. In fact, a certain termination condition is provided. Nevertheless, for the sake of brevity of the description of the operation of the present invention, it is assumed that no termination condition is provided for LOOP3.

In LOOP3, the communication control section 203 of the controlled terminal causes the frame reception section 205 to receive a beacon (step S201). By receiving the beacon, the controlled terminal starts a loop for waiting for transmission of a coexistence header (loop name: LOOP4). A termination condition for LOOP4 is whether or not a beacon period arrives. When the beacon period arrives, the LOOP4 process is ended.

In LOOP4, the communication control section 203 references CoexistHeaderTime in the beacon successively from CoexistHeaderTime1 and waits until a time designated by the CoexistHeaderTime arrives (step S202). After step S202, the terminal apparatus 112 starts a loop for execution of a process relating to frame transmission/reception (loop name: LOOP5). A termination condition for LOOP5 is whether or not a data transmission time is elapsed. When the data transmission time is elapsed, the LOOP5 process is ended. Here, the data transmission time refers to a time from completion of transmission of a coexistence header by the control terminal at a time CoexistHeaderTime(i) to start of transmission of a coexistence header at a time CoexistHeaderTime(i+1). For the data transmission time, the terminal apparatuses belonging to the communication system B are suppressed from frame transmission, while only a terminal apparatus belonging to the communication system A can transmit a frame.

In LOOP5, the communication control section 203 executes a process relating to frame transmission/reception in accordance with a defined procedure (step S203). The process in step S204 is executed in accordance with the procedure defined in the communication system A and will not be explained in detail. For example, when the communication system A adopts the CSMA/CD scheme, the communication control section 203 transmits/receives a frame in accordance with the CSMA/CD scheme in step S203.

As described above, according to the first embodiment, the control terminal transmits a coexistence header as appropriate during a beacon period. Thereby, the terminal apparatuses belonging to the communication system B recognize that a communication medium is in the busy state and refrain from frame transmission. Therefore, the terminal apparatuses belonging to the communication system B can be suppressed from transmission, whereby coexistence of different communication systems can be achieved. Further, all terminal apparatuses of the communication system A do not have to have a function of receiving the preamble and header of the communication system B. It is only necessary that at least one of the terminal apparatuses of the communication system A has a function of transmitting the preamble and header of the communication system B.

Although it is herein assumed that the timing of transmitting a coexistence header is informed using a beacon, the method of informing the transmission timing is not limited to this. For example, the timing of transmitting a coexistence header may be informed individually by polling from an apparatus, such as a base, an access point or the like. When the timing of transmitting a coexistence header is informed individually by polling, a control terminal which executes polling may transmit the coexistence header to suppress the communication system B from transmission before informing the timing of transmitting the coexistence header.

No matter whether the informing method is achieved by using a beacon or by polling, a terminal apparatus which transmits a coexistence header may, or may not, be the same terminal apparatus which performs beacon transmission or polling. When a terminal apparatus which transmits a coexistence header is different from a terminal apparatus which performs beacon transmission or polling, the timing of transmitting the coexistence header may be informed by using a beacon or by polling. In either case, all terminal apparatus of the communication system A do not have to have a function of receiving the preamble and header of the communication system B. At least one of the terminal apparatuses of the communication system A only needs to have a function of transmitting the preamble and header of the communication system B.

Figure 8:
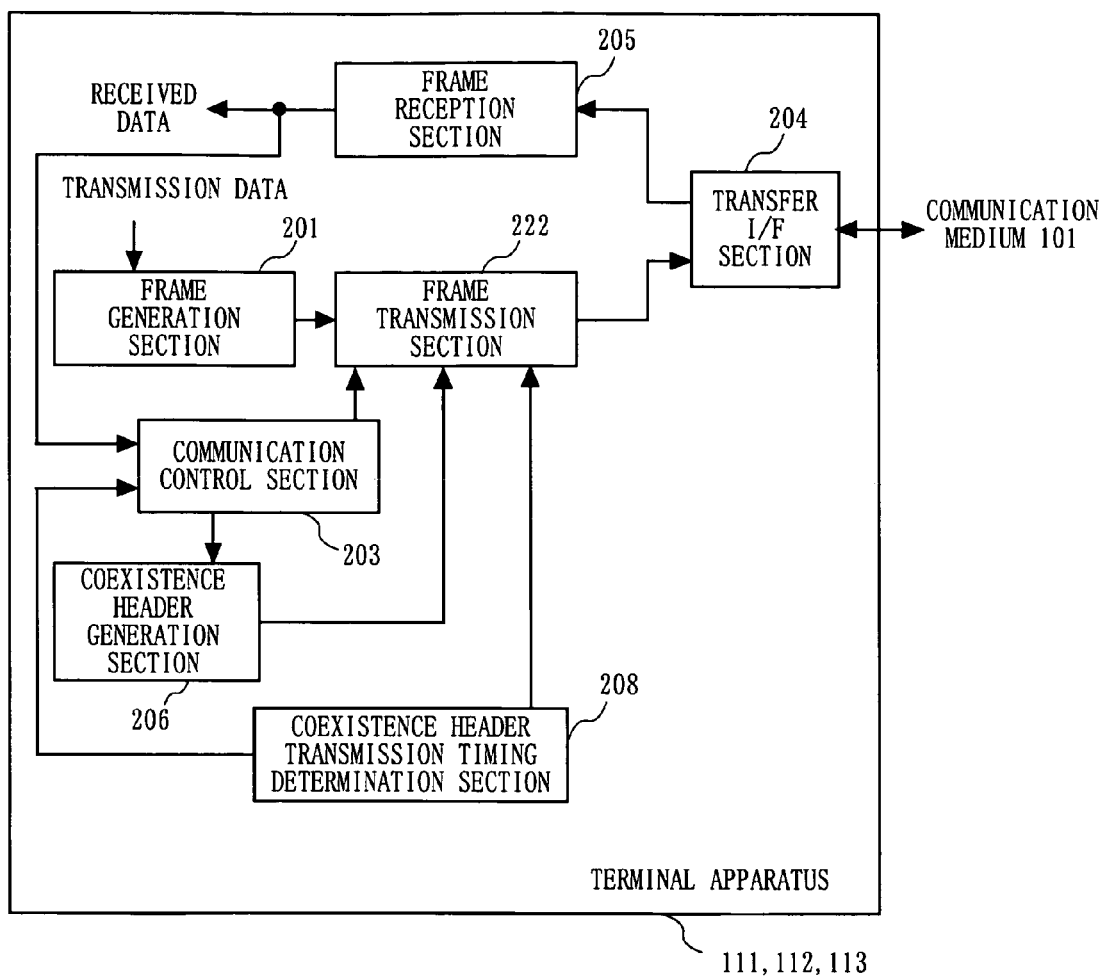
FIG. 8 is a block diagram showing a functional structure of the terminal apparatuses 111, 112 and 113 when a frame transmission section 202 and a coexistence header transmission section 207 share some component(s)

Note that when a characteristic of the physical layer of the communication system A is similar to a characteristic of the physical layer of the communication system B, the frame transmission section 202 and the coexistence header transmission section 207 of FIG. 2 may share some component (s). FIG. 8 is a block diagram showing a functional structure of the terminal apparatuses 111, 112 and 113 when the frame transmission section 202 and the coexistence header transmission section 207 share some component(s). In FIG. 8, portions having a function similar to that of FIG. 2 are referenced with the same reference numerals. In FIG. 8, the frame transmission section 202 and the coexistence header transmission section 207 of FIG. 2 share some component(s) and are integrated into a frame transmission section 222.

The frame generation section 201 frames transmission data. The transmission section 222 transmits the transmission data via the transfer I/F section 204 to the communication medium 101. When transmitting a frame, the communication control section 203 determines a timing of transmitting the frame in accordance with a defined procedure. The frame received by the transfer I/F section 204 is subjected to a reception process in the frame reception section 205 to extract received data.

When a terminal apparatus of interest is a control terminal, the coexistence header generation section 206 generates a coexistence header to suppress the terminal apparatuses belonging to the communication system B from transmission before transmitting a frame. When the preamble and header of the communication system B are generated by the coexistence header generation section 206, the communication control section 203 informs the coexistence header generation section 206 of a time required to transmit a frame. In response to this, the coexistence header generation section 206 determines a time interval for which the terminal apparatuses belonging to the communication system B are suppressed from transmission, and sets required information into the coexistence header. The preamble and header of the communication system B generated by the coexistence header generation section 206 are transmitted to the frame transmission section 222.

The coexistence header transmission timing determination section 208 determines a timing of transmitting a coexistence header and informs the communication control section 203 of the timing. In response to this, the communication control section 203 causes the frame transmission section 222 to transmit the coexistence header generated by the coexistence header generation section 206.

Second Embodiment

Figure 9:
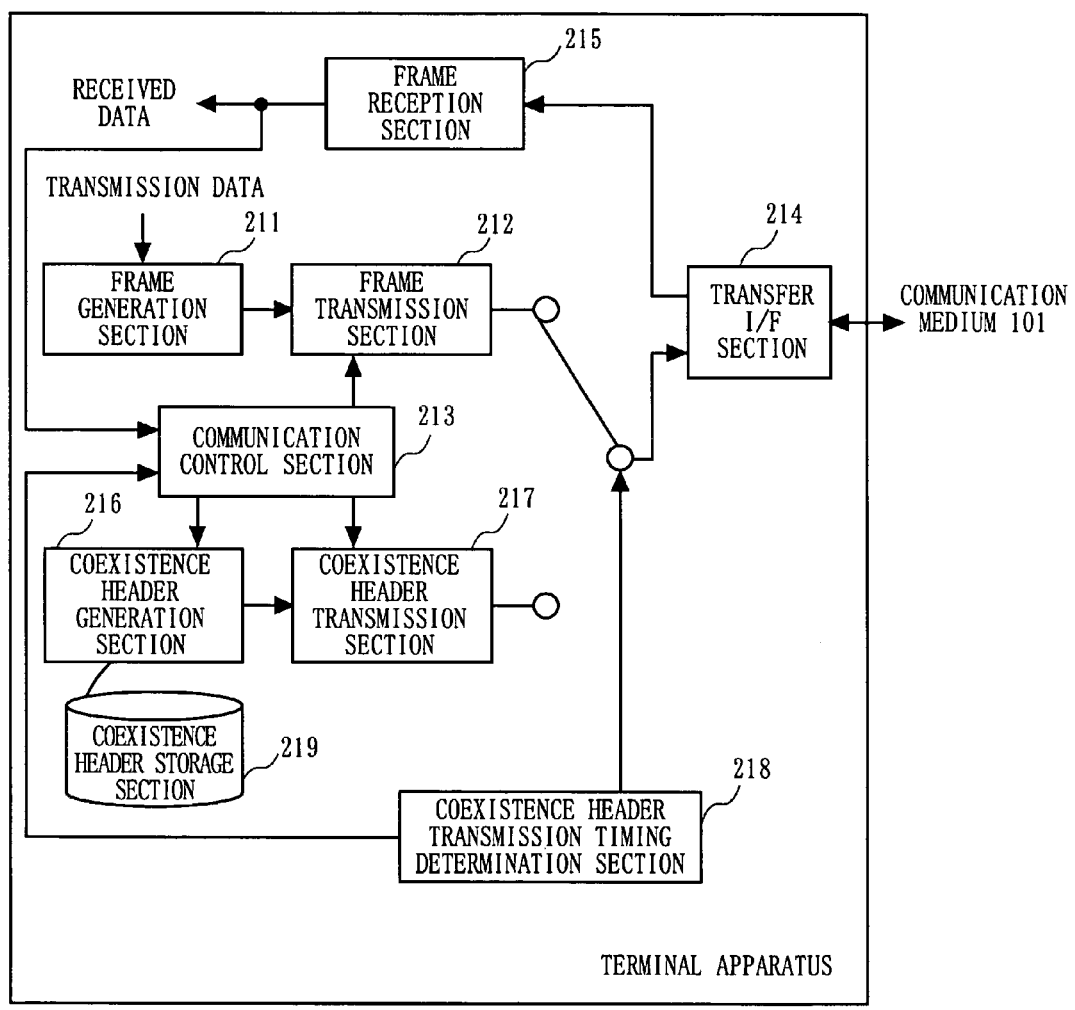
FIG. 9 is a block diagram showing a functional structure of terminal apparatuses 111, 112 and 113 according to a second embodiment of the present invention.

FIG. 9 is a block diagram showing a functional structure of terminal apparatuses 111, 112 and 113 according to a second embodiment of the present invention. In the second embodiment, the terminal apparatuses 111, 112 and 113 each has a function of transmitting the preamble and header of the communication system B, i.e., a function as a coexistence control terminal, and a function of transmitting a beacon, i.e., a function as a control terminal, and a function of controlling a timing of transmitting a frame base on a beacon to be transmitted, i.e., a function as a controlled terminal. It may be determined, previously or depending on transmission situation, whether or not the terminal apparatuses 111, 112 and 113 each function as a coexistence control terminal, a control terminal or a controlled terminal. In other words, in the present invention, it is arbitrarily determined which function is performed by each of the terminal apparatuses 111, 112 and 113. Note that the terminal apparatuses 111, 112 and 113 may each have only at least one of the functions of a coexistence control terminal, a control terminal and a controlled terminal.

In FIG. 9, the terminal apparatuses 111, 112 and 113 each comprise a frame generation section 211, a frame transmission section 212, a communication control section 213, a transfer I/F section 214, a frame reception section 215, a coexistence header generation section 216, a coexistence header transmission section 217, a coexistence header transmission timing determination section 218, and a coexistence header storage section 219.

The frame generation section 211 generates a beacon. The beacon generated by the frame generation section 211 is similar to that of the first embodiment. When a period for transmitting a beacon (beacon period) arrives, the communication control section 213 transmits the beacon generated by the frame generation section 211 to the frame transmission section 212. The frame transmission section 212 transmits the beacon via the transfer I/F section 214 to the communication medium 101 in response to an instruction of the communication control section 213. After transmission of the beacon, the communication control section 213 executes a process relating to frame transmission/reception in accordance with a defined procedure. The process relating to frame transmission/reception is similar to an operation of the communication control section 213 when a terminal apparatus of interest operates as a controlled terminal.

The coexistence header storage section 219 is a ROM, a RAM, a register or the like and holds a definite number of coexistence headers. Note that the coexistence header storage section 219 holds only one coexistence header when a single pattern of coexistence header is required. The coexistence header generation section 216 generates a required coexistence header with reference to the coexistence header storage section 219. The coexistence header transmission timing determination section 218 determines a timing of transmitting a coexistence header. When the determined timing arrives, the communication control section 213 is informed. In response to the information, the communication control section 213 causes the coexistence header generation section 216 to generate a coexistence header and causes the coexistence header transmission section 217 to the coexistence header. After transmitting the coexistence header, the communication control section 213 executes a process relating to frame transmission/reception in a defined procedure. The process relating to frame transmission/reception is similar to an operation of the communication control section 213 when a terminal apparatus of interest operates as a controlled terminal.

Assuming that frame transmission is desired, when the frame reception section 215 receives a beacon via the transfer I/F section 214, the communication control section 213 determines whether or not a timing of transmitting a frame arrives, in accordance with a predetermined procedure. The frame generation section 211 generates a frame based on input transmission data. When the timing of transmitting a frame arrives, the communication control section 213 causes the frame transmission section 212 to transmit the frame generated by the frame generation section 211 to the transfer I/F section 214. The process for transmitting a frame is not limited to the above-described example and known techniques are available. When receiving the frame via the transfer I/F section 214, the frame reception section 215 converts the received frame to received data, which is in turn output.

Figure 10:
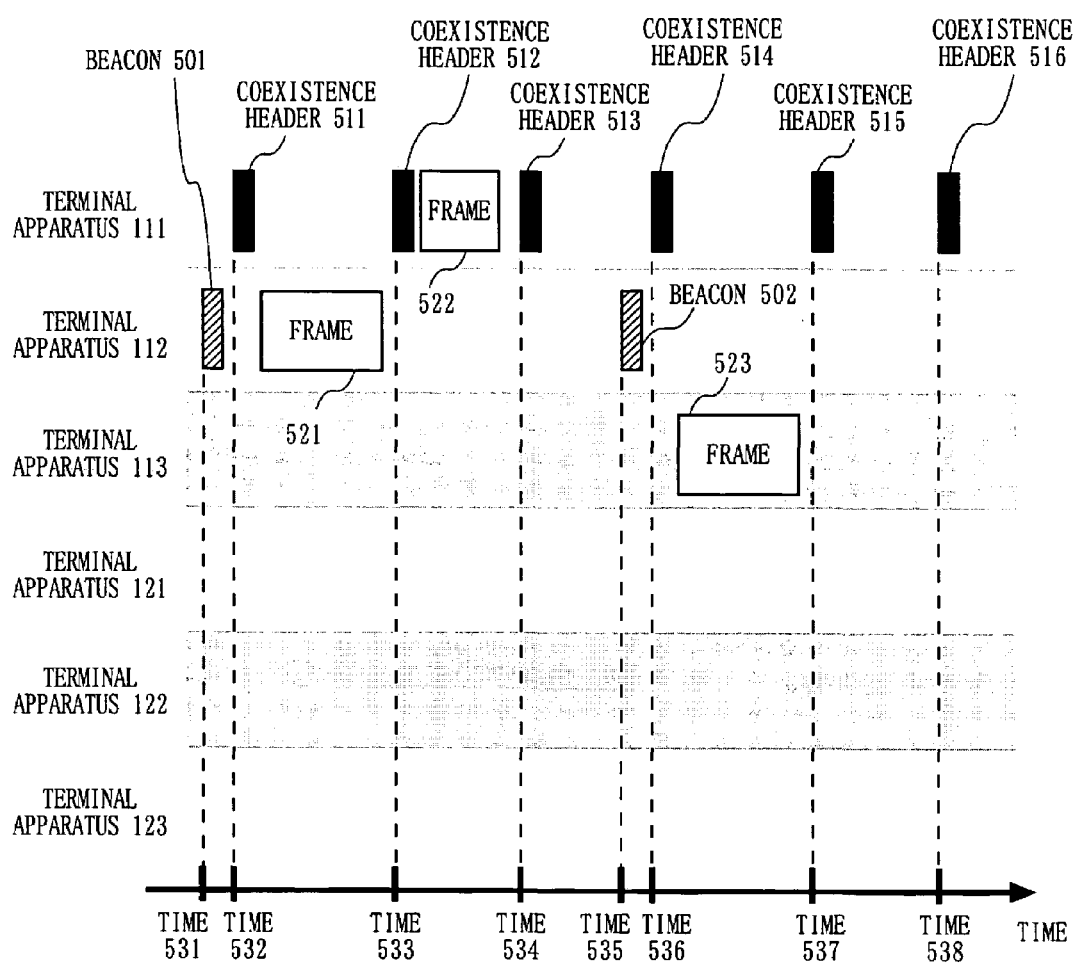
FIG. 10 is a timing chart showing an example of how a terminal apparatus of a second embodiment accesses the communication medium 101.

FIG. 10 is a timing chart showing an example of how the terminal apparatus of the second embodiment accesses the communication medium 101.

In FIG. 10, of the terminal apparatuses 111, 112 and 113 belonging to the communication system A, it is assumed that the terminal apparatus 111 functions as a coexistence control terminal, the terminal apparatus 112 functions as a control terminal, and the terminal apparatus 113 functions as a controlled terminal. The terminal apparatus 111 transmits a coexistence header within a period for which a beacon is transmitted, in accordance with a predetermined rule. The terminal apparatus 112 transmits a beacon every beacon period.

At time 531, the terminal apparatus 112 transmits a beacon. Following to this, at time 532, the terminal apparatus 111 transmits a coexistence header 511. Thereby, the terminal apparatuses belonging to the communication system B are suppressed from transmission. Next, until time 533 at which a coexistence header 512 is transmitted, the terminal apparatuses 111, 112 and 113 belonging to the communication system A execute an access control to the communication medium 101 in accordance with a procedure defined in the communication system A. As in the first embodiment, a time at which the preamble and header of the communication system B are transmitted is described in a beacon. Therefore, each terminal apparatus of the communication system A can recognize the time at which the preamble and header of the communication system B are transmitted. It is herein assumed that the terminal apparatus 112 transmits a frame 521 until the coexistence header 512 is transmitted.

At time 533, the terminal apparatus 111 transmits the coexistence header 512. Thereby, the terminal apparatuses belonging to the communication system B are suppressed from transmission. Thereafter, the terminal apparatus 111 transmits a coexistence header 513 in accordance with a predetermined rule. Thereby, the terminal apparatuses belonging to the communication system B are suppressed from transmission continuously within the beacon period. Therefore, the communication medium 101 is occupied by the communication system A.

At time 535, the terminal apparatus 112 transmits the next beacon. Following to this, at time 536, the terminal apparatus 111 transmits a coexistence header 514. Here, an elapsed time from time 535 to time 536 is equal to an elapsed time from time 531 to time 532. Similarly, the terminal apparatus 111 transmits coexistence headers 515 and 516 until the next beacon is transmitted. Here, an elapsed time from time 535 of the second beacon transmission to time 537 of transmission of the coexistence header 515 is equal to an elapsed time from time 531 of the first beacon transmission to time 533 of transmission of the coexistence header 512. Also, an elapsed time from time 535 of the second beacon transmission to time 538 of transmission of the coexistence header 516 is equal to an elapsed time from time 531 of the first beacon transmission to time 534 of transmission of the coexistence header 513. FIG. 10 shows how a frame 523 is transmitted by the terminal apparatus 113 after the coexistence header 514 is transmitted.

Figure 11:
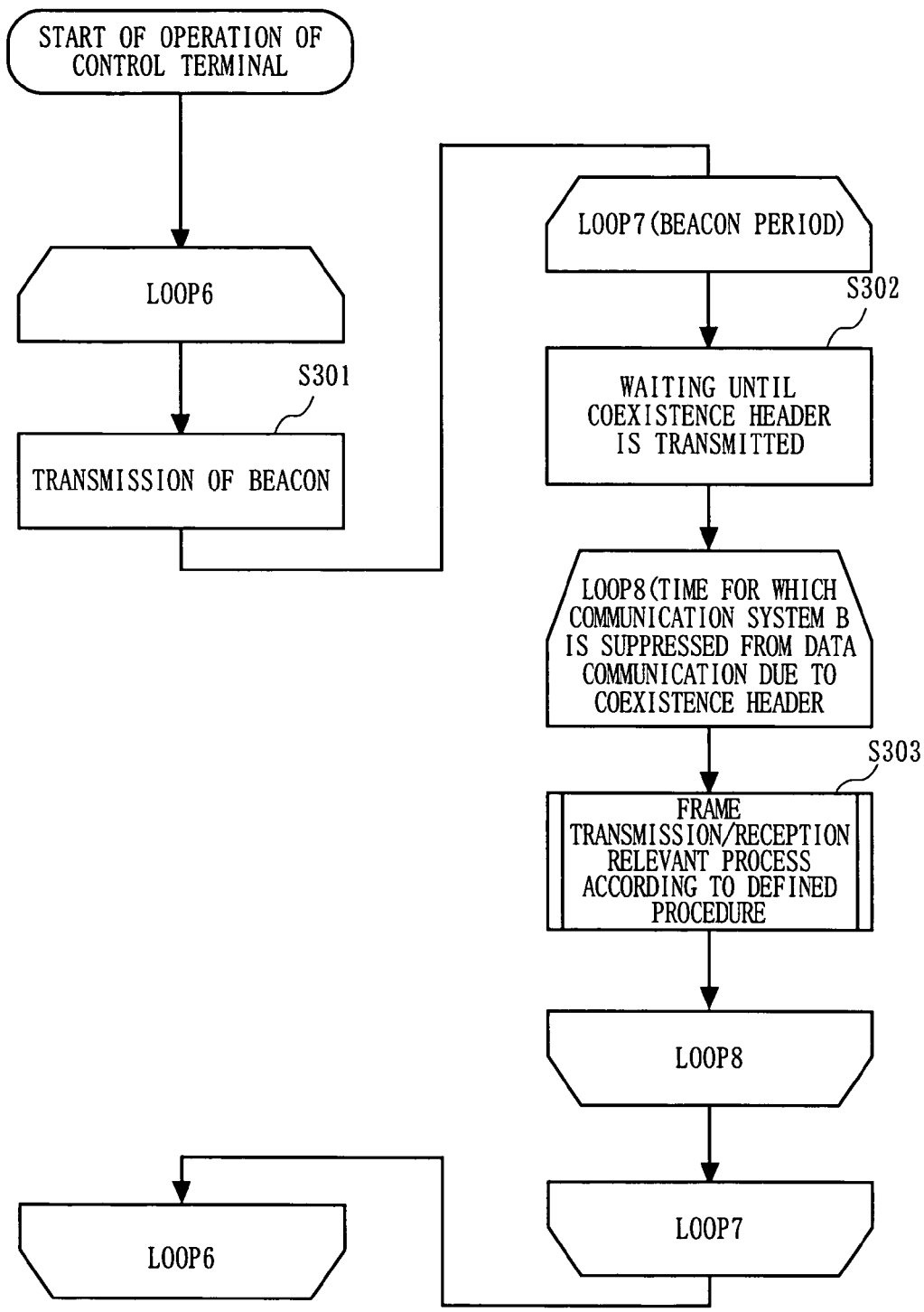
FIG. 11 is a flowchart showing an operation of a terminal apparatus functioning as a control terminal (the terminal apparatus 112 in the example of FIG. 10)

FIG. 11 is a flowchart showing an operation of a terminal apparatus functioning as a control terminal (the terminal apparatus 112 in the example of FIG. 10). Hereinafter, the operation of the terminal apparatus functioning as a control terminal will be described with reference to FIG. 11. Note that details or the like of operation termination and frame transmission/reception of the control terminal, which are not directly related to the communication procedure of FIG. 10, are omitted in FIG. 11.

When the operation of the control terminal is started, the control terminal starts a loop for transmitting a beacon (loop name: LOOP6). It is herein assumed that there is no termination condition for LOOP6. In fact, a certain termination condition is provided. Nevertheless, for the sake of brevity of the description of the operation of the present invention, it is assumed that no termination condition is provided for LOOP6.

In LOOP6, the communication control section 213 of the control terminal causes the frame transmission section 212 to transmit a beacon (step S301). By transmitting the beacon, the control terminal informs a terminal apparatus of the communication system A of a list of times at which the preamble and header (coexistence header) of the communication system B to be suppressed are transmitted (see FIG. 4). After transmission of the beacon, the control terminal starts a loop for waiting for arrival of the next beacon period (loop name: LOOP7). A termination condition for LOOP7 is whether or not the beacon period arrives. When the beacon period arrives, the LOOP7 process is ended.

In LOOP7, the communication control section 213 of the control terminal waits for transmission of a coexistence header by the coexistence control terminal (step S302). The communication control section 213 of the control terminal determines, based on information included in the beacon, whether or not the coexistence control terminal transmits a coexistence header. When a coexistence header is transmitted by the coexistence control terminal, the communication control section 213 of the control terminal goes to a process of LOOP8. In LOOP8, the communication control section 213 executes a process relating to frame transmission/reception in accordance with a defined procedure (step S303). When a period for which the communication system B is suppressed from communication is ended by the coexistence header, a termination condition for LOOP8 is satisfied, so that LOOP8 is ended. Thereby, the process relating to frame transmission/reception is executed during a time when a coexistence header is not transmitted in the beacon period.

Figure 12:
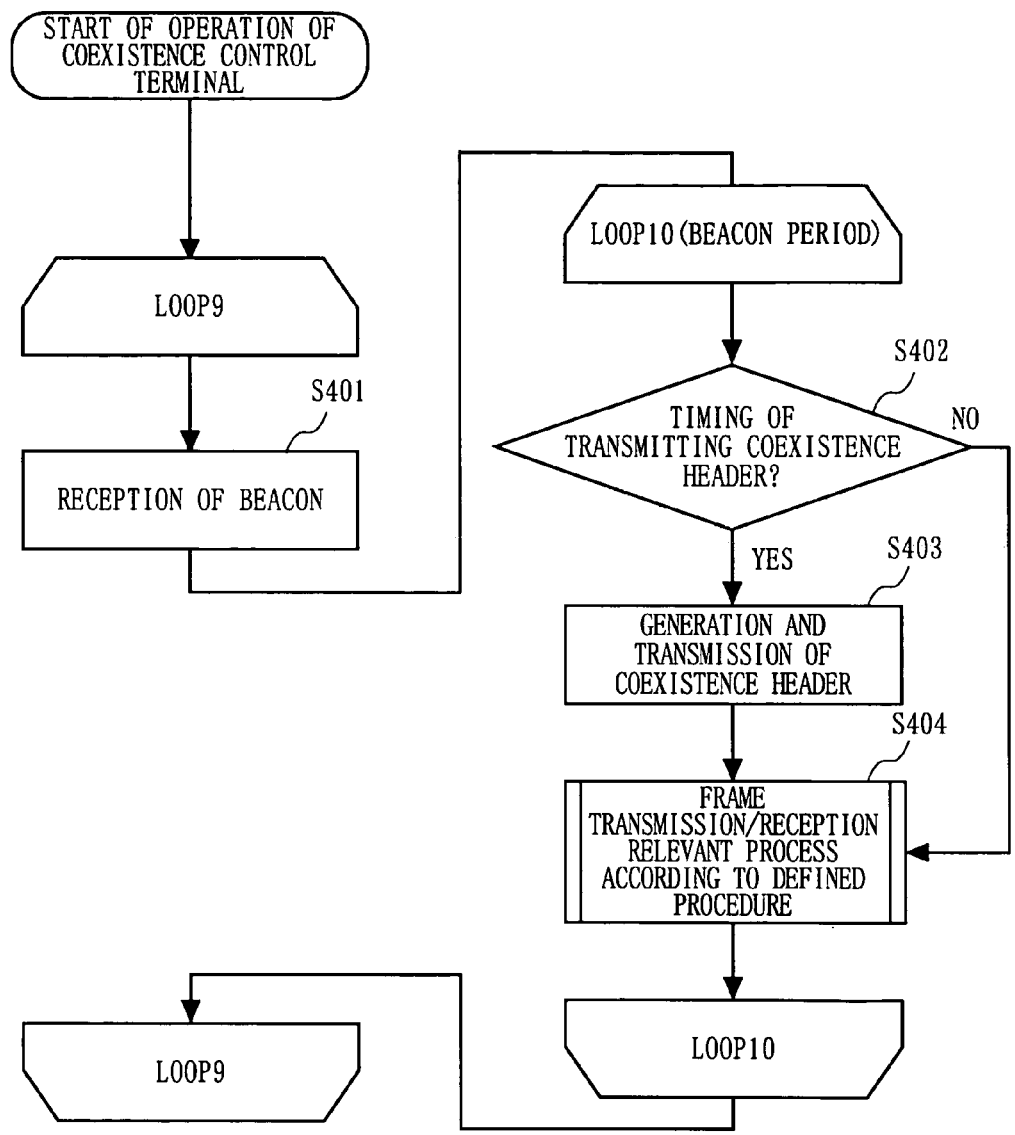
FIG. 12 is a flowchart showing an operation of a terminal apparatus functioning as a coexistence control terminal (the terminal apparatus 111 in the example of FIG. 10)

FIG. 12 is a flowchart showing an operation of a terminal apparatus functioning as a coexistence control terminal (the terminal apparatus 111 in the example of FIG. 10). Hereinafter, the operation of the terminal apparatus functioning as a coexistence control terminal will be described with reference to FIG. 12. Note that details or the like of operation termination and frame transmission/reception of the coexistence control terminal, which are not related to the communication procedure of FIG. 10, are omitted in FIG. 12.

When the operation of the coexistence control terminal is started, the coexistence control terminal starts a loop for receiving a beacon (loop name: LOOP9). It is herein assumed that there is no termination condition for LOOP9. In fact, a certain termination condition is provided. Nevertheless, for the sake of brevity of the description of the operation of the present invention, it is assumed that no termination condition is provided for LOOP9.

In LOOP9, the communication control section 213 of the coexistence control terminal causes the frame reception section 215 to receive a beacon (step S401). By receiving the beacon, the communication control section 213 of the coexistence control terminal starts a loop for waiting for transmission of a coexistence header (loop name: LOOP10). A termination condition for LOOP10 is whether or not a beacon period arrives. When the beacon period arrives, the LOOP10 process is ended.

In LOOP10, the coexistence header transmission timing determination section 218 of the coexistence control terminal determines whether or not a time to transmit a coexistence header arrives, in accordance with a predetermined rule (step S402). When the time to transmit a coexistence header does not arrive, the coexistence control terminal goes to an operation of step S404. On the other hand, when the time to transmit a coexistence header arrives, the communication control section 213 of the coexistence control terminal causes the coexistence header transmission section 217 to transmit a coexistence header (step S403), and goes to the operation of step S404. When the coexistence header transmission section 217 is instructed to transmit a coexistence header, the coexistence header generation section 216 extracts required information from the coexistence header storage section 219 and generates the coexistence header.

In step S404, the communication control section 213 of the coexistence control terminal executes a process relating to frame transmission/reception in accordance with a defined procedure.

Thus, the coexistence control terminal transmits coexistence headers at predetermined time intervals within a beacon period. Also, the coexistence control terminal executes a process relating to frame transmission/reception during a time when a coexistence header is not transmitted. Since the beacon period is constant, the coexistence control terminal can recognize a second time or later at which a beacon is transmitted. Therefore, the coexistence control terminal does not have to execute the process of receiving a beacon (step S401) in LOOP9 at the second time or later.

Figure 13:
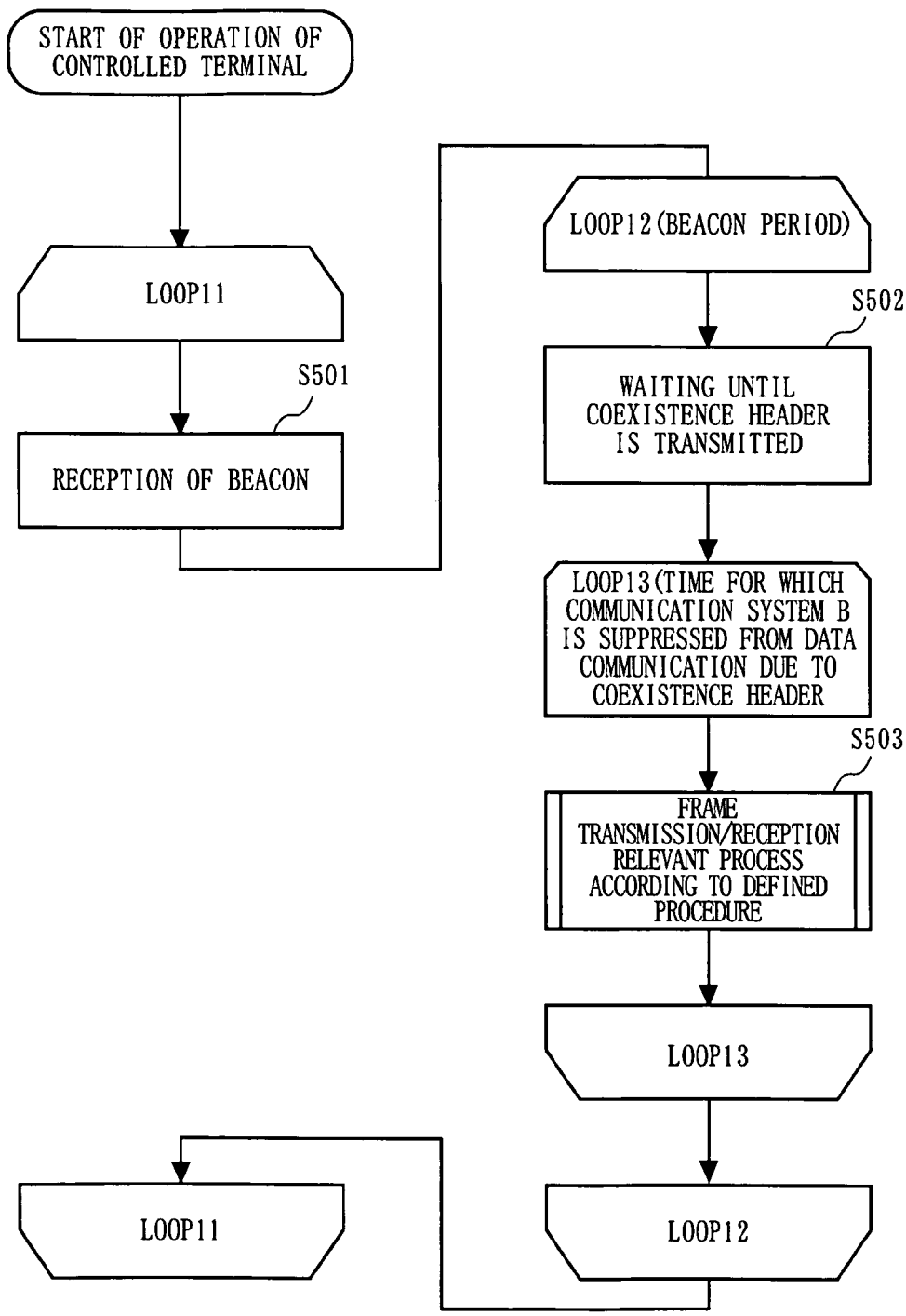
FIG. 13 is a flowchart showing an operation of a terminal apparatus functioning as a controlled terminal (the terminal apparatus 113 in the example of FIG. 10)

FIG. 13 is a flowchart showing an operation of a terminal apparatus functioning as a controlled terminal (the terminal apparatus 113 in the example of FIG. 10). Hereinafter, the operation of the terminal apparatus functioning as a controlled terminal will be described with reference to FIG. 13. Note that details or the like of operation termination and frame transmission/reception of the controlled terminal, which are not related to the communication procedure of FIG. 10, are omitted in FIG. 13.

When the operation of the controlled terminal is started, the controlled terminal starts a loop for receiving a beacon (loop name: LOOP11). It is herein assumed that there is no termination condition for LOOP11. In fact, a certain termination condition is provided. Nevertheless, for the sake of brevity of the description of the operation of the present invention, it is assumed that no termination condition is provided for LOOP11.

In LOOP11, the communication control section 213 of the controlled terminal receives the beacon received by the frame reception section 215 (step S501). When receiving the beacon, the communication control section 213 of the controlled terminal starts a loop for executing a process relating to frame transmission/reception (loop name: LOOP12). A termination condition for LOOP12 is whether or not a beacon period arrives. When the beacon period arrives, the LOOP12 process is ended.

In LOOP12, the communication control section 213 of the controlled terminal waits until a coexistence header is transmitted by a coexistence control terminal (step S502). The communication control section 213 of the controlled terminal determines, based on information included in the beacon, whether or not a coexistence header is transmitted by the coexistence control terminal. Therefore, the controlled terminal does not have to include a function of receiving a coexistence header. When a coexistence header is transmitted by the coexistence control terminal, the communication control section 213 of the controlled terminal goes to a process of LOOP13. In LOOP13, the communication control section 213 of the controlled terminal executes a process relating to frame transmission/reception in accordance with a defined procedure (step S503). When a period for which the communication system B is suppressed from frame communication due to the coexistence header is ended, a termination condition for LOOP13 is satisfied, so that LOOP13 is ended. Thus, in a beacon period, the process relcoexistence header executes a process relating to frame transmission/reception.

As described above, according to the second embodiment, a timing of transmitting a coexistence header is the same in all beacon periods. Therefore, a coexistence control terminal only needs to transmit a coexistence header at the same timing for each time after arrival of a beacon period. Therefore, even if a coexistence control terminal fails to receive a beacon, it is possible to reliably suppress a terminal apparatus belonging to the communication system B from transmission. As a result, coexistence of different systems is achieved.

In the second embodiment, the coexistence header generation section 216 of a terminal apparatus belonging to the communication system A generates the preamble and header of the communication system B as a coexistence header in order to coexist with the communication system B. However, if the terminal apparatuses belonging to the communication system B can be suppressed from transmission by a terminal apparatus of the communication system A transmitting only the preamble of the communication system B, the coexistence header generation section 216 of the terminal apparatus of the communication system A only needs to generate at least the preamble of the communication system B.

In the second embodiment, a coexistence control terminal and a control terminal are assumed to be different terminal apparatuses. Alternatively, a coexistence control terminal and a control terminal may be integrated into one terminal apparatus which also transmits both a beacon and a coexistence header.

In the second embodiment, a time when a coexistence header is transmitted is described in a beacon as in the first embodiment of FIG. 4. However, in the second embodiment, the time when a coexistence header is transmitted is previously determined, and therefore, does not have to be described in a beacon. Note that if the time when a coexistence header is transmitted is not described in a beacon, a controlled terminal needs to previously recognize a rule in accordance with which the coexistence header is transmitted. Note that if the time when a coexistence header is transmitted is described in a beacon and a controlled terminal fails to receive a beacon, the controlled terminal may be operated, assuming a coexistence header is transmitted at the time described in the previously received beacon.

Note that if the time when a coexistence header is transmitted is not described in a beacon, the beacon may not be necessarily required, depending on the access control scheme used in the communication system A. In such a case, all terminal apparatuses other than a coexistence control terminal for transmitting a coexistence header may be controlled terminals which execute only frame transmission/reception (i.e., do not transmit a beacon or a coexistence header).

Note that if the time when a coexistence header is transmitted is not described in a beacon, steps S401 and S501, in which a beacon is received, are omitted in FIGS. 12 and 13.

Third Embodiment

In a third embodiment, a functional structure of a terminal apparatus belonging to the communication system A is similar to that of the first embodiment, and therefore, FIG. 2 is referenced. However, an operation of each block is different from that of the first embodiment as described below. In the third embodiment, the terminal apparatus belonging to the communication system A may have the functional blocks of FIGS. 8 and 9.

Figure 14:
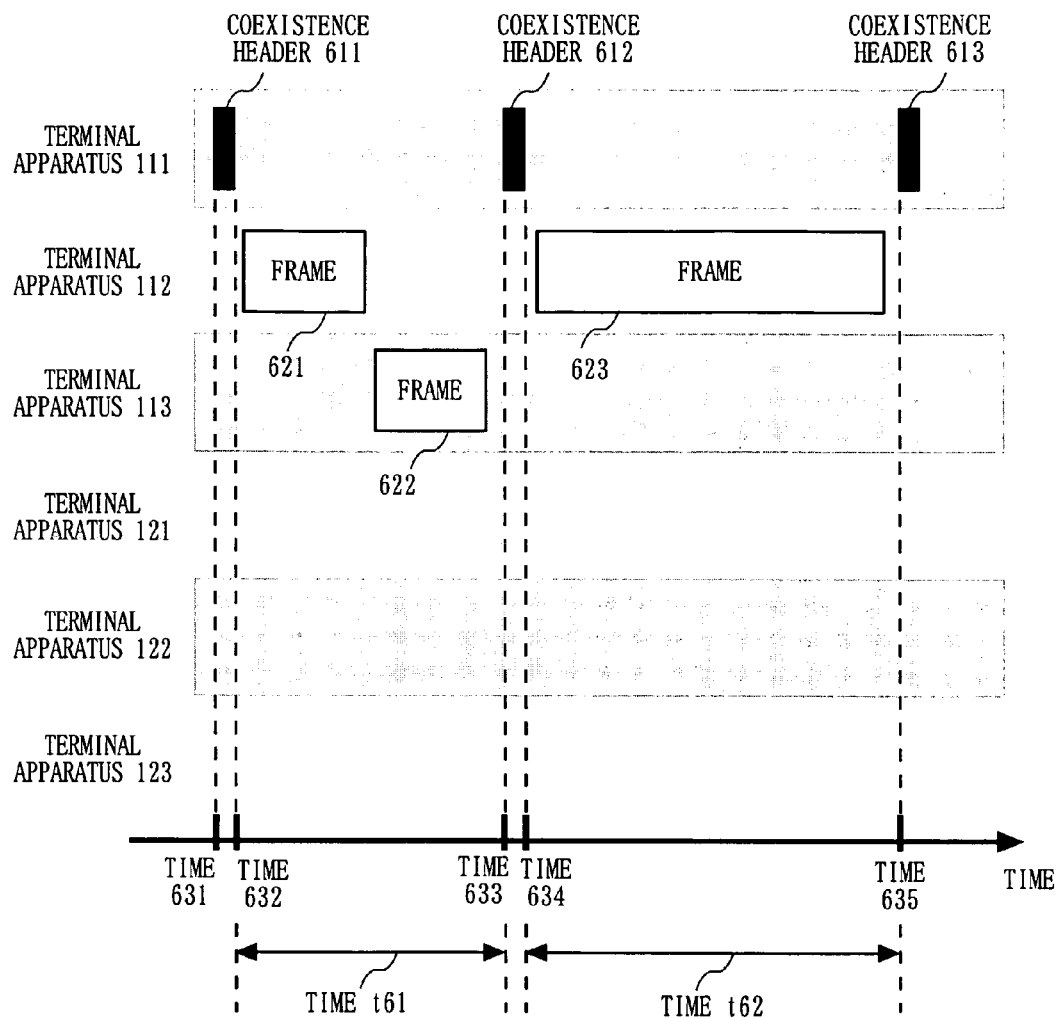
FIG. 14 is a timing chart showing an example of how a terminal apparatus of a third embodiment accesses the communication medium 101.

FIG. 14 is a timing chart showing an example of how the terminal apparatus of the third embodiment accesses the communication medium 101. In FIG. 14, transmission of a beacon is omitted.

Of the terminal apparatuses 111, 112 and 113 belonging to the communication system A, the terminal apparatus 111 is a coexistence control terminal and has a function of transmitting a preamble of the communication system B and a header of the communication system B including NAV (network allocation vector) information as a coexistence header. The NAV information indicates a time when the communication system B to be suppressed is used.

FIG. 15 is a diagram showing a data structure of the header of the communication system B, and particularly, a definition of a field relating to the NAV information included in the header. Note that FIG. 15 illustrates a bit width of each field, however, the bit width is not limited to that which is illustrated in FIG. 15. In the NAV field of the header, a time for which a terminal apparatus occupies the communication medium 101 if a terminal apparatus belonging to the communication system B (e.g., the terminal apparatus 121) transmits the header, is described. The terminal apparatus belonging to the communication system B refrains from transmitting a frame for the time described in the NAV field, assuming that the communication medium 101 is in the busy state. When transmitting the coexistence header, the communication control section 213 of the terminal apparatus 111 describes an intended time for which the communication system A occupies the communication medium 101 into the NAV field of the header of the communication system B, thereby suppressing the terminal apparatuses belonging to the communication network B from transmission. When it is intended that the communication system B is suppressed from transmission to the extent possible, the NAV information included in the coexistence header may be a maximum value which can be specified.

FIG. 16 is a diagram showing an exemplary value described in the NAV field having the format of FIG. 15. In FIG. 14, the terminal apparatus 111 belonging to the communication system A transmits a coexistence header at three times (611, 612, and 613). In FIG. 16, the NAV field values of the headers of the communication system B in the three coexistence headers are times t61, t62 and t63.

A description will be given of how each terminal apparatus utilizes the NAV information to access the communication medium 101 with reference to FIG. 14. At time 631, the terminal apparatus 111 belonging to the communication system A transmits the preamble of the communication system B and the header of the communication system B including the NAV information as a coexistence header 611. The time t61 is stored as NAV information in the header of the coexistence header 611. Therefore, the terminal apparatuses belonging to the communication system B are suppressed from transmission for the time t61 from time 632 at which transmission of the coexistence header 611 is completed. During the time t61, each terminal apparatus belonging to the communication system A executes a medium access control in accordance with a procedure defined in the communication system A. Thereby, in FIG. 14, frames 621 and 622 are transmitted.

At time 633 which is the time t61 after time 632, the terminal apparatus 111 transmits the preamble of the communication system B and the header of the communication system B including NAV information as a coexistence header 612 again. The header in the coexistence header 612 stores the time t62 as NAV information. Therefore, the terminal apparatuses belonging to the communication system B are suppressed from transmission for the time t62 from time 634 at which transmission of the coexistence header 612 is completed. Thereafter, with the same procedure as described above, the communication system A occupies the communication medium 101.

Figure 17:
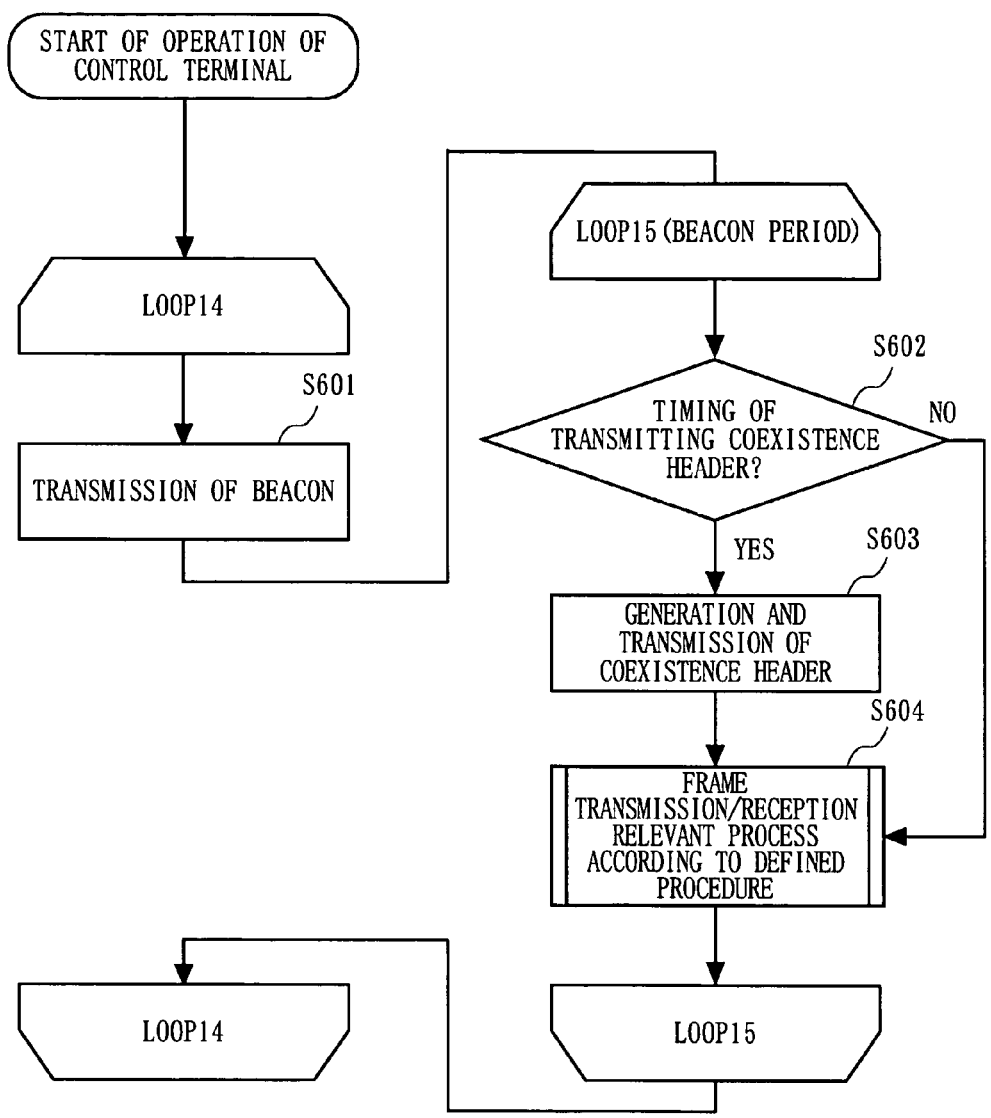
FIG. 17 is a flowchart showing an operation of a terminal apparatus functioning as a coexistence control terminal (the terminal apparatus 111 in the example of FIG. 14)

FIG. 17 is a flowchart showing an operation of a terminal apparatus functioning as a coexistence control terminal (the terminal apparatus 111 in the example of FIG. 14). The operation of the terminal apparatus functioning as a coexistence control terminal will be described with reference to FIG. 17. Note that details or the like of operation termination and frame transmission/reception of the coexistence control terminal, which are not related to the communication procedure of FIG. 14, are omitted in FIG. 17. Note that the operation of the coexistence control terminal in the third embodiment is similar to that of the control terminal in the first embodiment, except for a criterion in a step (step S602) of determining whether or not a timing of transmitting a coexistence header arrives, in FIG. 17.

When the operation of the coexistence control terminal is started, the coexistence control terminal starts a loop for transmitting a beacon (loop name: LOOP14). It is herein assumed that there is no termination condition for LOOP14. In fact, a certain termination condition is provided. Nevertheless, for the sake of brevity of the description of the operation of the present invention, it is assumed that no termination condition is provided for LOOP14.

In LOOP14, the communication control section 203 of the coexistence control terminal causes the frame transmission section 202 to transmit a beacon (step S601). After transmission of the beacon, the coexistence control terminal starts a loop for waiting for arrival of the next beacon period (loop name: LOOP15). A termination condition for LOOP15 is whether or not a beacon period arrives. When the beacon period arrives, the LOOP15 process is ended.

In LOOP15, the coexistence header transmission timing determination section 208 of the coexistence control terminal determines whether or not a time to transmit a coexistence header arrives (step S602). In step S602, the coexistence header transmission timing determination section 208 may determine whether or not the time to transmit a coexistence header arrives, in accordance with a predetermined rule or based on information designated in the beacon. Preferably, the coexistence header transmission timing determination section 208 may determine that a timing of transmitting the next coexistence header arrives within a network use time of the communication system B based on NAV information included in the coexistence header. To achieve this, it may be described in the predetermined rule that the timing of transmitting the next coexistence header arrives within the network use time of the communication system B based on NAV information included in the coexistence header. Further, it may be described in the information designated in the beacon that the timing of transmitting the next coexistence header arrives within the network use time of the communication system B based on NAV information included in the coexistence header.

When the time to transmit a coexistence header does not arrive, the communication control section 203 of the coexistence control terminal goes to an operation of step S604. On the other hand, when the time to transmit a coexistence header arrives, the communication control section 203 of the coexistence control terminal causes the coexistence header generation section 206 to generate a coexistence header and causes the coexistence header transmission section 207 to transmit the coexistence header thus generated (step S603), and goes to the operation of step S604. In step S603, the coexistence header generation section 206 generates the header of the communication system B including NAV information corresponding to the number of generations of a coexistence header in accordance with the list of FIG. 16 and combines the header with the preamble of the communication system B to generate a coexistence header.

In step S604, the communication control section 203 of the coexistence control terminal executes a process relating to frame transmission/reception in accordance with a defined procedure.

As a result, the coexistence control terminal transmits the header of the communication system B including NAV information within the beacon period.

Figure 18:
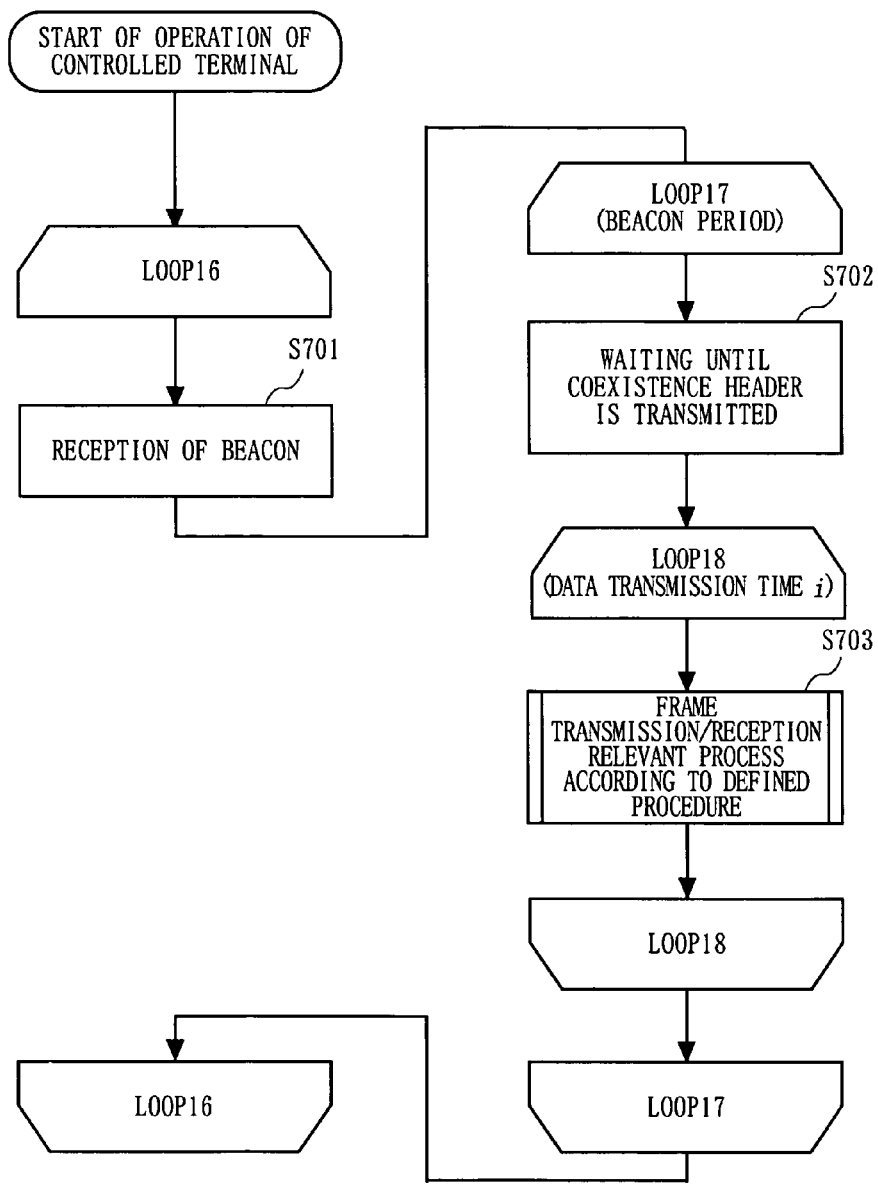
FIG. 18 is a flowchart showing an operation of a terminal apparatus functioning as a controlled terminal (the terminal apparatuses 112 and 113 in the example of FIG. 14)

FIG. 18 is a flowchart showing an operation of a terminal apparatus functioning as a controlled terminal (the terminal apparatuses 112 and 113 in the example of FIG. 14). Hereinafter, the operation of the terminal apparatus functioning as a controlled terminal will be described with reference to FIG. 18. Note that details or the like of operation termination and frame transmission/reception of the controlled terminal, which are not related to the communication procedure of FIG. 14, are omitted in FIG. 18.

When the operation of the controlled terminal is started, the controlled terminal starts a loop for receiving a beacon (loop name: LOOP16). It is herein assumed that there is no termination condition for LOOP16. In fact, a certain termination condition is provided. Nevertheless, for the sake of brevity of the description of the operation of the present invention, it is assumed that no termination condition is provided for LOOP16.

In LOOP16, the communication control section 203 of the controlled terminal receives the beacon received by the frame reception section 205 (step S701). When receiving the beacon, the communication control section 203 of the controlled terminal starts a loop for waiting for transmission of a coexistence header (loop name: LOOP17). A termination condition for LOOP17 is whether or not a beacon period arrives. When the beacon period arrives, the LOOP17 process is ended.

In LOOP17, the communication control section 203 of the controlled terminal waits until a time to transmit the coexistence header arrives (step S702). In step S702, the communication control section 203 may wait until the time to transmit the coexistence header arrives, in accordance with a predetermined rule or in accordance with information described in the beacon. When until the time to transmit the coexistence header arrives, the communication control section 203 of the controlled terminal starts a loop for executing a process relating to frame transmission/reception (loop name: LOOP18). A termination condition for LOOP18 is whether or not a data transmission time is elapsed. When the data transmission time is elapsed, the LOOP18 process is ended. Here, a data transmission/reception period refers to an elapsed time from transmission of a coexistence header by the coexistence control terminal (i.e., a time indicated by NAV information described in the header of the coexistence header). During the data transmission time, the terminal apparatuses belonging to the communication system B are suppressed from frame transmission, while only a terminal apparatus belonging to the communication system A can transmit a frame.

In LOOP18, the communication control section 203 of the controlled terminal executes a process relating to frame transmission/reception in accordance with a defined procedure (step S703).

In general, it is reasonably considered that a controlled terminal of the communication system A does not have a function of receiving and analyzing the header of the communication system B. Therefore, in this case, a control terminal needs to previously inform terminal apparatuses of a time to transmit a coexistence header with reference to timing information, such as a beacon or the like. To achieve this, a list of times to transmit a coexistence header may be described in a beacon as in the first embodiment (FIG. 4). When the data transmission time is ended, the communication control section 203 of the controlled terminal waits for reception of a coexistence header again (step S702). Thereafter, steps S702 to S703 are repeated until a beacon period is ended. When a beacon period arrives, the communication control section 203 of the controlled terminal waits for reception of a beacon transmitted by a coexistence control terminal again (step S701).

As described above, according to the third embodiment, a coexistence header whose transmission time is designated in the NAV field is transmitted as appropriate. Therefore, the terminal apparatuses belonging to the communication system B are suppressed from transmission at a designated time. Therefore, it can be expected that different communication systems coexist reliably.

Also in the third embodiment, the timing of transmitting a coexistence header may be informed by any terminal apparatus by using a beacon or by polling as in the first embodiment. In this case, all terminal apparatuses belonging to the communication system A do not have to have a function of receiving the preamble and header of the communication system B. At least one of the terminal apparatuses belonging to the communication system A may have a function of transmitting the preamble and header of the communication system B.

In LOOP18 of FIG. 18, a data transmission time is assumed to be an elapsed time from transmission of a coexistence header by the coexistence control terminal (i.e., a time indicated by NAV information described in the header of the coexistence header). A time at which measurement of the time indicated by NAV information is started is a time at which transmission of a coexistence header by the coexistence control terminal is completed. Alternatively, the time at which measurement of the time indicated by NAV information is started may be a time at which transmission of a coexistence header by the coexistence control terminal is started or a time which is a predetermined time after transmission of the coexistence header by the coexistence control terminal is completed, or may be other times.

Fourth Embodiment

In a fourth embodiment, a functional structure of a terminal apparatus belonging to the communication system A is similar to that of the first embodiment, and therefore, FIG. 2 is referenced. However, an operation of each block is different from that of the first embodiment as described below. In the fourth embodiment, the terminal apparatus belonging to the communication system A may have the functional blocks of FIGS. 8 and 9.

Figure 19:
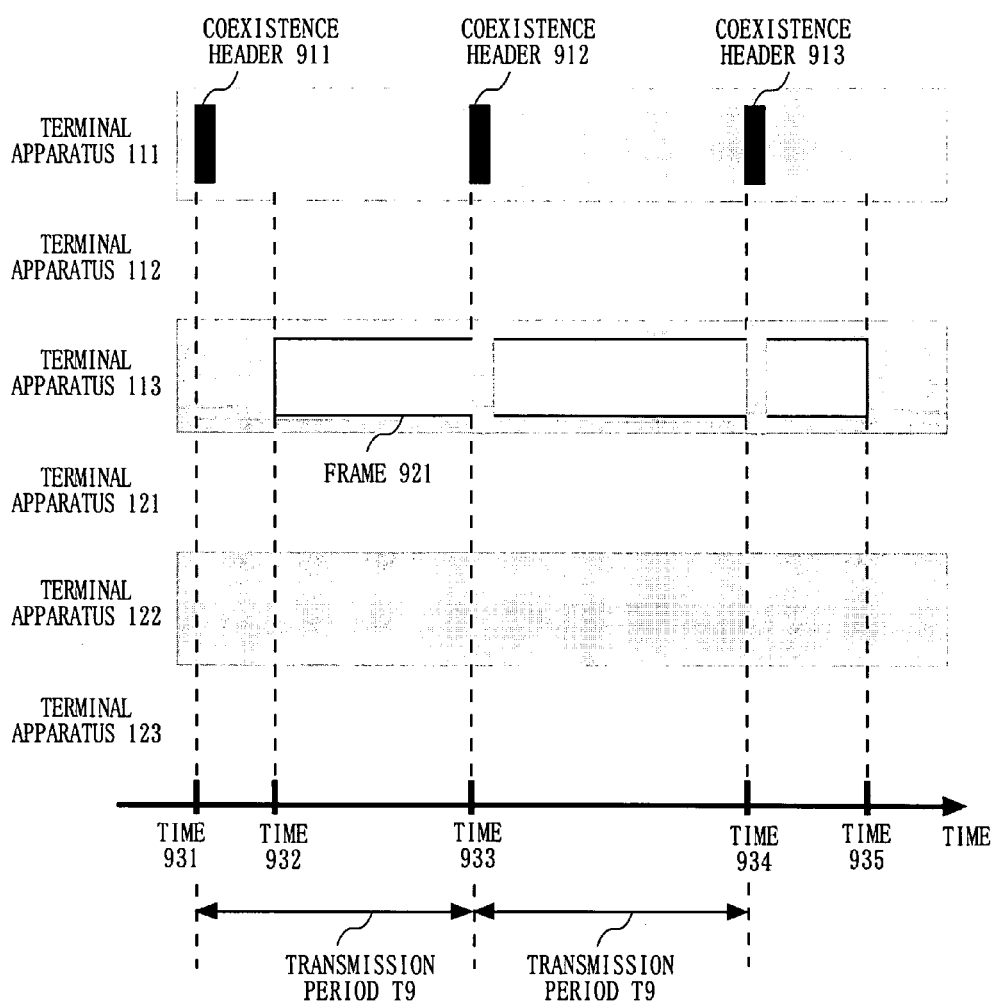
FIG. 19 is a timing chart showing an example of how a terminal apparatus of a fourth embodiment accesses the communication medium 101.

FIG. 19 is a timing chart showing an example of how the terminal apparatus of the fourth embodiment accesses the communication medium 101. In FIG. 19, transmission of a beacon is omitted.

Of the terminal apparatuses 111, 112 and 113 belonging to the communication system A, the terminal apparatus 111 is a coexistence control terminal and has a function of transmitting the preamble and header of the communication system B as a coexistence header at a constant period T9.

At time 931, the terminal apparatus 111 transmits a coexistence header 911. As a result, the terminal apparatuses belonging to the communication system B are suppressed from transmission until time 933 at which the next coexistence header 912 is transmitted. During this time, each terminal apparatus belonging to the communication system A executes a medium access control in accordance with a procedure defined in the communication system A. In FIG. 19, it is assumed that the terminal apparatus 113 starts transmitting a frame 921 at time 932.

A time required to transmit the frame 921 is longer than the coexistence header transmission period T9. In the first to third embodiments, a terminal apparatus of the communication system A has to divide a frame to be transmitted into frames having a size such that transmission of each divided frame is completed in a shorter time than a time required to transmit an adjacent coexistence header. However, by dividing a frame, the overhead of a frame header or the like is increased, resulting in a reduction in transfer efficiency.

In the fourth embodiment, a terminal apparatus of the communication system A transfers a frame without division. As a result, a reduction in transfer efficiency can be minimized. In the example of FIG. 19, when a time at which the terminal apparatus 111 transmits a coexistence header arrives, the terminal apparatus 113 suspends transmission of the frame 921, and after transmission of the coexistence header is completed, resumes transmission of the frame 921. At time 933, the terminal apparatus 111 transmits a coexistence header, the terminal apparatus 113 suspends transmission of the frame 921. After transmission of the coexistence header is completed, the terminal apparatus 113 resumes transmission of the frame 921. At the following time 934, the terminal apparatus 111 has to transmit a coexistence header again, and therefore, the terminal apparatus 113 suspends transmission of the frame 921 again. After transmission of the coexistence header is completed, the terminal apparatus 113 resumes transmission of the frame 921, which is ended at time 935.

Figure 20:
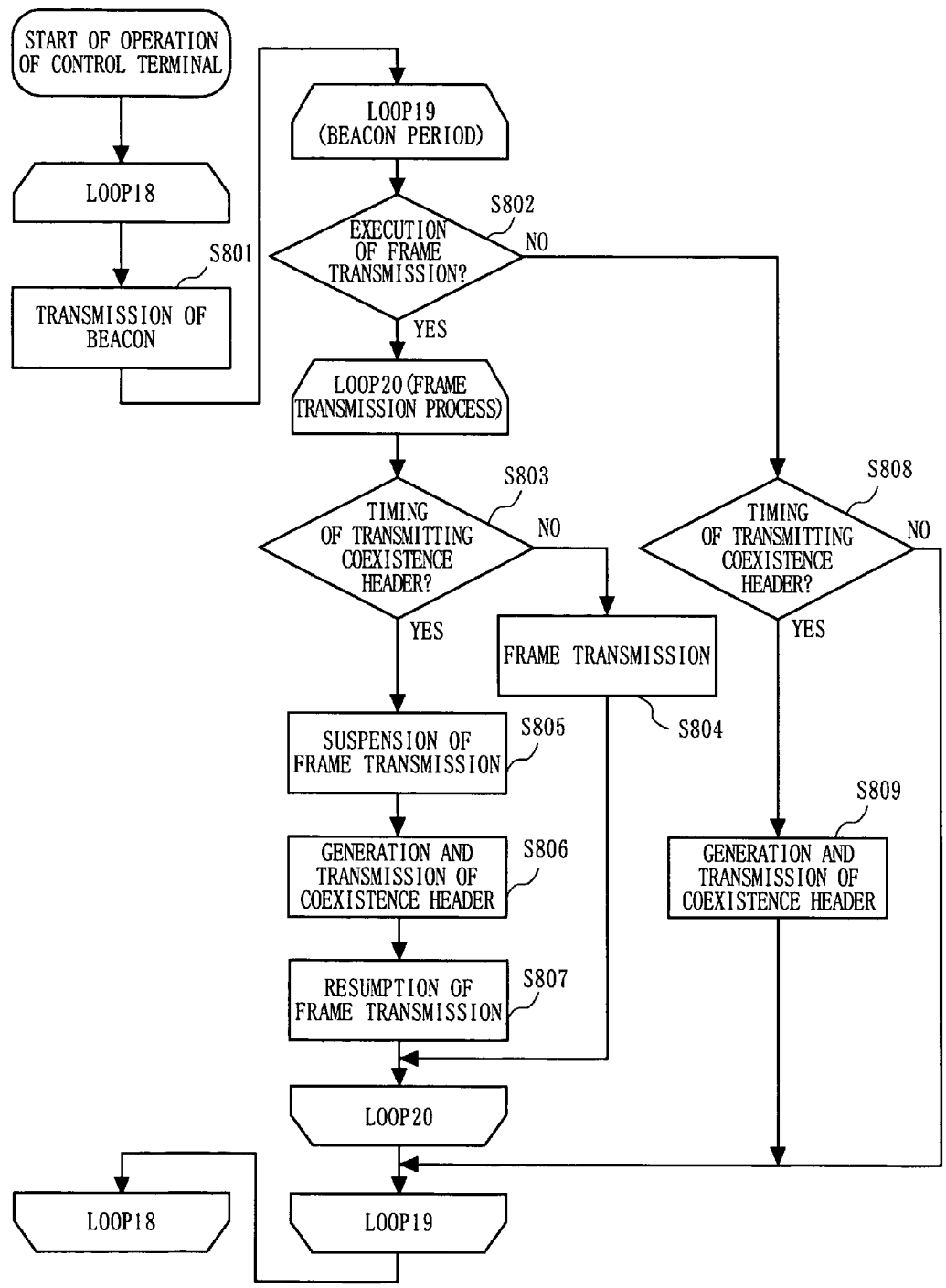
FIG. 20 is a flowchart showing an operation of a terminal apparatus functioning as a control terminal (the terminal apparatus 111 in the example of FIG. 19)

FIG. 20 is a flowchart showing an operation of a terminal apparatus functioning as a control terminal (the terminal apparatus 111 in the example of FIG. 19). Hereinafter, the operation of the terminal apparatus functioning as a control terminal will be described with reference to FIG. 20. Note that details or the like of operation termination and frame transmission/reception of the control terminal, which are not related to the communication procedure of FIG. 19, are omitted in FIG. 20.

When the operation of the control terminal is started, the control terminal starts a loop for transmitting a beacon (loop name: LOOP18). It is herein assumed that there is no termination condition for LOOP18. In fact, a certain termination condition is provided. Nevertheless, for the sake of brevity of the description of the operation of the present invention, it is assumed that no termination condition is provided for LOOP18.

In LOOP18, the communication control section 203 of the control terminal causes the frame transmission section 202 to transmit a beacon (step S801). After transmission of the beacon, the control terminal starts a loop for transmission of a frame and a coexistence header (loop name: LOOP19). A termination condition for LOOP19 is whether or not a beacon period arrives. When the beacon period arrives, the LOOP19 process is ended.

In LOOP19, the communication control section 203 of the control terminal determines whether or not to execute frame transmission (step S802). For example, the communication control section 203 of the control terminal may determine to execute frame transmission when there is data to be transmitted. Alternatively, the communication control section 203 of the control terminal may determine whether or not to execute frame transmission based on a priority or amount of the data to be transmitted, a delay time permitted before completion of transmission, information about transmission data possessed by other terminal apparatuses, or the like. Further, when an access timing is restricted by an access control, such as CSMA, TDMA or the like, the communication control section 203 of the control terminal should take into account information for restricting the access timing.

When executing frame transmission, the communication control section 203 of the control terminal starts a loop for transmitting a frame (loop name: LOOP20). A termination condition for LOOP20 is whether or not a data transmission time is elapsed. When the data transmission time is elapsed, the LOOP20 process is ended. Here, the data transmission time is a period until transmission of data to be transmitted is ended.

In LOOP20, initially, the coexistence header transmission timing determination section 208 of the control terminal determines whether or not a timing of transmitting a coexistence header arrives (step S803).

When the timing of transmitting a coexistence header does not arrive, the communication control section 203 of the control terminal causes the frame generation section 201 to frame data to be transmitted and causes the frame transmission section 202 to transmit the data (step S804). After step S804, the control terminal checks the termination condition for LOOP20, and when the termination condition is not satisfied, executes the operation of step S803 again.

On the other hand, when the timing of transmitting a coexistence header arrives, the communication control section 203 of the control terminal causes the frame transmission section 202 to suspend frame transmission (step S805). Next, the communication control section 203 causes the coexistence header generation section 206 to generate a coexistence header and causes the coexistence header transmission section 207 to transmit the generated coexistence header (step S806). Thereafter, the communication control section 203 of the control terminal causes the frame transmission section 202 to resume the suspended frame transmission (step S807), determines whether or not the termination condition for LOOP20 is satisfied, and returns to the operation of step S803.

When the termination condition for LOOP20 is satisfied, i.e., transmission of the frame to be transmitted is completed, the communication control section 203 of the control terminal determines whether or not the termination condition for LOOP19 is satisfied and returns to the operation of step S802.

When it is determined that frame transmission is not executed in step S802, the coexistence header transmission timing determination section 208 of the control terminal determines whether or not a timing of transmitting a coexistence header arrives (step S808). When the timing of transmitting a coexistence header arrives, the communication control section 203 of the control terminal transmits a coexistence header (step S809), determines whether or not the termination condition for LOOP19 is satisfied, and returns to the operation of step S802. On the other hand, when the timing of transmitting a coexistence header does not arrive, the communication control section 203 of the control terminal determines whether or not the termination condition for LOOP19 is satisfied and returns to the operation of step S802.

Figure 21:
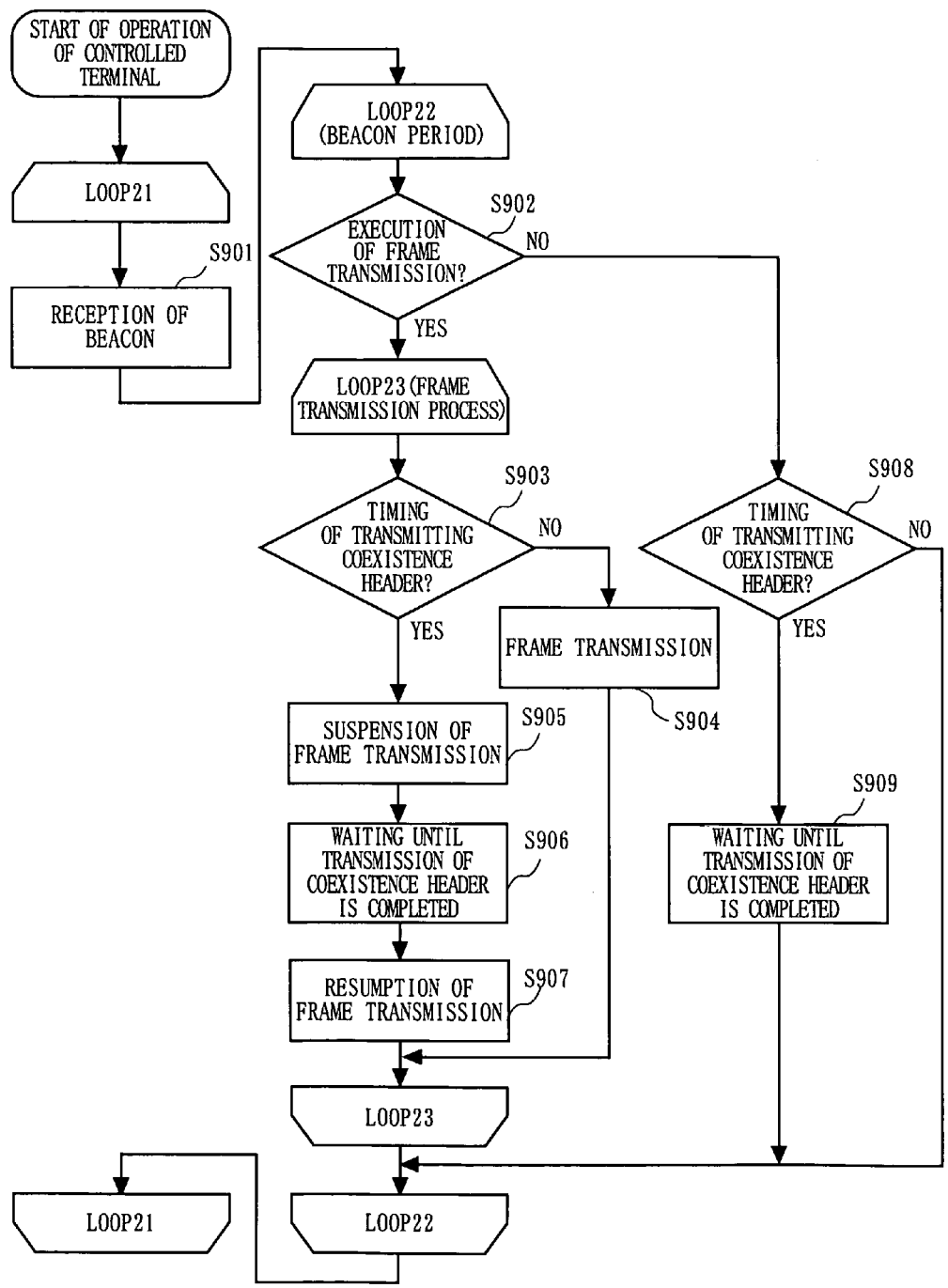
FIG. 21 is a flowchart showing an operation of a terminal apparatus functioning as a controlled terminal (the terminal apparatuses 112 and 113 in the example of FIG. 19)

FIG. 21 is a flowchart showing an operation of a terminal apparatus functioning as a controlled terminal (the terminal apparatuses 112 and 113 in the example of FIG. 19). Hereinafter, the operation of the terminal apparatus functioning as a controlled terminal will be described with reference to FIG. 21. Note that details or the like of operation termination and frame transmission/reception of the controlled terminal, which are not related to the communication procedure of FIG. 19, are omitted in FIG. 21.

When the operation of the controlled terminal is started, the controlled terminal starts a loop for receiving a beacon (loop name: LOOP21). It is herein assumed that there is no termination condition for LOOP21. In fact, a certain termination condition is provided. Nevertheless, for the sake of brevity of the description of the operation of the present invention, it is assumed that no termination condition is provided for LOOP21.

In LOOP21, the communication control section 203 of the controlled terminal receives the beacon received by the frame reception section 205 (step S901). When receiving the beacon, the communication control section 203 of the controlled terminal starts a loop for transmitting a frame (loop name: LOOP22). A termination condition for LOOP22 is whether or not a beacon period arrives. When the beacon period arrives, the LOOP22 process is ended.

In LOOP22, the communication control section 203 of the controlled terminal determines whether or not to execute frame execution (step S902). A criterion in step S902 is similar to that in step S802 of a coexistence control terminal.

When executing frame transmission, the communication control section 203 of the controlled terminal starts a loop for transmitting a frame (loop name: LOOP23). A termination condition for LOOP23 is whether or not a data transmission time is elapsed. When the data transmission time is elapsed, the LOOP23 process is ended. Here, the data transmission time is a period until transmission of data to be transmitted is ended.

In LOOP23, initially, the communication control section 203 of the controlled terminal determines whether or not a timing of transmitting a coexistence header arrives (step S903) In the fourth embodiment, a coexistence header is assumed to be periodically transmitted. The communication control section 203 of the controlled terminal determines, based on the period, whether or not the timing of transmitting a coexistence header arrives. Note that the timing of transmitting a coexistence header may be described in a beacon, and based on the information in the beacon, the communication control section 203 of the controlled terminal may determine whether or not the timing of transmitting a coexistence header arrives, as in the first or third embodiment.

When the timing of transmitting a coexistence header does not arrive, the communication control section 203 of the controlled terminal causes the frame generation section 201 to frame data to be transmitted and causes the frame transmission section 202 to transmit the data (step S904). After step S904, the controlled terminal checks the termination condition for LOOP23, and when the termination condition is not satisfied, executes the operation of step S903 again.

On the other hand, when the timing of transmitting a coexistence header arrives, the communication control section 203 of the controlled terminal causes the frame transmission section 202 to suspend frame transmission (step S905). Next, the communication control section 203 waits for completion of transmission of a coexistence header (step S906). After completion of the coexistence header transmission, the communication control section 203 of the controlled terminal causes the frame transmission section 202 to resume the suspended frame transmission (step S907), determines whether or not the termination condition for LOOP23 is satisfied, and returns to the operation of step S903.

When the termination condition for LOOP23 is satisfied, i.e., transmission of a frame to be transmitted is completed, the communication control section 203 of the controlled terminal determines that the termination condition for LOOP22 is satisfied and returns to the operation of step S902.

When it is determined that frame transmission is not executed in step S902, the communication control section 203 of the controlled terminal determines whether or not the timing of transmitting a coexistence header arrives (step S908). When the timing of transmitting a coexistence header arrives, the communication control section 203 of the controlled terminal waits for completion of transmission of a coexistence header (step S909), determines whether or not the termination condition for LOOP22 is satisfied, and returns to the operation of step S902. On the other hand, when the timing of transmitting a coexistence header does not arrive, the communication control section 203 of the controlled terminal determines whether or not the termination condition for LOOP22 is satisfied and returns to the operation of step S902.

As described above, according to the fourth embodiment, a size of a frame transmitted by the communication system A is not limited by a timing of transmitting a coexistence header. Therefore, a terminal apparatus of the communication system A can transmit a frame having a sufficiently large size, while the terminal apparatuses of the communication system B are suppressed from transmission. Therefore, different systems can coexist without a reduction in transfer efficiency.

Note that the step of informing the timing of transmitting a coexistence header is not described in the fourth embodiment for the sake of brevity. In the fourth embodiment, the timing of transmitting a coexistence header is periodic. Therefore, each terminal apparatus can recognize the transmission timing without being informed of the transmission timing from other terminal apparatuses. However, the period of the transmission timing may be variable. Therefore, also in the fourth embodiment, the timing of transmitting a coexistence header may be informed by any terminal apparatus by using a beacon or by polling, as in the first embodiment. In this case, all terminal apparatuses belonging to the communication system A do not have to have a function of receiving the preamble and header of the communication system B. At least one of the terminal apparatuses belonging to the communication system A may have a function of transmitting the preamble and header of the communication system B.

In the fourth embodiment, the coexistence control terminal is assumed to transmit a coexistence header periodically. Therefore, in steps S803 and S808, it is determined whether or not the timing of transmitting a coexistence header arrives, based on whether or not a period of transmitting a coexistence header arrives.

Also in the fourth embodiment, as indicated in the first and third embodiments, the timing of transmitting a coexistence header may be described in a beacon. In this case, although the coexistence control terminal does not necessarily have to transmit a coexistence header at a constant period, each terminal apparatus can recognize the timing of transmitting a coexistence header.

Fifth Embodiment

In a fifth embodiment, a functional structure of a terminal apparatus belonging to the communication system A is similar to that of the first embodiment, and therefore, FIG. 2 is referenced. However, an operation of a terminal apparatus of the fifth embodiment is different from that of the first embodiment as described below. In the fifth embodiment, the terminal apparatus belonging to the communication system A may have the functional blocks of FIGS. 8 and 9.

Figure 22:
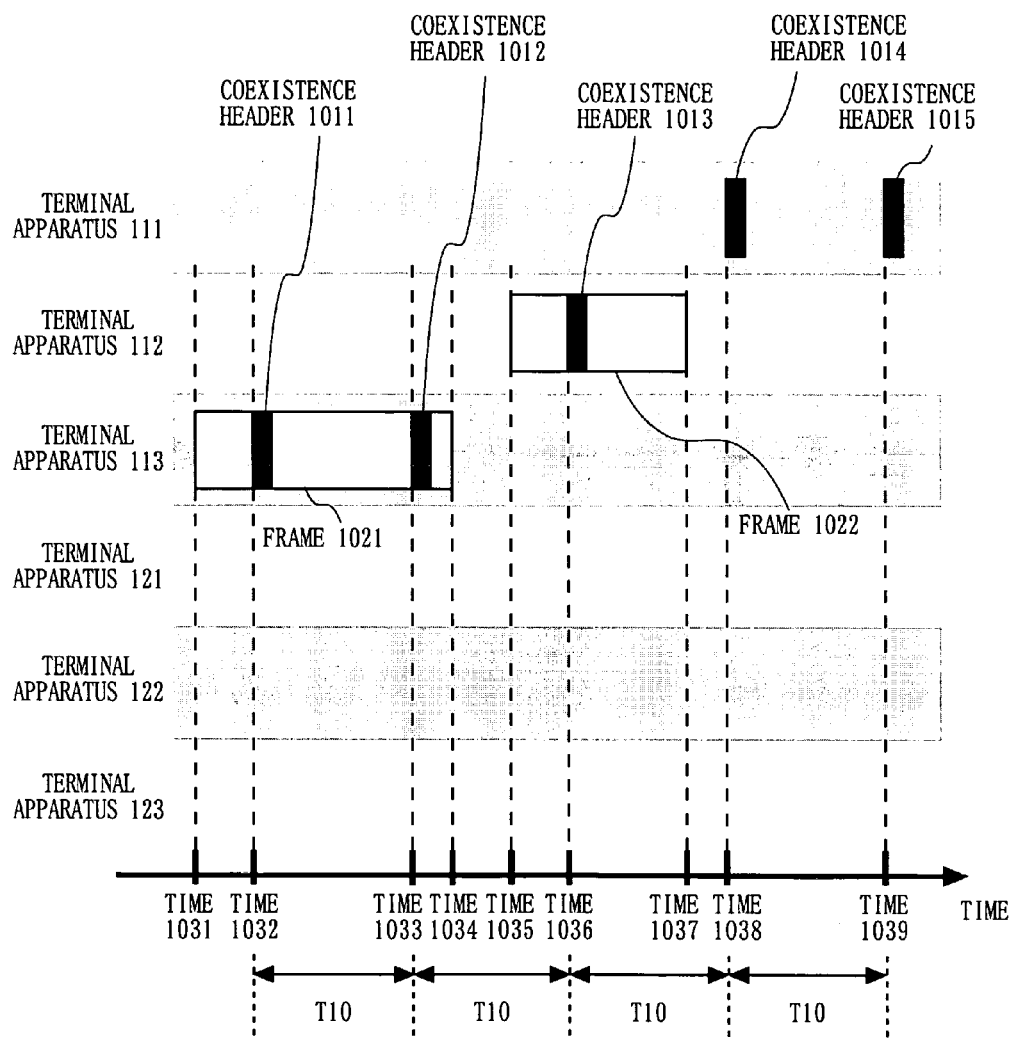
FIG. 22 is a timing chart showing an example of how a terminal apparatus of a fifth embodiment accesses the communication medium 101.

FIG. 22 is a timing chart showing an example of how the terminal apparatus of the fifth embodiment accesses the communication medium 101. In FIG. 22, beacon transmission is omitted.

In the fifth embodiment, all terminal apparatuses belonging to the communication system A have a function of transmitting the preamble and header of the communication system B as a coexistence header. In the communication system A of the fifth embodiment, the coexistence header is transmitted every constant period T10. Every time the constant period T10 arrives, any one of the terminal apparatuses of the communication system A is determined as a terminal apparatus which transmits a coexistence header, and the determined terminal apparatus transmits the coexistence header.

Hereinafter, a description will be given of how the terminal apparatus of the fifth embodiment accesses the communication medium 101 with reference to FIG. 22.

At time 1031, the terminal apparatus 113 starts transmitting a frame 1021 as a result of a medium access control in accordance with a procedure defined in the communication system A. During transmission of the frame 1021, when a time to transmit a coexistence header arrives at time 1032, the terminal apparatus 113 transmits a coexistence header 1011. Since the terminal apparatus 113 transmits the coexistence header 1011, the terminal apparatus 111 does not transmit a coexistence header. After completion of transmission of the coexistence header 1011, the terminal apparatus 113 resumes transmission of the frame 1021.

At time 1033, if the timing of transmitting a coexistence header arrives again, the terminal apparatus 113 suspends transmission of the frame 1021 and transmits a coexistence header 1012. After completion of transmission of the coexistence header 1012, the terminal apparatus 113 resumes transmission of the frame 1021. At time 1034, the terminal apparatus 113 completes transmission of the frame 1021.

The terminal apparatus 112 starts transmission of a frame 1022 at time 1035 as a result of a medium access control in accordance with a procedure defined in the communication system A. At time 1036, if the timing of transmitting a coexistence header arrives again, the terminal apparatus 112 suspends transmission of the frame 1022 and transmits a coexistence header 1013. After completion of transmission of the coexistence header 1013, the terminal apparatus 112 resumes transmission of the frame 1022. The transmission of the frame 1022 is completed at time 1037.

It is assumed that the timing of transmitting a coexistence header arrives at time 1038. At this time, there is no terminal apparatus which transmits a frame, and therefore, the terminal apparatus 111 itself transmits a coexistence header. Thereafter, at time 1039, the timing of transmitting a coexistence header arrives. However, there is no terminal apparatus which transmits a frame, and therefore, the terminal apparatus 111 itself transmits a coexistence header.

Figure 23:
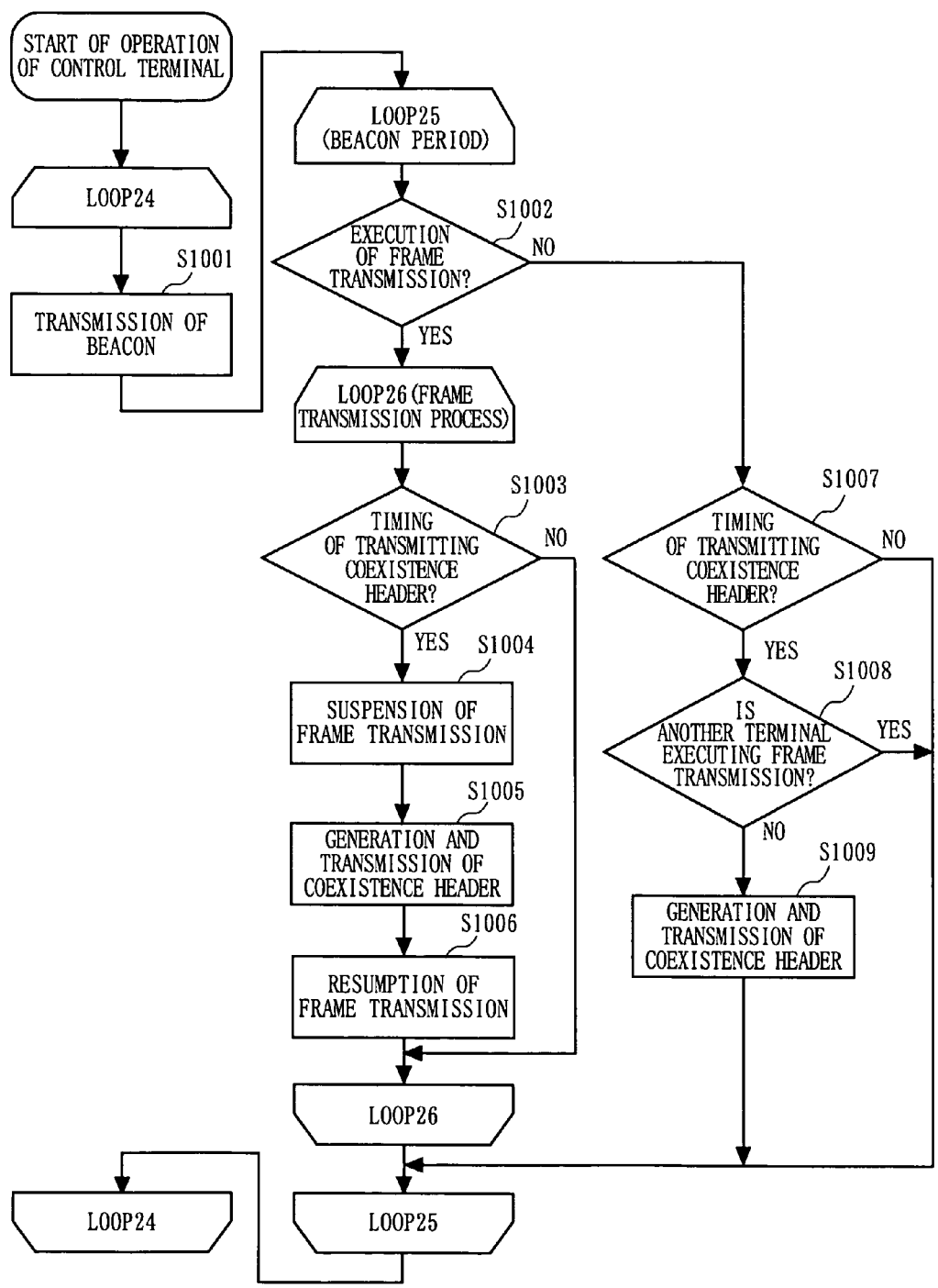
FIG. 23 is a flowchart showing an operation of a terminal apparatus functioning as a control terminal (the terminal apparatus 111 in the example of FIG. 22)

FIG. 23 is a flowchart showing an operation of a terminal apparatus functioning as a control terminal (the terminal apparatus 111 in the example of FIG. 22). Hereinafter, the operation of the terminal apparatus functioning as a control terminal will be described with reference to FIG. 23. Note that details or the like of operation termination and frame transmission/reception of the control terminal, which are not related to the communication procedure of FIG. 22, are omitted in FIG. 23.

When the operation of the control terminal is started, the control terminal starts a loop for transmitting a beacon (loop name: LOOP24). It is herein assumed that there is no termination condition for LOOP24. In fact, a certain termination condition is provided. Nevertheless, for the sake of brevity of the description of the operation of the present invention, it is assumed that no termination condition is provided for LOOP24.

In LOOP24, the communication control section 203 of the control terminal causes the frame transmission section 202 to transmit a beacon (step S1001). After transmission of the beacon, the control terminal starts a loop for transmission of a frame and a coexistence header (loop name: LOOP25). A termination condition for LOOP25 is whether or not a beacon period arrives. When the beacon period arrives, the LOOP25 process is ended. Note that the control terminal is assumed to execute frame transmission/reception in accordance with a defined procedure.

In LOOP25, the communication control section 203 of the control terminal determines whether or not frame transmission is being executed (step S1002). When frame transmission is not being executed, the coexistence header transmission timing determination section 208 of the control terminal determines whether or not the timing of transmitting a coexistence header arrives (step S1007). When the timing of transmitting a coexistence header arrives, the communication control section 203 of the control terminal determines whether or not another terminal apparatus is transmitting a frame (step S1008). When no other terminal apparatuses are transmitting a frame, the communication control section 203 of the control terminal causes the coexistence header generation section 206 to produce a coexistence header, causes the coexistence header transmission section 207 to transmit the coexistence header (step S1009), and returns to an operation of step S1002. On the other hand, when it is determined that the timing of transmitting a coexistence header does not arrive in step S1007, the communication control section 203 of the control terminal returns to the head of LOOP25 without a process. In step S1008, when another terminal apparatus is being transmitting a frame, the communication control section 203 of the control terminal returns to the head of LOOP25 without a process.

In step S1002, when it is determined that frame transmission is being executed, the control terminal starts a loop for transmitting a coexistence header (loop name: LOOP26). A termination condition for LOOP26 is whether or not a data transmission time is elapsed. When the data transmission time is elapsed, the LOOP26 process is ended. Here, the data transmission time is a period until transmission of data to be transmitted is ended.

In LOOP26, initially, the coexistence header transmission timing determination section 208 of the control terminal determines whether or not a timing of transmitting a coexistence header arrives (step S1003). A termination condition for LOOP26 is whether or not a data transmission time is elapsed. When the data transmission time is elapsed, the LOOP26 process is ended. Here, the data transmission time is a period until transmission of data to be transmitted is ended.

When the timing of transmitting a coexistence header does not arrive, the control terminal continues frame transmission and returns to the head of LOOP26.

On the other hand, when the timing of transmitting a coexistence header arrives, the communication control section 203 of the control terminal causes the frame transmission section 202 to suspend frame transmission (step S1004). Next, the communication control section 203 of the control terminal causes the coexistence header generation section 206 to generate a coexistence header and causes the coexistence header transmission section 207 to transmit the generated coexistence header (step S1005). When transmission of the coexistence header is completed, the communication control section 203 of the control terminal resumes the suspended frame transmission (step S1006) and returns to the head of LOOP26.

Thus, when the timing of transmitting a coexistence header arrives while the control terminal itself is transmitting a frame, the control terminal suspends frame transmission to transmit a coexistence header. When transmission of the coexistence header is completed, the control terminal resumes frame transmission. Also, if the timing of transmitting a coexistence header arrives while no terminal apparatuses execute frame transmission, the control terminal transmits a coexistence header.

Figure 24:
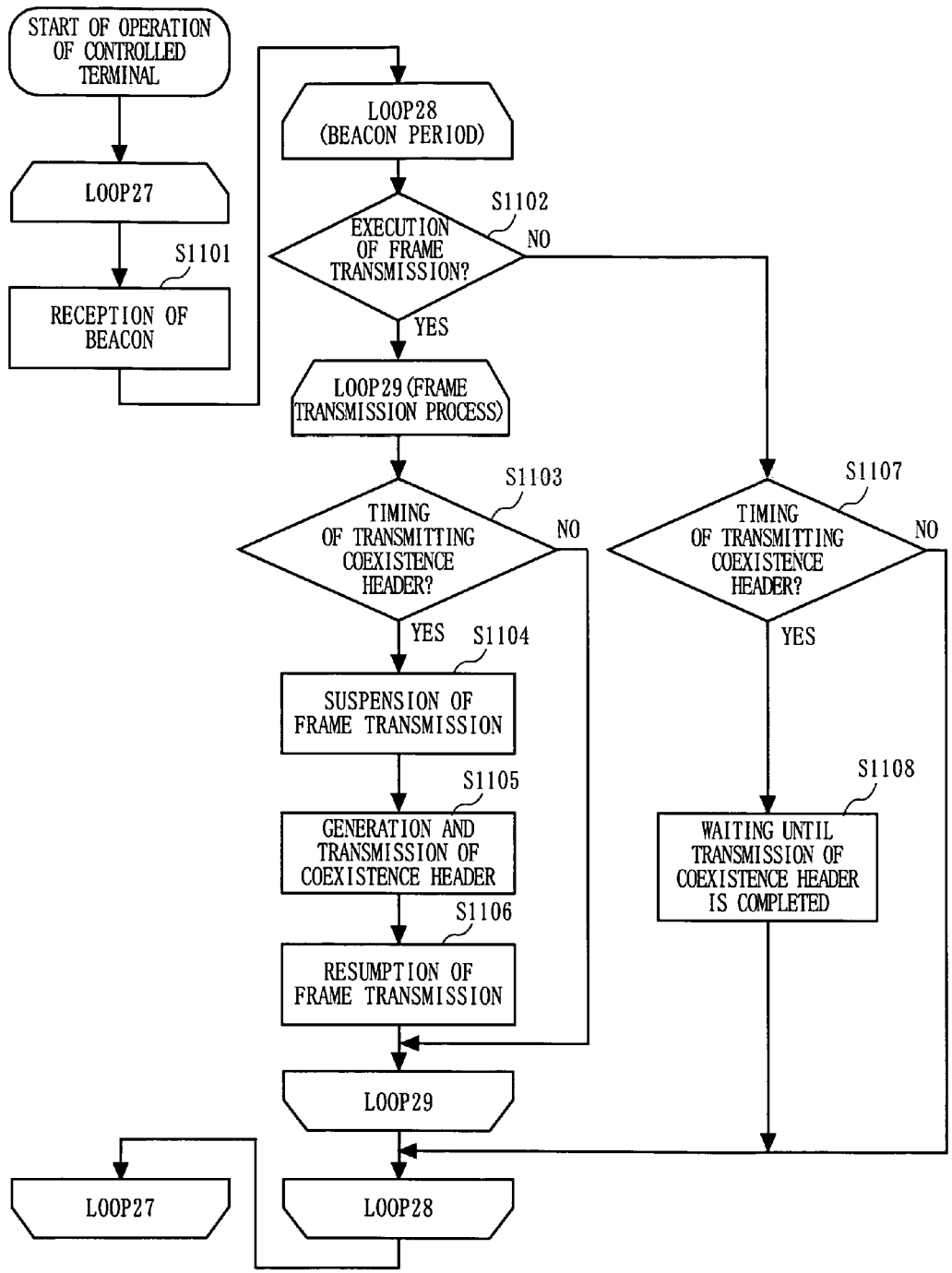
FIG. 24 is a flowchart showing an operation of a terminal apparatus functioning as a controlled terminal (the terminal apparatuses 112 and 113 in the example of FIG. 22)

FIG. 24 is a flowchart showing an operation of a terminal apparatus functioning as a controlled terminal (the terminal apparatuses 112 and 113 in the example of FIG. 22). Hereinafter, the operation of the terminal apparatus functioning as a controlled terminal will be described with reference to FIG. 24. Note that details or the like of operation termination and frame transmission/reception of the controlled terminal, which are not related to the communication procedure of FIG. 22, are omitted in FIG. 24.

When the operation of the controlled terminal is started, the controlled terminal starts a loop for receiving a beacon (loop name: LOOP27). It is herein assumed that there is no termination condition for LOOP27. In fact, a certain termination condition is provided. Nevertheless, for the sake of brevity of the description of the operation of the present invention, it is assumed that no termination condition is provided for LOOP27.

In LOOP27, the communication control section 203 of the controlled terminal receives a beacon received by the frame reception section 205 (step S1101). When receiving the beacon, the communication control section 203 of the controlled terminal starts a loop for transmitting a frame (loop name: LOOP28). A termination condition for LOOP22 is whether or not a beacon period arrives. When the beacon period arrives, the LOOP28 process is ended.

In LOOP28, the communication control section 203 of the controlled terminal determines whether or not frame transmission is being executed (step S1102). When frame transmission is not being executed, the coexistence header transmission timing determination section 208 of the controlled terminal determines whether or not the timing of transmitting a coexistence header arrives (step S1107). When the timing of transmitting a coexistence header arrives, the communication control section 203 of the controlled terminal waits until transmission of the coexistence header is completed (step S1108) and returns to the head of LOOP28. On the other hand, when the timing of transmitting a coexistence header does not arrive, the communication control section 203 of the controlled terminal returns to the head of LOOP28 without a process.

In step S1102, when it is determined that frame transmission is being executed, the controlled terminal starts a loop for transmitting a coexistence header (loop name: LOOP29). A termination condition for LOOP29 is whether or not a data transmission time is elapsed. When the data transmission time is elapsed, the LOOP29 process is ended. Here, the data transmission time is a period until transmission of data to be transmitted is ended.

In LOOP29, initially, the coexistence header transmission timing determination section 208 of the controlled terminal determines whether or not the timing of transmitting a coexistence header arrives (step S1103).

When the timing of transmitting a coexistence header arrives, the controlled terminal continues frame transmission and returns to the head of LOOP29.

On the other hand, when the timing of transmitting a coexistence header arrives, the communication control section 203 of the control terminal causes the frame transmission section 202 to suspend frame transmission (step S1104). Next, the communication control section 203 of the control terminal causes the coexistence header generation section 206 to generate a coexistence header and causes the coexistence header transmission section 207 to transmit the generated coexistence header (step S1105). When transmission of the coexistence header is completed, the communication control section 203 of the control terminal resumes the suspended frame transmission (step S1106) and returns to the head of LOOP26.

As a result, not only the control terminal but also the controlled terminal transmit a coexistence header when the timing of transmitting a coexistence header arrives during frame transmission. Further, the controlled terminal does not transmit a coexistence header even if the timing of transmitting a coexistence header arrives when frame transmission is not executed. In this case, the coexistence header is transmitted by a control terminal or another controlled terminal which is executing frame transmission.

As described above, according to the fifth embodiment, a terminal apparatus of the communication system A which is executing frame transmission transmits a coexistence header. Therefore, the timing of suspending frame transmission of the communication system A and the timing of resuming frame transmission can be accurately synchronized with the timing of transmitting a coexistence header. Therefore, a frame size in the communication system A is not limited by the timing of transmitting a coexistence header. Therefore, a terminal apparatus of the communication system A can stably transmit a frame having a sufficiently large size. Thus, different communication systems can exist while minimizing a reduction in transfer efficiency and achieving high efficiency.

Note that the step of informing the timing of transmitting a coexistence header is not described in the fifth embodiment for the sake of brevity. In the fifth embodiment, the timing of transmitting a coexistence header is periodic. Therefore, each terminal apparatus can recognize the transmission timing without being informed of the transmission timing from other terminal apparatuses. However, the period of the transmission timing may be variable. Therefore, also in the fifth embodiment, the timing of transmitting a coexistence header may be informed by any terminal apparatus by using a beacon or by polling, as in the first embodiment. In this case, all terminal apparatuses belonging to the communication system A do not have to have a function of receiving the preamble and header of the communication system B. At least one of the terminal apparatuses belonging to the communication system A may have a function of transmitting the preamble and header of the communication system B.

Sixth Embodiment

In a sixth embodiment, a functional structure of a terminal apparatus belonging to the communication system A is similar to that of the first embodiment, and therefore, FIG. 2 is referenced. However, an operation of a terminal apparatus of the sixth embodiment is different from that of the first embodiment as described below. In the sixth embodiment, the terminal apparatus belonging to the communication system A may have the functional blocks of FIGS. 8 and 9.

Figure 25:
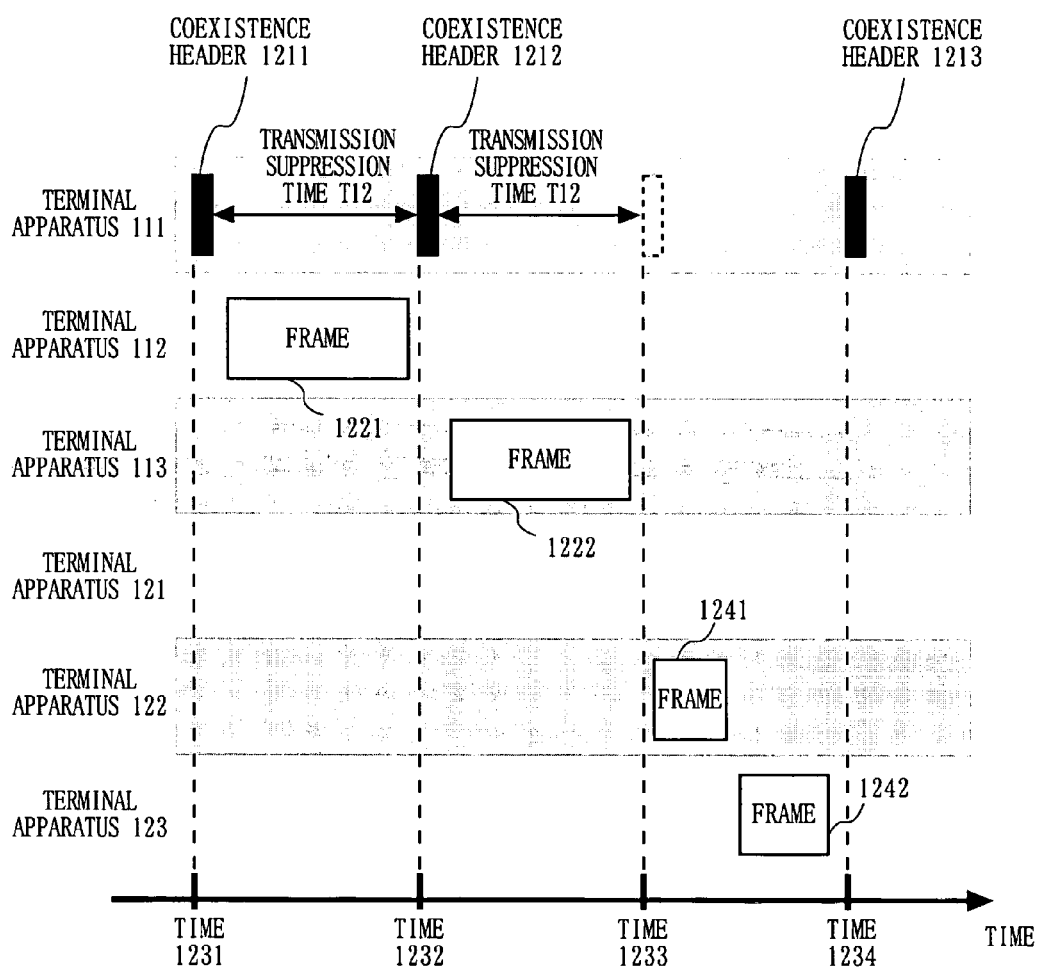
FIG. 25 is a timing chart showing an example of how a terminal apparatus of a sixth embodiment accesses the communication medium 101.

FIG. 25 is a timing chart showing an example of how the terminal apparatus of the sixth embodiment accesses the communication medium 101. In FIG. 25, transmission of a beacon is omitted.

In the sixth embodiment, of the terminal apparatuses 111, 112 and 113 belonging to the communication system A, the terminal apparatus 111 is assumed to be a control terminal.

The coexistence header transmission section 207 of the control terminal has a function of transmitting the preamble of the communication system B and the header of the communication system B including NAV information as a coexistence header. The frame reception section 205 of the control terminal has a function of receiving the preamble and header of the communication system B. The communication control section 203 of the control terminal has a function of analyzing the preamble and header of the communication system B received by the frame reception section 205 to extract the NAV information. The communication control section 203 of the control terminal causes the coexistence header generation section 206 to generate a coexistence header based on the NAV information included in the header of the communication system B in a manner such that the terminal apparatuses belonging to the communication system B are suppressed from transmission continuously for a time T12 at maximum, and causes the coexistence header transmission section 207 to transmit the coexistence header.

The terminal apparatuses 112 and 113 are controlled terminals which are controlled by the terminal apparatus 111. The frame reception section 205 of the controlled terminal has a function of detecting the preamble and header of the communication system B. The communication control section 203 of the controlled terminal has a function of determining whether or not the preamble and header of the communication system B detected by the frame reception section 205 has been transmitted by the control terminal. As a result, the communication control section 203 of the control terminal can determine whether or not the communication medium 101 is occupied by a terminal apparatus of the communication system B.

Hereinafter, a description will be given of how the terminal apparatus of the sixth embodiment accesses the communication medium 101 with reference to FIG. 25.

At time 1231, the terminal apparatus 111 transmits a coexistence header 1211. Here, the terminal apparatus 111 sets a time T12 which is a maximum value of NAV information to the header of the communication system B in the coexistence header 1211. Thereby, the terminal apparatuses belonging to the communication system B are suppressed from frame transmission to a maximum extent. As a result, the terminal apparatuses belonging to the communication system B are suppressed from transmission until time 1232 (for the time T12). Thereafter, when transmitting any coexistence header, the terminal apparatus 111 sets NAV information indicating the maximum value to the coexistence header. As a result, the transfer efficiency of the communication system A is increased. Further, a header having the same contents only needs to be always included in a coexistence header, so that the coexistence header generation section 206 of the control terminal can have a simple structure. Specifically, the coexistence header generation section 206 of the control terminal may previously store one or more patterns of coexistence headers in a ROM or the like and the coexistence header transmission section 207 may transmit the stored coexistence header. For the time T12 after completion of transmission of a coexistence header, a terminal apparatus of the communication system A executes a medium access control in accordance with a procedure defined in the communication system A.

In the example of FIG. 25, the terminal apparatus 112 is assumed to transmit a frame 1221. At the following time 1232, the terminal apparatus 111 transmits a coexistence header 1212 in which NAV information indicating the maximum value (the time T12) again. As a result, the terminal apparatuses belonging to the communication system B are suppressed from transmission until time 1233 (for the time T12). During this time, a terminal apparatus of the communication system A executes a medium access control in accordance with a procedure defined in the communication system A. As a result, the terminal apparatus 113 transmits a frame 1222.

At time 1233, the terminal apparatuses belonging to the communication system B are no longer suppressed from transmission. In order that the communication system A continues to occupy the communication medium 101, the terminal apparatus 111 needs to transmit a coexistence header again. However, it is here assumed that the terminal apparatus 111 does not transmit a coexistence header. Thereby, a terminal apparatus can access the communication medium 101 no matter whether it belongs to the communication system A or B. In FIG. 25, it is assumed that the terminal apparatuses 122 and 123 of the communication system B succeed in transmitting frames 1241 and 1242.

As described above, the control terminal is assumed to be able to receive the preamble and header of the communication system B. Therefore, the terminal apparatus 111 can monitor the frames 1241 and 1242 transmitted from the terminal apparatuses 122 and 123. Therefore, the terminal apparatus 111 can recognize a time at which transmission of the frames 1241 and 1242 is completed. At time 1234 when transmission of the frame 1242 is completed, the terminal apparatus 111 transmits a coexistence header 1213. Thereby, the communication medium 101 is occupied by a terminal apparatus of the communication system A again.

Note that there is a possibility that a terminal apparatus belonging to the communication system B transmits a preamble and a header before and after time 1234. Therefore, in order to increase the probability that a terminal apparatus of the communication system A can occupy the communication medium 101, the terminal apparatus 111 may transmit a coexistence header after the terminal apparatus 123 completes transmission of the frame 1242 and before a gap time after frame transmission which is defined in the communication system B is elapsed. Alternatively, the terminal apparatus 111 may transmit a coexistence preamble with a timing having a highest priority defined in the communication system B after a time at which the terminal apparatus 123 completes transmission of the frame 1242. As a result, the possibility that a coexistence header is transmitted before a terminal apparatus belonging to the communication system B transmits a preamble and a header.

Figure 26:
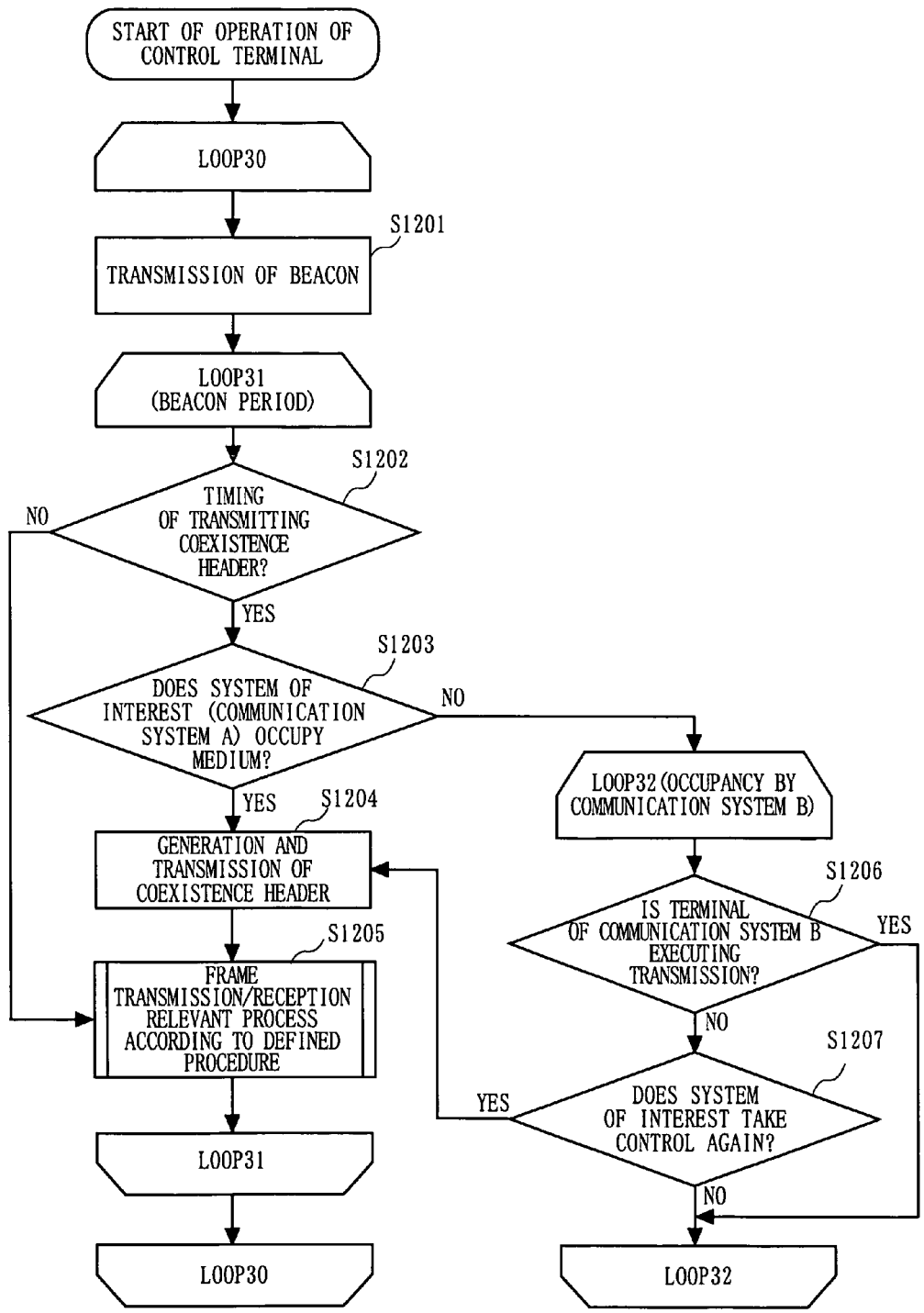
FIG. 26 is a flowchart showing an operation of a terminal apparatus functioning as a control terminal (the terminal apparatus 111 in the example of FIG. 25)

FIG. 26 is a flowchart showing an operation of a terminal apparatus functioning as a control terminal (the terminal apparatus 111 in the example of FIG. 25). Hereinafter, the operation of the terminal apparatus functioning as a control terminal will be described with reference to FIG. 26. Note that details or the like of operation termination and frame transmission/reception of the control terminal, which are not related to the communication procedure of FIG. 25, are omitted in FIG. 26.

When the operation of the control terminal is started, the control terminal starts a loop for transmitting a beacon (loop name: LOOP30). It is herein assumed that there is no termination condition for LOOP30. In fact, a certain termination condition is provided. Nevertheless, for the sake of brevity of the description of the operation of the present invention, it is assumed that no termination condition is provided for LOOP30.

In LOOP30, the communication control section 203 of the control terminal causes the frame transmission section 202 to transmit a beacon (step S1201). After transmission of the beacon, the control terminal starts a loop for transmission of a frame and a coexistence header (loop name: LOOP31). A termination condition for LOOP31 is whether or not a beacon period arrives. When the beacon period arrives, the LOOP31 process is ended.

In LOOP31, the coexistence header transmission timing determination section 208 of the control terminal determines whether or not a timing of transmitting a coexistence header arrives (step S1202). When the timing of transmitting a coexistence header does not arrive, the communication control section 203 of the control terminal executes a process relating to frame transmission/reception in accordance with a defined procedure (step S1205) and returns to the LOOP31. On the other hand, when the timing of transmitting a coexistence header arrives, the communication control section 203 of the control terminal goes to an operation of step S1203. Note that the timing of transmitting a coexistence header includes a time which is immediately after transmission of a beacon and a time which is the time T12 after transmission of a coexistence header. Therefore, first determination in step S1202 which is performed immediately after transmission of a beacon is inevitably positive.

In step S1203, the communication control section 203 of the control terminal determines whether or not the communication system A should occupy the communication medium 101 (step S1203). The criterion for step S1203 is not particularly limited. For example, the communication control section 203 of the control terminal may always determine that the communication system A should occupy the communication medium 101 when a predetermined condition (a condition relating to a time, a condition relating to a communication situation, etc.) is satisfied. Alternatively, the communication control section 203 of the control terminal may determines that the communication system A should occupy the communication medium 101 when the terminal of interest or another terminal apparatus belonging to the communication system A has data to be transmitted. Note that the control terminal can recognize whether or not another terminal apparatus has data to be transmitted, by, for example, being informed by the other terminal apparatus.

When the communication system A should occupy the communication medium 101, the communication control section 203 of the control terminal causes the coexistence header generation section 206 to generate a coexistence header and causes the coexistence header transmission section 207 to transmit the coexistence header (step S1204), and goes to the operation of step S1205. The coexistence header transmitted in step S1204 is set to have the time T12 which is the maximum value of NAV information, and therefore, the terminal apparatuses belonging to the communication system B are suppressed from communication for the time T12. During the suppression, a terminal apparatus of the communication system A executes a frame transmission/reception process (step S1205).

On the other hand, when the communication system A should not occupy the communication medium 101, the communication control section 203 of the control terminal starts a loop for determining whether or not the communication system A takes the occupancy of the communication medium 101 again from the communication system B (loop name: LOOP32).

In LOOP32, the communication control section 203 of the control terminal analyzes the preamble and header of the communication system B detected by the frame reception section 205 to determine whether or not a terminal apparatus of the communication system B is executing frame transmission (step S1206). When the terminal apparatus of the communication system B is executing frame transmission, the control terminal returns to the head of LOOP32. On the other hand, when the terminal apparatus of the communication system B is not executing frame transmission, the communication control section 203 of the control terminal determines whether or not the communication system A occupies the communication medium 101 again (step S1207). A criterion for step S1207 is similar to that of step S1203.

When the communication system A occupies the communication medium 101 again, the control terminal goes to the operation of step S1204 to transmit a coexistence header. On the other hand, when the communication system A does not occupy the communication medium 101 again, the control terminal returns to the head of LOOP32. Note that the LOOP32 process does not necessarily have to be completed within the beacon period indicated in LOOP31. When the LOOP32 process is not completed within the beacon period indicated in LOOP31, a terminal apparatus of the communication system A only fails to take the occupancy of the communication medium 101 from the communication system B again within the single beacon period. If a subsequent beacon period arrives, there is a possibility that a terminal apparatus of the communication system A can take the occupancy of the communication medium 101 from the communication system B again.

When the beacon period is completed, the communication control section 203 of the control terminal transmits a beacon again (step S1201) and executes the LOOP30 process. Thereafter, the LOOP30 process is repeated.

Figure 27:
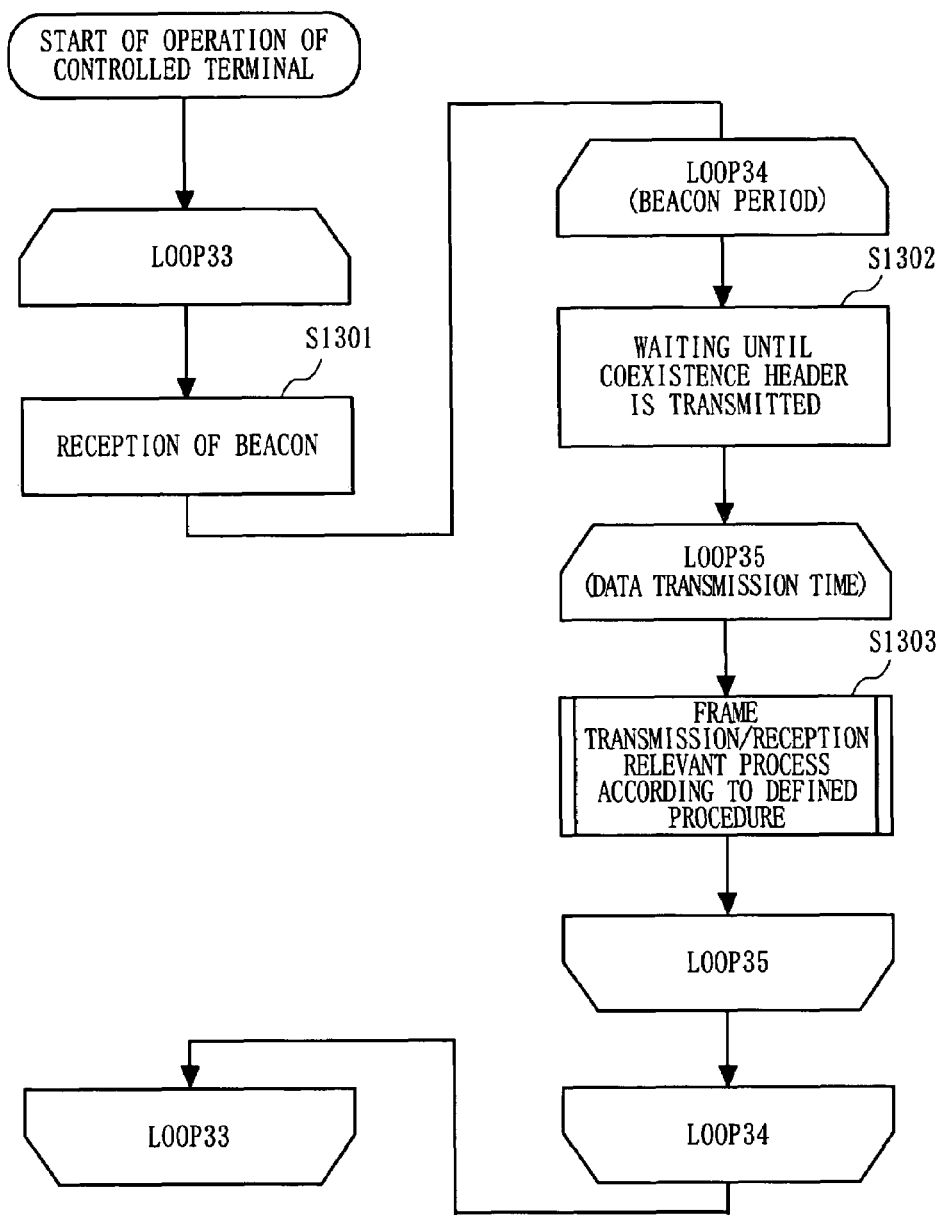
FIG. 27 is a flowchart showing an operation of a terminal apparatus functioning as a controlled terminal (the terminal apparatuses 112 and 113 in the example of FIG. 25)

FIG. 27 is a flowchart showing an operation of a terminal apparatus functioning as a controlled terminal (the terminal apparatuses 112 and 113 in the example of FIG. 25). Hereinafter, the operation of the terminal apparatus functioning as a controlled terminal will be described with reference to FIG. 27. Note that details of operation termination and frame transmission/reception and the like of the controlled terminal, which are not related to the communication procedure of FIG. 25, are omitted in FIG. 27.

When the operation of the controlled terminal is started, the controlled terminal starts a loop for receiving a beacon (loop name: LOOP33). It is herein assumed that there is no termination condition for LOOP33. In fact, a certain termination condition is provided. Nevertheless, for the sake of brevity of the description of the operation of the present invention, it is assumed that no termination condition is provided for LOOP33.

In LOOP33, the communication control section 203 of the controlled terminal receives the beacon received by the frame reception section 205 (step S1301). When receiving the beacon, the communication control section 203 of the controlled terminal starts a loop for waiting for transmission of a coexistence header (loop name: LOOP34). A termination condition for LOOP34 is whether or not a beacon period arrives. When the beacon period arrives, the LOOP34 process is ended.

In LOOP34, the communication control section 203 of the controlled terminal waits until a coexistence header is transmitted (step S1302). Thereafter, the controlled terminal goes to a LOOP35 process. In LOOP35, the communication control section 203 of the controlled terminal executes a process relating to frame transmission/reception in accordance with a defined procedure (step S1303). In LOOP35, the operation of step S1303 is repeated until a data transmission time is elapsed. Here, the data transmission time is a period from the time of transmission of the coexistence header by the control terminal until the time T12 is elapsed. In other words, the communication control section 203 of the controlled terminal repeats the operation of step S1303 until a time at which the next coexistence header is expected to be transmitted.

When the data transmission time is elapsed, the period in which the communication system B is suppressed from communication is expired. As a result, the controlled terminal returns to the operation of step S1302 and waits for transmission of a coexistence header again.

Thereafter, the controlled terminal repeats the operations of steps S1302 and S1303 until a beacon period is completed. When the beacon period is completed, the controlled terminal waits for reception of a beacon transmitted by the control terminal again (step S1301). During the beacon period, the controlled terminal executes the process indicated by LOOP34.

As described above, according to the sixth embodiment, the terminal apparatuses belonging to the communication system B are suppresses from transmission continuously for a maximum time by NAV information included in the header of the communication system B in a coexistence header. Therefore, an overhead occurring due to transmission of the preamble and header of the communication system B is maximally suppressed. Further, the NAV information is set to be a maximum value, thereby simplifying the apparatus structure. Furthermore, it can be optionally achieved that the control terminal does not transmit a coexistence header even when a time in which the terminal apparatuses belonging to the communication system B are suppressed from transmission by a coexistence header is expired. Thereby, a transmission opportunity is given to a terminal apparatus belonging to the communication system B. Furthermore, the control terminal can optionally suppress the terminal apparatuses belonging to the communication system B from transmission again to cause the communication system A to take a control again. Therefore, according to the sixth embodiment, a system is provided in which not only a communication system to be caused to coexist is suppressed from communication, but also the communication system to be caused to coexist is given a communication time while communication is secured for a communication system to which the control terminal belongs.

Note that even if the time in which the communication system B is suppressed from communication in step S1302 is expired, the control terminal does not necessarily transmit a coexistence header. In this case, the controlled terminal may wait until a coexistence header transmitted by the control terminal is received.

In the sixth embodiment, it is assumed that the controlled terminal of the communication system A also has a function of detecting the preamble and header of the communication system B. However, after the control terminal of the communication system A transmits a coexistence header, the controlled terminal belonging to the communication system A may be informed of occupancy of a communication medium using a frame of the communication system A. In this case, the controlled terminal of the communication system A does not have to have a function of detecting the preamble and header of the communication system B. This embodiment will be described in the following a seventh embodiment.

Seventh Embodiment

In the seventh embodiment, a functional structure of a terminal apparatus belonging to the communication system A is similar to that of the first embodiment, and therefore, FIG. 2 is referenced. However, an operation of each block is different from that of the first embodiment as described below. In the seventh embodiment, the terminal apparatus belonging to the communication system A may have the functional blocks of FIGS. 8 and 9.

Figure 28:
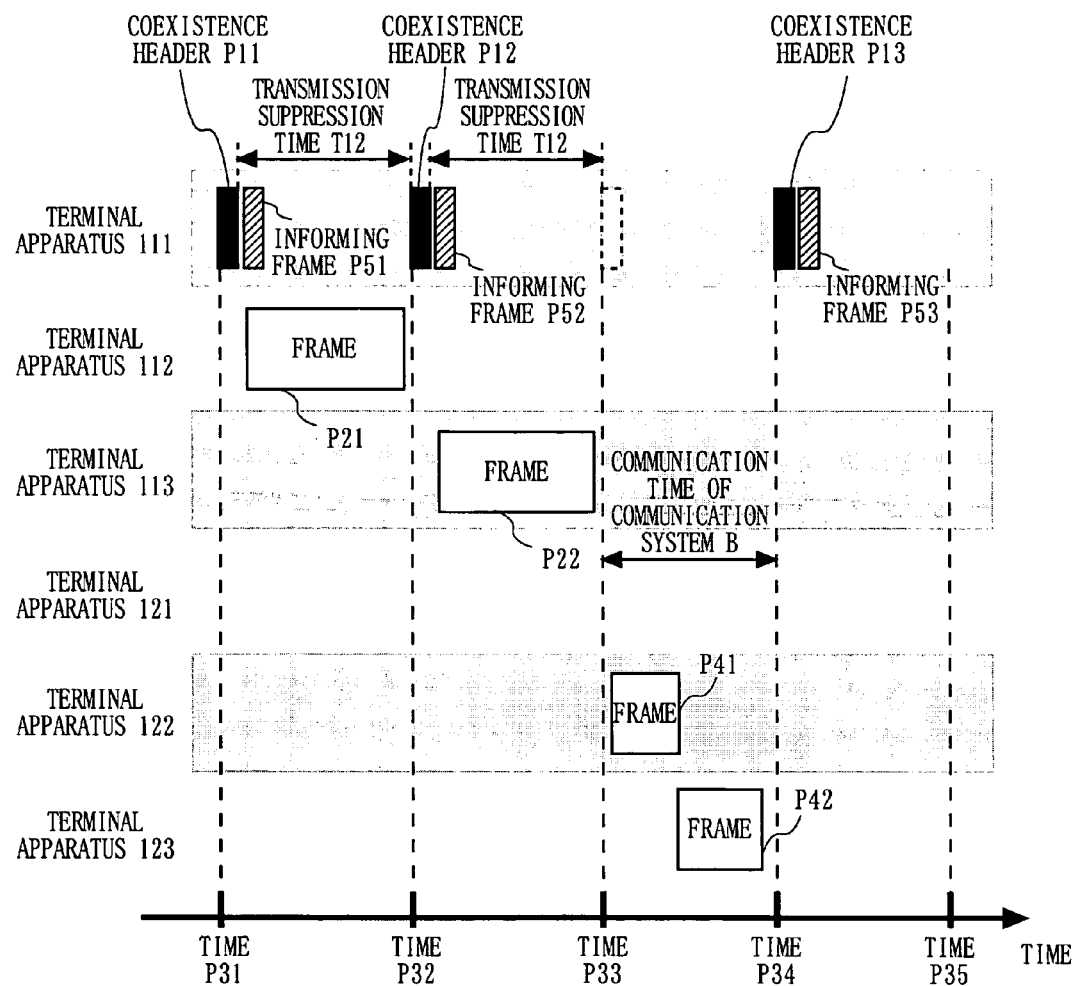
FIG. 28 is a timing chart showing an example of how a terminal apparatus of a seventh embodiment accesses the communication medium 101.

FIG. 28 is a timing chart showing an example of how the terminal apparatus of the seventh embodiment accesses the communication medium 101.

In the sixth embodiment, of the terminal apparatuses 111, 112 and 113 belonging to the communication system A, the terminal apparatus 111 is assumed to be a control terminal.

The coexistence header transmission section 207 of the control terminal has a function of transmitting the preamble of the communication system B and the header of the communication system B including NAV information as a coexistence header. The frame reception section 205 of the control terminal has a function of receiving the preamble and header of the communication system B. The communication control section 203 of the control terminal has a function of analyzing the preamble and header of the communication system B received by the frame reception section 205 to extract the NAV information. The communication control section 203 of the control terminal causes the coexistence header generation section 206 to generate a coexistence header based on the NAV information included in the header of the communication system B in a manner such that the terminal apparatuses belonging to the communication system B are suppressed from transmission continuously for a time T12 at maximum, and causes the coexistence header transmission section 207 to transmit the coexistence header.

The terminal apparatuses 112 and 113 are controlled terminals which are controlled by the terminal apparatus 111. The frame reception section 205 of the controlled terminal has a function of detecting the preamble and header of the communication system B. The communication control section 203 of the controlled terminal has a function of determining whether or not the preamble and header of the communication system B detected by the frame reception section 205 has been transmitted by the control terminal. As a result, the communication control section 203 of the control terminal can determine whether or not the communication medium 101 is occupied by a terminal apparatus of the communication system B.

Hereinafter, a description will be given of how the terminal apparatus of the seventh embodiment accesses the communication medium 101 with reference to FIG. 28.

At time P31, the terminal apparatus 111 transmits a coexistence header P11. Here, the terminal apparatus 111 sets a time T12 which is a maximum value of NAV information to the header of the communication system B in the coexistence header P11. Thereby, the terminal apparatuses belonging to the communication system B are suppressed from frame transmission to a maximum extent. As a result, the terminal apparatuses belonging to the communication system B are suppressed from transmission until time P32 (for the time T12). The terminal apparatus 111 transmits an informing frame P51 to each terminal apparatus belonging to the communication system A to inform that the communication medium 101 is occupied until time P32.

Figure 29:
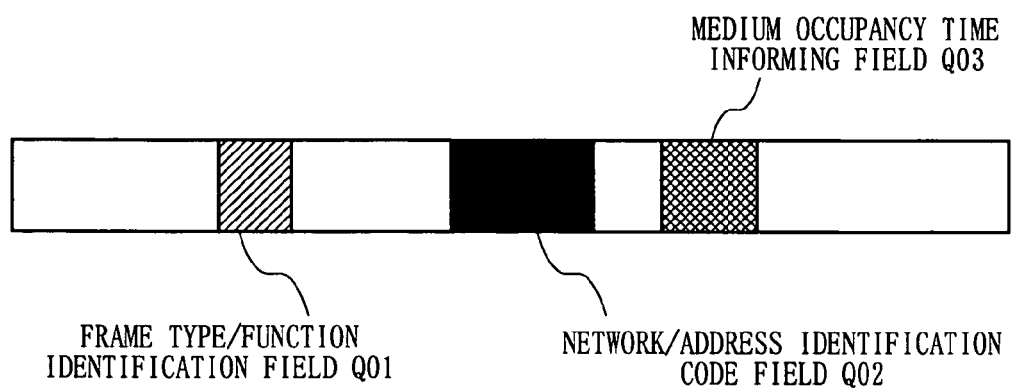
FIG. 29 is a diagram showing a format of an informing frame P51 for informing that the communication medium 101 is occupied.

FIG. 29 is a diagram showing a format of the informing frame P51 for informing that the communication medium 101 is occupied. Note that an informing frame which is transmitted after the informing frame P51 is assumed to have the format of FIG. 29. The informing frame includes a frame type/function identification code field Q01, a network/address identification code field Q02, and a medium occupancy time informing field Q03.

In the frame type/function identification code field Q01, a frame type defined in the communication system A and an identifier for identifying a function in a general-purpose frame are stored. Based on the frame type/function identification code field Q01, the controlled terminal which receives the informing frame can recognize that the informing frame means that a communication medium is occupied until a particular time.

In the network/address identification code field Q02, a value specific to a terminal apparatus, such as, characteristically, an MAC address of the control terminal, a value specific to a network to which the control terminal belongs, or the like, is stored. Based on the network/address identification code field Q02, the controlled terminal which receives the informing frame can know that a communication system to which the controlled terminal belongs occupies a communication medium. In a communication system based on the same scheme as that of the communication system A, i.e., when there is no different communication system capable of receiving an informing frame transmitted by the terminal apparatus 111, the field Q02 can be omitted.

The medium occupancy time informing field Q03 stores a time for which a communication medium is occupied by a communication system to which a control terminal belongs, information about a time at which an occupancy state is ended, or the like. Based on the medium occupancy time informing field Q03, the controlled terminal which receives an informing frame can know a time for which the communication system can occupy a communication medium. Note that, for example, when NAV information stored in the header of the communication system B is defined to be always constant as in this embodiment, the field Q03 can be omitted.

Thus, the informing frame contains information about a time for which frame transmission is suppressed in the communication system B to be suppressed.

A terminal apparatus of the communication system A which receives the informing frame P51 executes a medium access control in accordance with a procedure defined in the communication system A. As a result, in the example of FIG. 28, the terminal apparatus 112 is assumed to transmit a frame P21.

In the following time P32, the terminal apparatus 111 transmits the preamble of the communication system B and a header P12 storing NAV information having a maximum value (time T12) as a coexistence header again. By the coexistence header P12, the terminal apparatuses belonging to the communication system B are suppressed from transmission until time P33 (for the time T12). The terminal apparatus 111 transmits an informing frame P52 for informing the terminal apparatus of the communication system A of that the communication medium 101 is occupied until time P33.

Until time P33, the terminal apparatus of the communication system A executes a medium access control in accordance with a procedure defined in the communication system A. As a result, in the example of FIG. 28, the terminal apparatus 113 is assumed to transmit a frame P22.

At time P33, the terminal apparatuses belonging to the communication system B cannot be suppressed from transmission. Therefore, in order for the communication system A to continue to occupy the communication medium 101, the terminal apparatus 111 needs to transmit a coexistence header again. However, it is here assumed that the terminal apparatus 111 does not transmit a coexistence header, so that the communication medium 101 is given over to the communication system B.

As a result, the terminal apparatuses belonging to the communication system B can access the communication medium 101. In the example of FIG. 28, the terminal apparatuses 122 and 123 are assumed to succeed in transmitting frames P41 and P42, respectively.

The terminal apparatus 111 can receive the preamble and header of the communication system B. Therefore, the terminal apparatus 111 can monitor frames transmitted by the terminal apparatuses 122 and 123. After the frames transmitted by the terminal apparatuses 122 and 123 are ended, the terminal apparatus 111 transmits a coexistence header at time P34. Thereby, the communication system A acquires a right to occupy the communication medium 101. The terminal apparatus 111 transmits an informing frame P53 for informing a terminal apparatus of the communication system A of that the communication medium 101 is occupied until time P35. Thereafter, a similar process is repeated.

Figure 30:
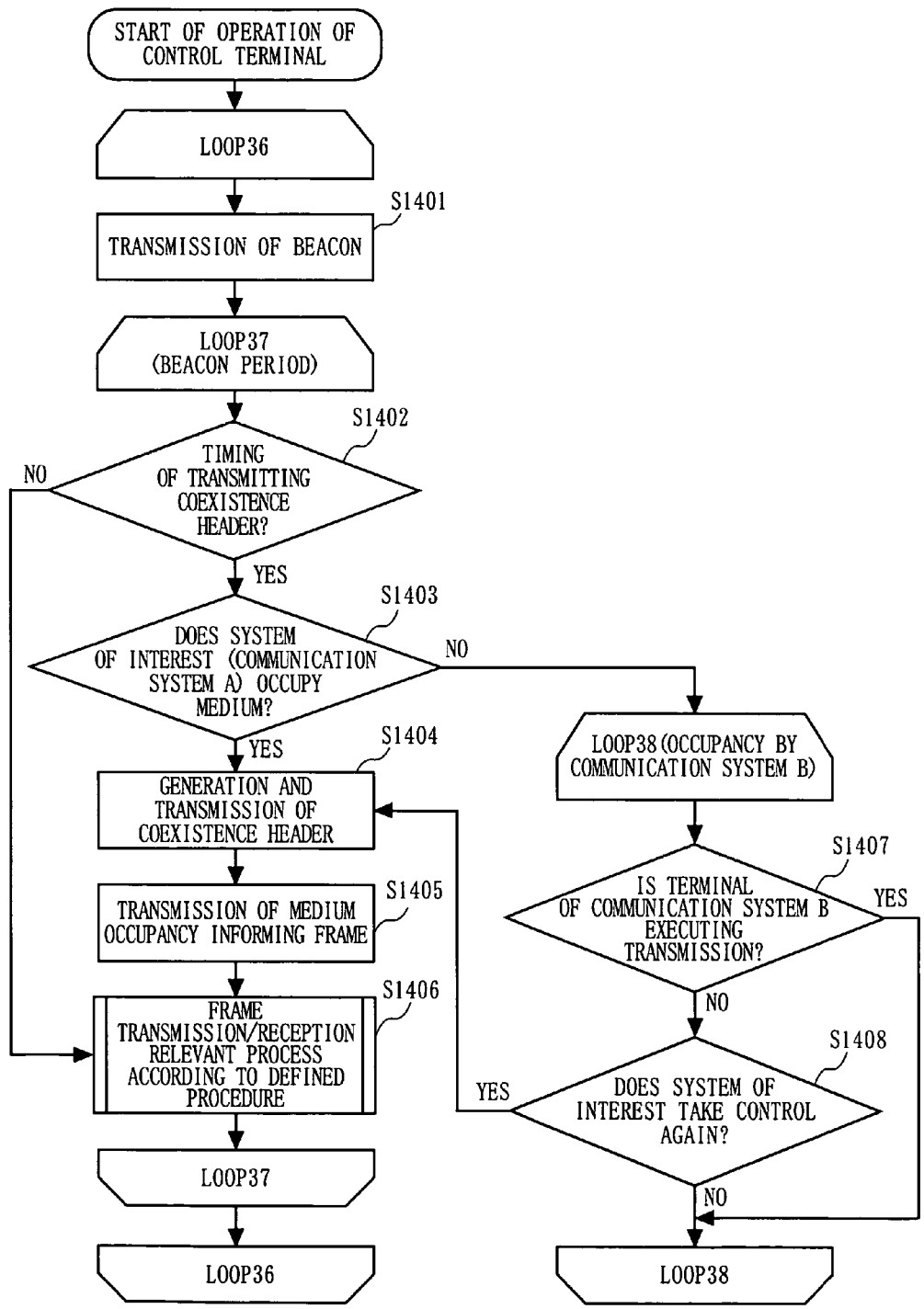
FIG. 30 is a flowchart showing an operation of a terminal apparatus functioning as a control terminal (the terminal apparatus 111 in the example of FIG. 28)

FIG. 30 is a flowchart showing an operation of a terminal apparatus functioning as a control terminal (the terminal apparatus 111 in the example of FIG. 28). Hereinafter, the operation of the terminal apparatus functioning as a control terminal will be described with reference to FIG. 30. Note that details or the like of operation termination and frame transmission/reception of the control terminal, which are not related to the communication procedure of FIG. 28, are omitted in FIG. 30.

When the operation of the control terminal is started, the control terminal starts a loop for transmitting a beacon (loop name: LOOP36). It is herein assumed that there is no termination condition for LOOP36. In fact, a certain termination condition is provided. Nevertheless, for the sake of brevity of the description of the operation of the present invention, it is assumed that no termination condition is provided for LOOP36.

In LOOP36, the communication control section 203 of the control terminal causes the frame transmission section 202 to transmit a beacon (step S1401). After transmission of the beacon, the control terminal starts a loop for transmission of a frame and a coexistence header (loop name: LOOP37). A termination condition for LOOP37 is whether or not a beacon period arrives. When the beacon period arrives, the LOOP37 process is ended.

In LOOP37, the coexistence header transmission timing determination section 208 of the control terminal determines whether or not a timing of transmitting a coexistence header arrives (step S1402). When the timing of transmitting a coexistence header does not arrive, the communication control section 203 of the control terminal executes a process relating to frame transmission/reception in accordance with a defined procedure (step S1406) and returns to the LOOP37. On the other hand, when the timing of transmitting a coexistence header arrives, the communication control section 203 of the control terminal goes to an operation of step S1403. Note that the timing of transmitting a coexistence header includes a time which is immediately after transmission of a beacon and a time which is the time T12 after transmission of a coexistence header. Therefore, first determination in step S1402 which is performed immediately after transmission of a beacon is inevitably positive.

In step S1403, the communication control section 203 of the control terminal determines whether or not the communication system A should occupy the communication medium 101 (step S1403). When the communication system A should occupy the communication medium 101, the communication control section 203 of the control terminal causes the coexistence header generation section 206 to generate a coexistence header and causes the coexistence header transmission section 207 to transmit the coexistence header (step S1404), and goes to an operation of step S1405. The coexistence header transmitted in step S1404 is set to have a time T12 which is the maximum value of NAV information, and therefore, the terminal apparatuses belonging to the communication system B are suppressed from communication for the time T12.

In step S1405, the communication control section 203 of the control terminal generates an informing frame for informing the controlled terminal of that the communication medium is occupied and causes the frame transmission section 202 to transmit the informing frame. Thereafter, the control terminal executes a process relating to frame transmission/reception (step S1406) and returns to the head of LOOP37.

On the other hand, when the communication system A should not occupy the communication medium 101, the communication control section 203 of the control terminal starts a loop for determining whether or not the communication system A takes the occupancy of the communication medium 101 again from the communication system B (loop name: LOOP38).

In LOOP38, the communication control section 203 of the control terminal analyzes the preamble and header of the communication system B detected by the frame reception section 205 to determine whether or not a terminal apparatus of the communication system B is executing frame transmission (step S1407). When the terminal apparatus of the communication system B is executing frame transmission, the control terminal returns to the head of LOOP38. On the other hand, when the terminal apparatus of the communication system B is not executing frame transmission, the communication control section 203 of the control terminal determines whether or not the communication system A occupies the communication medium 101 again (step S1408). When the communication system A occupies the communication medium 101 again, the control terminal goes to the operation of step S1404 to transmit a coexistence header. On the other hand, when the communication system A does not occupy the communication medium 101 again, the control terminal returns to the head of LOOP38. Note that the LOOP38 process does not necessarily have to be completed within the beacon period indicated in LOOP37. When the LOOP38 process is not completed within the beacon period indicated in LOOP37, a terminal apparatus of the communication system A only fails to take the occupancy of the communication medium 101 from the communication system B again within the single beacon period. If a subsequent beacon period arrives, there is a possibility that a terminal apparatus of the communication system A can take the occupancy of the communication medium 101 from the communication system B again.

When the beacon period is completed, the communication control section 203 of the control terminal transmits a beacon again (step S1401) and executes the LOOP36 process. Thereafter, the LOOP36 process is repeated.

Figure 31:
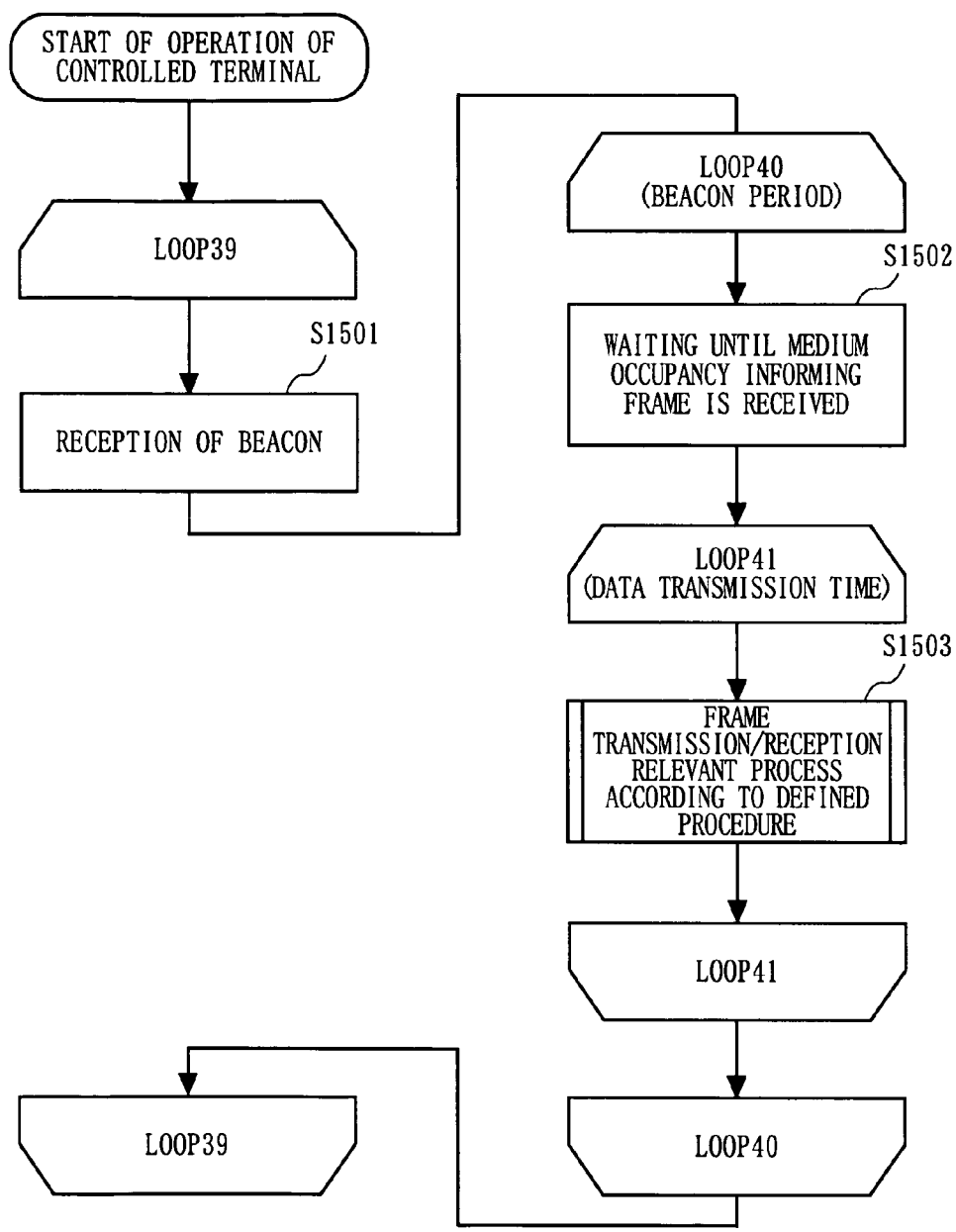
FIG. 31 is a flowchart showing an operation of a terminal apparatus functioning as a controlled terminal (the terminal apparatuses 112 and 113 in the example of FIG. 28)

FIG. 31 is a flowchart showing an operation of a terminal apparatus functioning as a controlled terminal (the terminal apparatuses 112 and 113 in the example of FIG. 28). Hereinafter, the operation of the terminal apparatus functioning as a controlled terminal will be described with reference to FIG. 31. Note that details or the like of operation termination and frame transmission/reception of the controlled terminal, which are not related to the communication procedure of FIG. 28, are omitted in FIG. 31.

When the operation of the controlled terminal is started, the controlled terminal starts a loop for receiving a beacon (loop name: LOOP39). It is herein assumed that there is no termination condition for LOOP39. In fact, a certain termination condition is provided. Nevertheless, for the sake of brevity of the description of the operation of the present invention, it is assumed that no termination condition is provided for LOOP39.

In LOOP39, the communication control section 203 of the controlled terminal receives the beacon received by the frame reception section 205 (step S1501). When receiving the beacon, the communication control section 203 of the controlled terminal starts a loop for waiting for transmission of a coexistence header (loop name: LOOP40). A termination condition for LOOP40 is whether or not a beacon period arrives. When the beacon period arrives, the LOOP40 process is ended.

In LOOP40, the communication control section 203 of the controlled terminal waits until reception of an informing frame indicating that the communication medium is occupied (step S1502). When receiving the informing frame, the controlled terminal starts a loop for transmitting a frame (loop name: LOOP41).

In LOOP41, the communication control section 203 of the controlled terminal executes a process relating to frame transmission/reception in accordance with a defined procedure (step S1503). In LOOP41, the operation of step S1503 is repeated until completion of a data transmission time. Here, the data transmission time is a period in which the communication system A occupies the communication medium 101 so that a terminal apparatus of the communication system A can transmit/receive a frame. The communication control section 203 of the controlled terminal recognizes a time for which the communication medium is occupied by a communication system to which the control terminal belongs or information about a time at which the occupancy is ended, with reference to the medium occupancy time informing field Q03 of the informing frame, resulting in recognition of the data transmission time.

When the data transmission time is ended, the communication control section 203 of the controlled terminal returns to the process of waiting for reception of an informing frame (step S1502). Thereafter, the controlled terminal repeats the processes of steps S1502 and S1503 until a beacon period is completed. When the beacon period is completed, the controlled terminal waits for reception of a beacon again (step S1501) and executes the LOOP40 process for a beacon period.

As described above, according to the seventh embodiment, a control terminal informs of a period for which a communication medium is occupied. Therefore, the controlled terminal can exist with other communication systems while securing required communication without a function of detecting the preamble and header of the communication system B. In addition, the seventh embodiment has an effect similar to that of the sixth embodiment.

Note that even if a period for which the communication system B is suppressed from communication is expired in step S1502, a control terminal does not necessarily transmit an informing frame. In this case, the controlled terminal may wait for reception of an informing frame.

Eighth Embodiment

In an eighth embodiment, a functional structure of a terminal apparatus belonging to the communication system A is similar to that of the first embodiment, and therefore, FIG. 2 is referenced. However, an operation of the terminal apparatus of the eighth embodiment is different from that of the first embodiment as described below.

Figure 32:
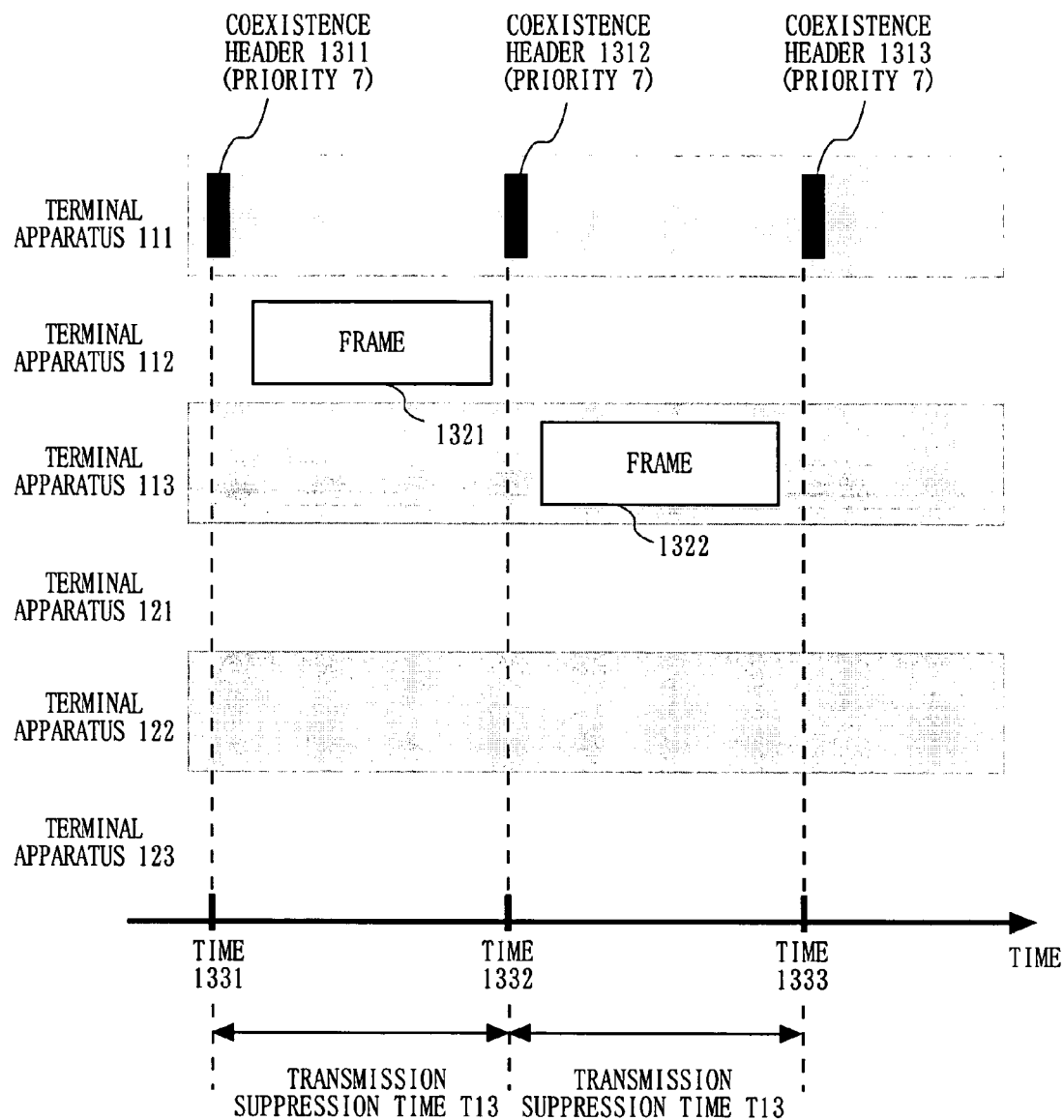
FIG. 32 is a timing chart showing an example of how a terminal apparatus of an eighth embodiment accesses the communication medium 101.

FIG. 32 is a timing chart showing an example of how the terminal apparatus of the eighth embodiment accesses the communication medium 101.

In the eighth embodiment, of the terminal apparatuses 111, 112 and 113 belonging to the communication system A, the terminal apparatus 111 is assumed to be a control terminal. The frame transmission section 202 of the control terminal has a function of transmitting the preamble of the communication system B and a header including priority information as a coexistence header. By transmitting the preamble and header of the communication system B, the terminal apparatus 111 can suppress a terminal apparatus belonging to the communication system B from transmission continuously for a time T13 at a maximum. An operational flow of the control terminal and a controlled terminal in the eighth embodiment is similar to those of any of the first to seventh embodiments.

A terminal apparatus belonging to the communication system B in the eighth embodiment is different from those of the other embodiments in that a medium access control is executed based on priority. Specifically, a terminal apparatus belonging to the communication system B describes 0-to-7 scale priority information in the header of a frame. It is assumed that 0 indicates the lowest priority, while 7 indicates the highest priority. When a terminal apparatus belonging to the communication system B detects a header in which a higher priority than that of a frame to be transmitted by itself is described, the terminal apparatus gives up frame transmission.

In the example of FIG. 32, it is assumed that the three terminal apparatuses 121, 122 and 123 belong to the communication system B. The priorities of frames to be transmitted by these terminal apparatuses are assumed to be 6, 4 and 5, respectively.

In order to suppress the above-described terminal apparatus belonging to the communication system B from transmission with high probability, it is effective to transmit a header having the highest priority. Therefore, the control terminal apparatus 111 of the communication system A transmits the preamble of the communication system B and a header having the highest priority 7 as a coexistence header 1311 at time 1331. As a result, the communication system B is suppressed from transmission of a frame having the priority 6 or less. In the example of FIG. 32, all priorities of frames to be transmitted are 6 or less in the communication system B. As a result, the communication system A can occupy the communication medium 101. A terminal apparatus of the communication system A executes a medium access control in accordance with a procedure defined in the communication system A to transmit a frame until time 1332 before which the communication system B is effectively suppressed from transmission. In FIG. 28, the terminal apparatus 112 transmits a frame 1321. Thereafter, in a similar manner, the communication system A can occupy the communication medium 101 with high probability.

As described above, according to the eighth embodiment, the priority of the preamble and header of the communication system B can be increased to the highest level by the terminal apparatus of the communication system A. Therefore, the terminal apparatus of the communication system A can suppress a terminal apparatus belonging to the communication system B from transmission with high probability.

Note that, in the eighth embodiment, the information of the timing of transmitting a coexistence header is not explained for the same of brevity. The transmission timing is assumed to be informed by any terminal apparatus by using a beacon or polling as in the first embodiment. In this case, all terminal apparatuses belonging to the communication system A do not have to have a function of receiving the preamble and header of the communication system B. At least one of the terminal apparatuses belonging to the communication system A may have a function of transmitting the preamble and header of the communication system B.

Also in the example of FIG. 32, it is assumed that transmission of the communication system A is ended within an interval in which a coexistence header is transmitted. However, as described in the fourth and the fifth embodiments, the terminal apparatus of the communication system A may suspend frame transmission and transmits a coexistence header containing the highest priority within an interval in which a coexistence header is transmitted. Also in this case, a similar effect is obtained, thereby additionally increasing the transfer efficiency.

Note that it is herein assumed that the larger the value, the higher the priority. Thus, a value indicating the highest priority is assumed to be 7. However, needless to say, a relationship between the level of a priority and the magnitude of a value indicating the priority, and a value indicating the highest priority may be different from what are described herein.

Ninth Embodiment

In a ninth embodiment, a terminal apparatus will be described which infers whether or not there is any other communication system, and switches a coexistence operation mode in which the terminal apparatus tries to coexist with another communication system and an independent operation mode in which coexistence with no other communication system is taken into account.

Figure 33:
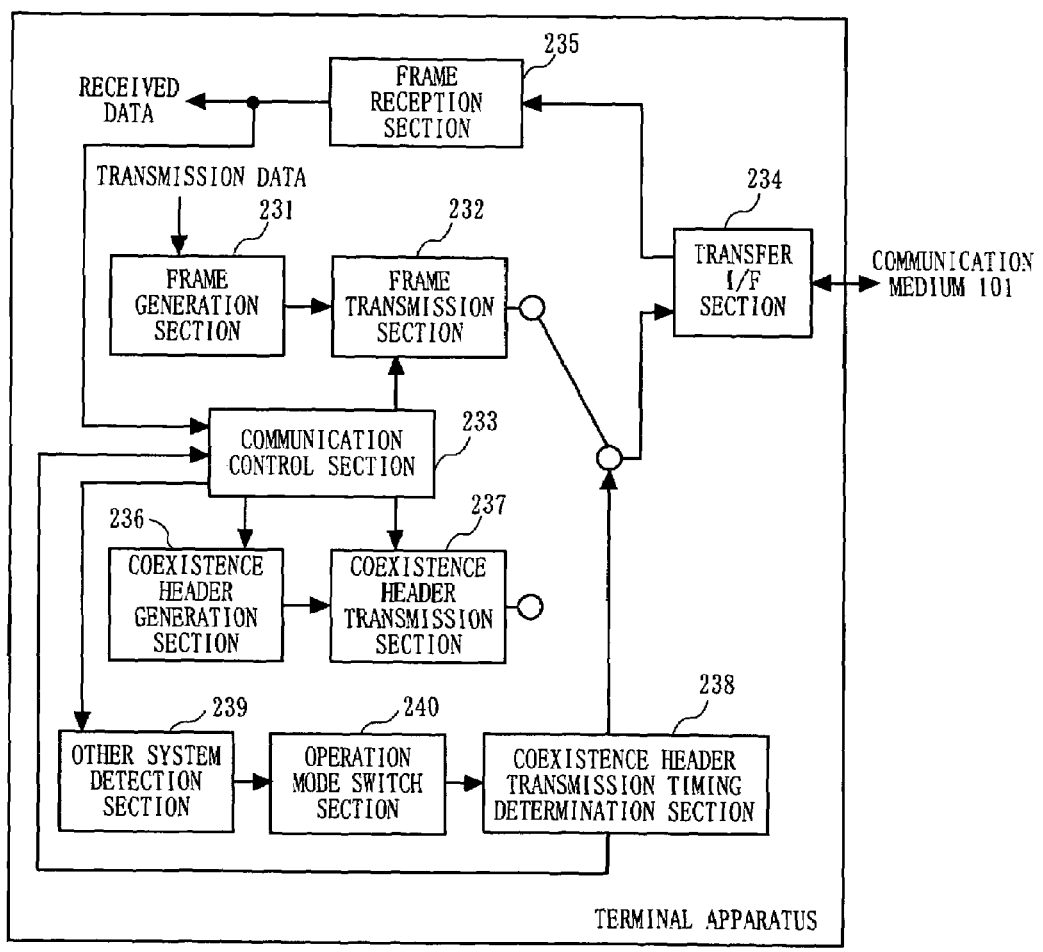
FIG. 33 is a block diagram showing a functional structure of terminal apparatuses 111, 112 and 113 belonging to the communication system A of a ninth embodiment.

FIG. 33 is a block diagram showing a functional structure of terminal apparatuses 111, 112 and 113 belonging to the communication system A of the ninth embodiment. Hereinafter, only the terminal apparatus 111 will be representatively described.

In FIG. 33, the terminal apparatus 111 comprises a frame generation section 231, a frame transmission section 232, a communication control section 233, a transfer I/F section 234, a frame reception section 235, a coexistence header generation section 236, a coexistence header transmission section 237, a coexistence header transmission timing determination section 238, an other system detection section 239, and an operation mode switch section 240.

The frame generation section 231 frames transmission data. The frame transmission section 232 transmits the frame obtained by the frame generation section 201 via the transfer I/F section 234 to the communication medium 101. The communication control section 233 determines a timing of transmitting the frame. The frame reception section 235 processes the frame received by the transfer I/F section 234 to extract received data.

Before frame transmission, the coexistence header generation section 236 generates the preamble and header of the communication system B as a coexistence header to suppress the terminal apparatuses belonging to the communication system B from transmission. In this case, the communication control section 233 informs the coexistence header generation section 236 of a time to transmit the frame. In response to this, the coexistence header generation section 236 determines a time for which the terminal apparatuses belonging to the communication system B are suppressed from transmission, and sets required information to the header of the communication system B in the coexistence header. The coexistence header generated by the coexistence header generation section 236 is transmitted to the coexistence header transmission section 237. The coexistence header transmission timing determination section 238 determines a timing of transmitting the coexistence header, and at the determined timing, switches between the frame transmission section 232 and the coexistence header transmission section 237. As a result, based on the determined timing, the transmission frame or the coexistence header is transferred to the transfer I/F section 234.

The other system detection section 239 obtains information about a communication situation from the communication control section 233, and based on the obtained information, detects whether or not there is any other communication system including the communication system B on the same communication medium. Here, the communication control section 233 transmits a data transmission rate, a frame error rate, a frame retransmission rate or the like, as the communication situation, to the other system detection section 239. For example, when the data transmission rate is decreased, the frame error rate is increased, or the frame retransmission rate is increased, the other system detection section 239 determines that there is another communication system, assuming that there is a frame collision with any other communication system. When determining that there is another communication system, the other system detection section 239 informs the operation mode switch section 240 of the determination result.

The operation mode switch section 240 is a block for switching the coexistence operation mode in which a terminal apparatus tries to coexist with another communication system and the independent operation mode in which coexistence with no other communication system is taken into account. When informed of the presence of another communication system from the other system detection section 239, the operation mode switch section 240 switches the operation mode from the independent operation mode to the coexistence operation mode.

The other system detection section 239 can infer that any other communication system which has existed before no longer exist, using a transmission rate, a frame error rate, a frame retransmission rate or the like, in a manner similar to when the presence of another communication system is inferred. For example, the other system detection section 239 determines that frame collision with any other communication system no longer exists and therefore any other communication system no longer exists, when a data transmission rate is increased or a frame retransmission rate is decreased. When it is determined that any other communication system no longer exists, the other system detection section 239 informs the operation mode switch section 240 of the determination result. In response to the information, the operation mode switch section 240 switches the operation mode from the coexistence operation mode to the independent operation mode.

When the coexistence operation mode is set, the coexistence header transmission timing determination section 238 determines a timing of transmitting a coexistence header. When the timing of transmitting a coexistence header arrives, the coexistence header transmission timing determination section 238 requests for the communication control section 233 to transmit a coexistence header. When the independent operation mode is set, the coexistence header transmission timing determination section 238 does not determine a timing of transmitting a coexistence header and is controlled so that only a frame output from the frame transmission section 232 is transmitted via the transfer I/F section 234 to the communication medium 101.

In the ninth embodiment, a procedure of transmitting a coexistence header according to any of the first to eighth embodiments is used.

As described above, according to the ninth embodiment, only when there is another communication system, a coexistence header is transmitted. Therefore, transfer efficiency when there is no other communication system is increased.

In the ninth embodiment, the other system detection section 239 infers whether or not there is any other communication system, based on information from the communication control section 233. The inference may be achieved by using other methods. For example, when the terminal apparatus of the communication system A has a function of detecting or receiving the whole or a part of a frame of another communication system, the other system detection section 239 may detect the presence of the other communication system using the function. Also, when another communication system uses a frequency band which is not used by the communication system A, the terminal apparatus of the communication system A may comprise an external frequency band carrier detection section for carrier detection of a frequency band which is used only by another communication system. In this case, the other system detection section 239 may infer the presence of another communication system based on a result of detection by the external frequency band carrier detection section. Further, the other system detection section 239 may execute carrier detection in a time for which the communication system A does not perform communication, and based on a result of the carrier detection, may infer the presence of another communication system.

In the ninth embodiment, a communication network is provided with a plurality of different communication system, i.e., the communication systems A and B. However, three or more different communication systems may be provided. When there are two or more communication system to be suppressed from frame transmission, a control terminal may transmit a coexistence header to each communication system to be suppressed to suppress the communication system from frame transmission. In this case, a timing of transmitting a coexistence header may be specified in a beacon or may be previously defined. A controlled terminal recognizes a timing of transmitting a coexistence header based on the beacon or the definition. When the timing of transmitting a coexistence header arrives during frame transmission, a control terminal and a controlled terminal suspend the frame transmission. Thereafter, when transmission of the coexistence header is ended, the control terminal and the controlled terminal may resume frame transmission.

As described above, according to the embodiment of the present invention, a communication system to be suppressed can be caused to be in a busy state for a certain time. As a result, a terminal apparatus of the communication system A does not need to transmit a low-speed preamble or header which is used in a communication system to be suppressed every packet transmission. Therefore, a temporal proportion of a communication medium occupied by a preamble and a header required for coexistence is reduced. Particularly, when a short packet, such as a VoIP, is transmitted or the same terminal apparatuses transmit a plurality of packets continuously, the effect of the present invention is significant.

Figure 34:
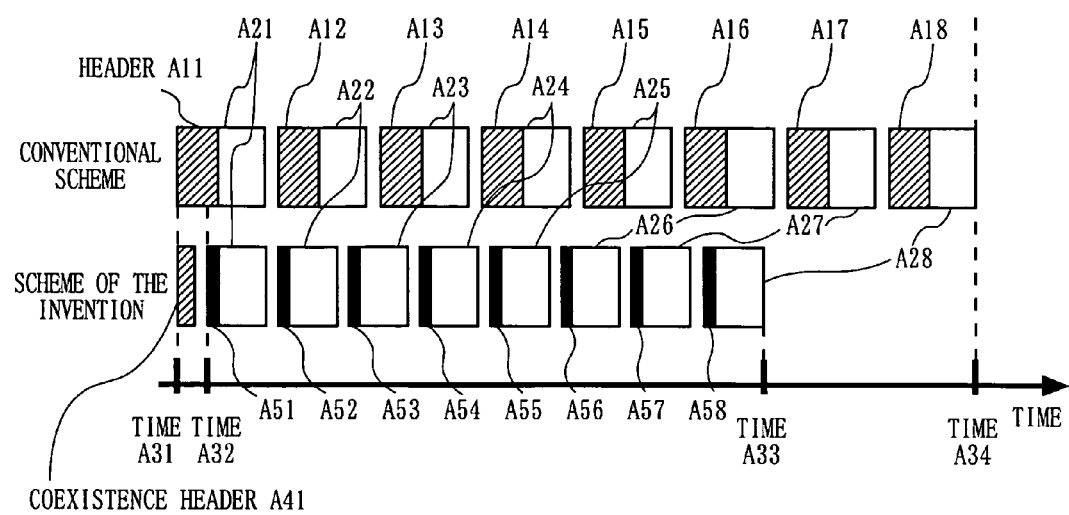
FIG. 34 is a diagram for comparing a time for which a communication medium is occupied by the conventional technique IEEE802.11 and a time for which a communication medium is occupied by the embodiment of the present invention when the same terminal apparatuses transmit a plurality of packets continuously.

FIG. 34 is a diagram for comparing a time for which a communication medium is occupied by the conventional technique IEEE802.11 and a time for which a communication medium is occupied by the embodiment of the present invention when the same terminal apparatuses transmit a plurality of packets continuously.

Figure 39:
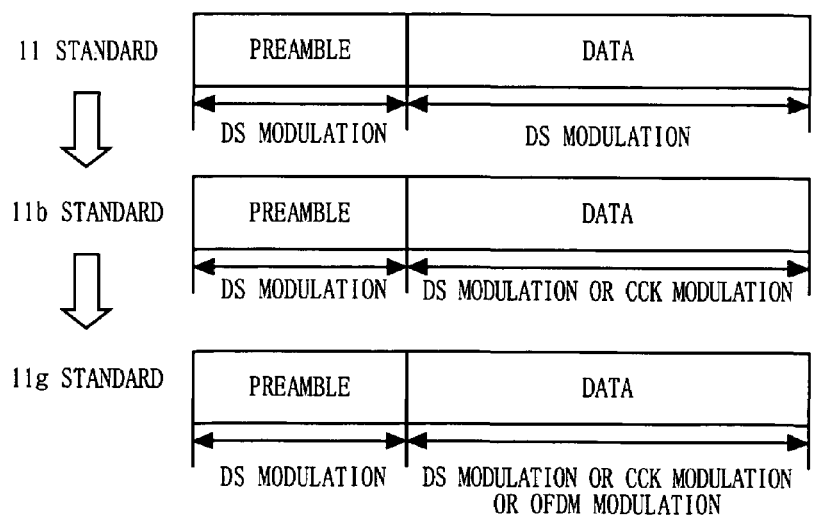
FIG. 39 is a diagram showing packet structures of IEEE802.11, 802.11b, and 802.11g.
Figure 40:
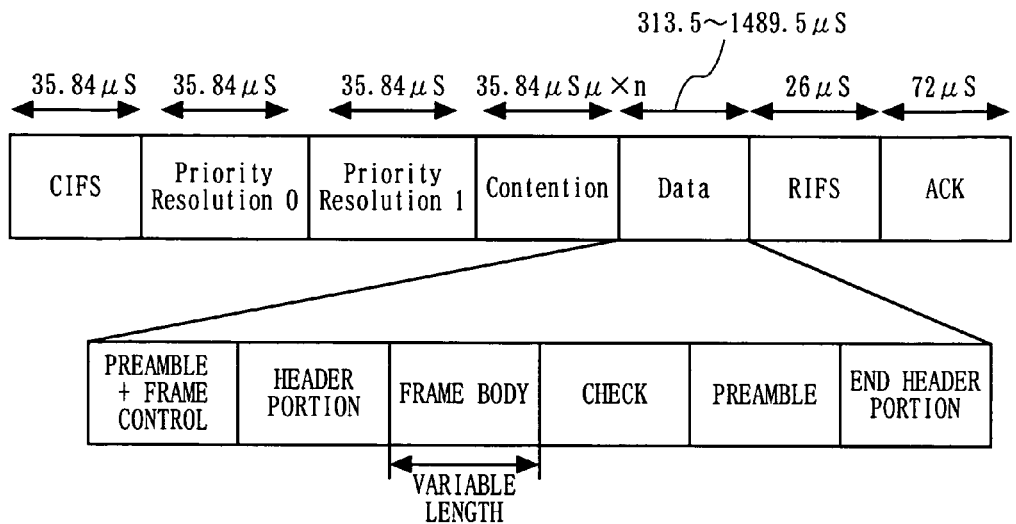
FIG. 40 is a diagram showing a frame structure and a protocol of HomePlug 1.0.
Figure 41:
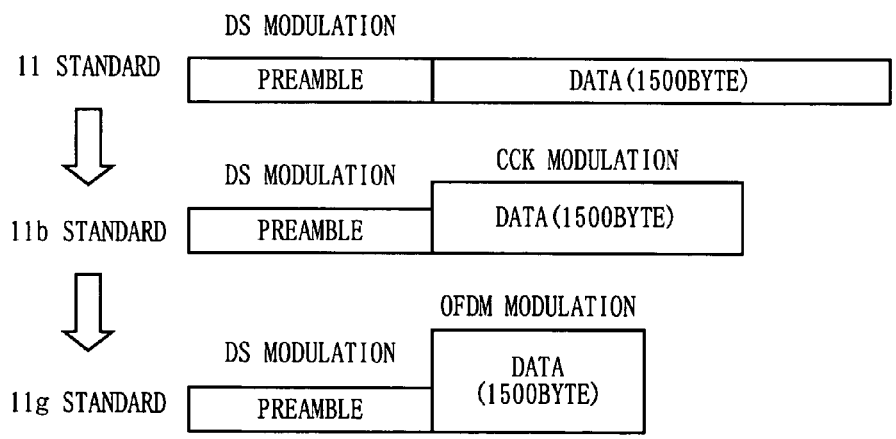
FIG. 41 is a diagram for explaining that a time occupied by a preamble portion and a header portion is relatively elongated.

In the case of the conventional scheme, a terminal apparatus which wants to execute data transmission transmits a header A11 at time A31 before data transmission. Note that, as shown in FIG. 39, in the conventional scheme, a header is produced by the same modulation scheme and in the same format as a header to be caused to coexist of an old scheme. Therefore, the header in the conventional scheme is slow. The terminal apparatus which wants to execute data transmission transmits a main portion A21 of data to be transmitted after transmission of the header. When the main data portion A21 is completed, the terminal apparatus transmits a header A12 and a following main data portion A22 again after a predetermined gap which is previously provided, taking a time required for a process by a transmission or reception terminal into consideration. Thereafter, the terminal apparatus repeats a similar process to transmit old-scheme headers A13 to A18 before main data portions A23 to A28, respectively, thereby transmitting frames continuously. It is assumed that transmission of the main data portion A28 is ended at time A34.

In contrast, in the case of the scheme of the present invention, a terminal apparatus which wants to execute data transmission transmits a coexistence header A41 at time A31 before data communication. In the present invention, the coexistence header is a header in a scheme of a communication system to be suppressed. Therefore, in general, the header is considered to be longer than a header in a scheme of the communication system which wants to execute data transmission. The terminal apparatus which transmits a coexistence header A31 transmits a header A51 and a following main data portion A21 in the scheme of the communication system which wants to execute data transmission after a predetermined gap which is previously provided, taking a time required for a process by a transmission or reception terminal into consideration. Thereafter, the terminal apparatus of the present invention repeats a gap process and transmission of a header and a main data portion of the scheme of the communication system which wants to execute data transmission. As a result, the terminal apparatus of the present invention transmits headers A52 to A58 before main data portions A22 to A28, respectively, thereby frames continuously. It is assumed that transmission of the main data portion A28 is ended at time A33.

As described above, in the communication terminal of the present invention, it is not necessary to transmit an old-scheme header a number of times. Therefore, according to the scheme of the present invention, it is possible to transmit the same data quickly as compared to the conventional scheme. In the example of FIG. 34, a reduction in time corresponds to a time required for transmission of 8 frames (a time between time A34 and time A33).

Note that the above-described embodiments can be each implemented by causing a CPU to execute a program capable of causing a CPU to execute the above-described procedure stored in a storage device (a ROM, a RAM, a hard disk, etc.). In this case, the program may be stored into the storage device via a recording medium before execution, or may be executed directly from the recording medium. As used herein, the recording medium refers to a semiconductor memory, such as a ROM, a RAM, a flash memory or the like, a magnetic disk memory, such as a flexible disk, a hard disk or the like, an optical disc, such as a CD-ROM, a DVD, a BD or the like, a recording medium, such as a memory card or the like. As used herein, the recording medium is a concept including a communication medium, such as a telephone line, a transfer line or the like.

Note that the functional blocks of FIGS. 2, 8, 9 and 33 may be implemented as an integrated circuit (LSI). The functional blocks may be mounted on one chip, or a part or the whole of the functional blocks may be mounted on one chip. As used herein, LSI may be called IC, system LSI, super LSI or ultra LSI, depending on the packaging density. The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used. Furthermore, if an integrated circuit technology which replaces LSI is developed by an advance in the semiconductor technology or other technologies derived therefrom, the functional blocks may be packaged using such a technology. A biotechnology may be applicable.

Figure 35:
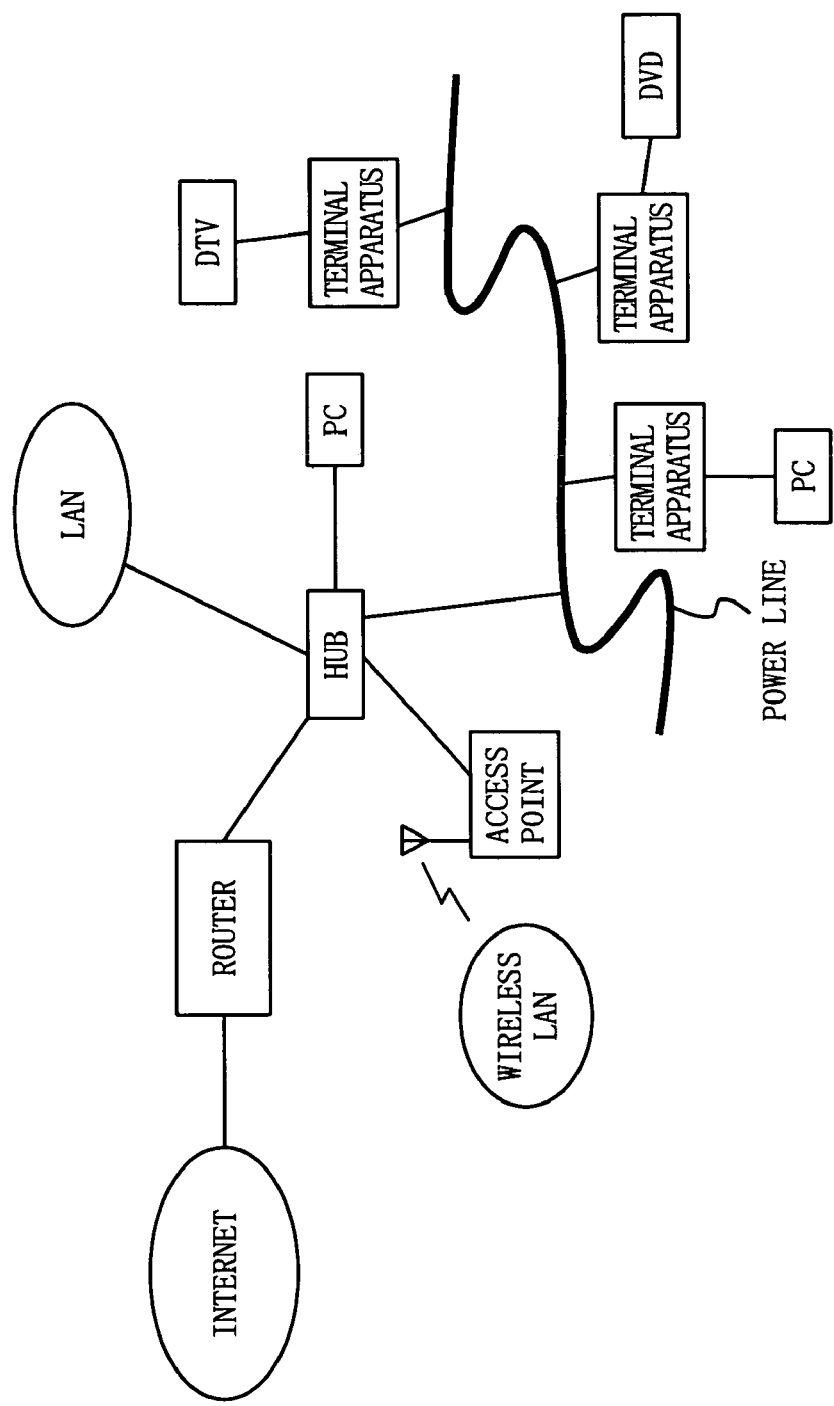
FIG. 35 is a diagram showing a whole structure of a system in which a terminal apparatus of the present invention is applied to high-speed power line transmission.
Figure 36:
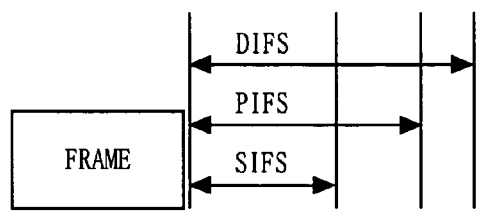
FIG. 36 is a diagram for explaining a control of priority using IFS.
Figure 37:
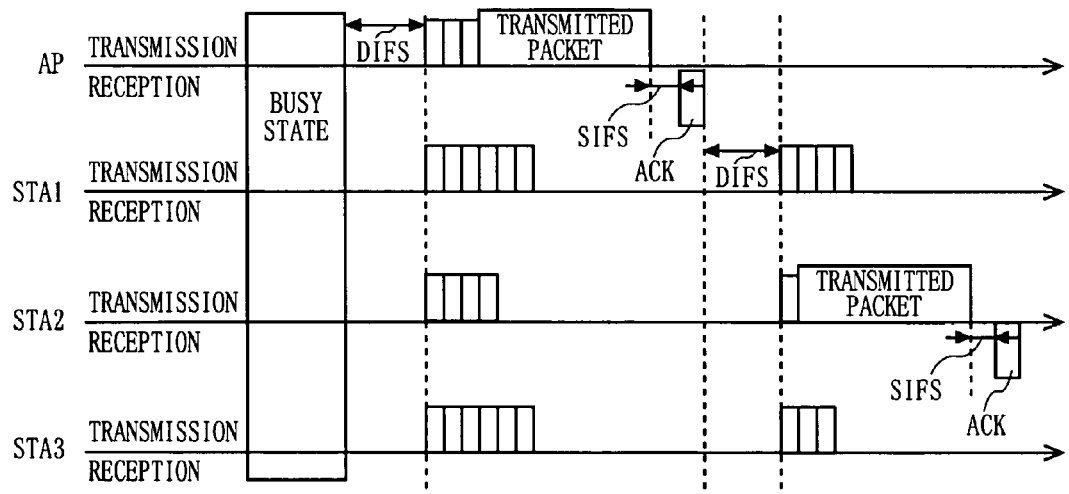
FIG. 37 is a diagram for explaining an access control method using a conventional CSMA/CA scheme.
Figure 38:
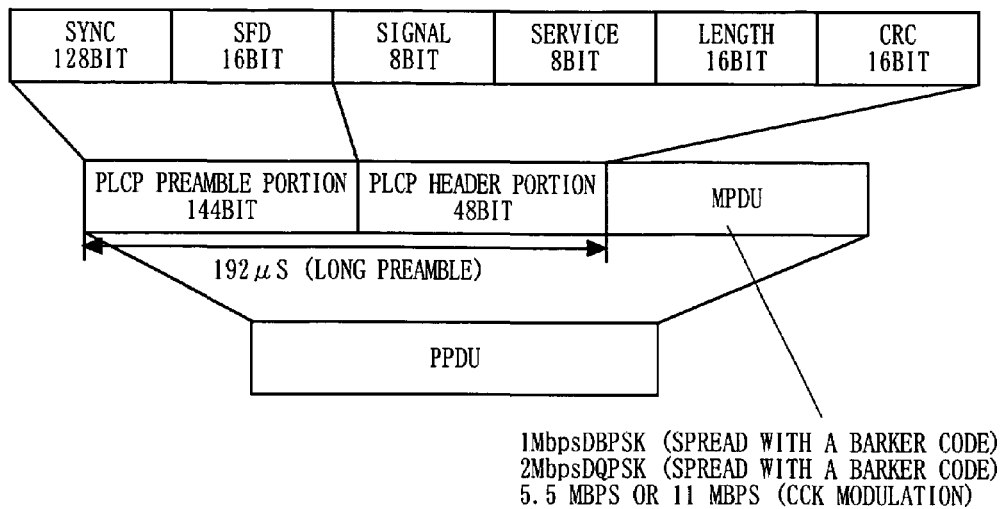
FIG. 38 is a diagram showing a packet structure of the conventional IEEE802.11b.

Hereinafter, an example in which the above-described embodiment is applied to an actual network system will be described. FIG. 35 is a diagram showing a whole structure of a system in which a terminal apparatus of the present invention is applied to high-speed power line transmission. As shown in FIG. 35, the terminal apparatus of the present invention provides an interface between a multimedia apparatus (e.g., a digital television (DTV), a personal computer (PC), a DVD recorder, etc.) and a power line. An interface between the multimedia apparatus and the terminal of the present invention may be an IEEE1394 interface, a USB interface, an Ethernet (R) interface or the like. With such a structure, a communication network system which transmits digital data, such as multimedia data or the like, via a power line with high speed, is constructed. As a result, a power line which is already provided in home, offices and the like can be used as a network line without newly introducing a network cable, such as a conventional wired LAN. Therefore, the present invention is considerably useful in terms of cost and simplicity of installation.

In the embodiment of FIG. 35, the terminal apparatus of the present invention serves as an adaptor which converts a signal interface of an existing multimedia apparatus to an interface of power line communication. The terminal apparatus of the present invention may be incorporated into a multimedia apparatus, such as a personal computer, a DVD recorder, a digital television, a home server system or the like. Thereby, data transfer between apparatuses can be achieved via a power source cable of the multimedia apparatus. In this case, a line for connecting the adaptor and the power line, an IEEE1394 cable, a USB cable, and an Ethernet(R) cable are not required, thereby simplifying wiring.

Also, a communication network system which uses a power line can be connected via a rooter and/or a hub to the Internet, a wireless LAN, and a conventional wired cable LAN, thereby extending a LAN system in which the communication network system of the present invention is used without any problem.

Communication data transferred via a power line may be intercepted by an apparatus directly connected to the power line, but is free from an eavesdrop problem with wireless LAN. Therefore, the power line transmission scheme is effective in terms of security. Further, data transferred on a power line may be protected by IPSec of an IP protocol, encryption of the contents themselves, other DRM schemes, or the like.

As the high-speed power line communication technology is advanced in the future, an old-scheme terminal apparatus and a new-scheme terminal apparatus are concurrently connected to a common power line. In such a case, if the feature of the present invention is introduced into the new-scheme terminal apparatus, the old-scheme terminal apparatus and the new-scheme terminal apparatus can exist on the common power line.

According to the terminal apparatus of the present invention, a plurality of different communication systems can coexist on the same communication medium. The terminal apparatus of the present invention can be used in wireless communication, power line communication and the like.

While the invention has been described in detail, the foregoing description is in all aspects illustrative and not restrictive. It is understood that numerous other modifications and variations can be devised without departing from the scope of the invention.

What is claimed is:

1. A terminal apparatus connectable to a communication network comprising a plurality of different communication systems, said terminal apparatus comprising:
   a coexistence header generation section for generating at least a portion of a head portion of a frame used in a communication system to be suppressed from frame transmission, as a coexistence header;
   a coexistence header transmission section for transmitting the coexistence header generated by the coexistence header generation section in a manner which enables a different terminal apparatus, which belongs to the to-be-suppressed communication system, to receive the coexistence header;
   a coexistence header transmission timing determination section for determining a timing of transmitting the coexistence header; and
   a communication control section for causing the coexistence header transmission section to transmit the coexistence header generated by the coexistence header generation section at the timing determined by the coexistence header transmission timing determination section.

2. The terminal apparatus according to claim 1, wherein:
   of the plurality of communication systems, in a communication system to which said terminal apparatus belongs, an access to a communication medium on the communication network is controlled in accordance with a control frame;
   information about the timing of transmitting the coexistence header is described in the control frame; and
   the coexistence header transmission timing determination section determines the timing of transmitting the coexistence header in accordance with the information described in the control frame.

3. The terminal apparatus according to claim 1, wherein:
   of the plurality of communication systems, in a communication system to which said terminal apparatus belongs, an access to a communication medium on the communication network is controlled in accordance with a control frame; and
      the coexistence header transmission timing determination section determines the timing of transmitting the coexistence header in a period in which the control frame is transmitted, in accordance with a predetermined rule.

4. The terminal apparatus according to claim 1, wherein the coexistence header generation section causes the coexistence header to include network allocation vector information indicating a time for which the communication system to be suppressed is used.

5. The terminal apparatus according to claim 4, wherein the coexistence header transmission timing determination section determines that a timing of transmitting a next coexistence header arrives within a network use time, based on the network allocation vector information included in the coexistence header.

6. The terminal apparatus according to claim 4, wherein the network allocation vector information is a maximum value.

7. The terminal apparatus according to claim 1, further comprising:
a frame transmission section for framing data to be transmitted and transmitting the framed data,
wherein the communication control section controls frame transmission by the frame transmission section, and when the timing of transmitting the coexistence header determined by the coexistence header transmission timing determination section arrives during the frame transmission by the frame transmission section, causes the frame transmission section to suspend the frame transmission and causes the coexistence header transmission section to transmit the coexistence header, and when the transmission of the coexistence header is completed, causes the frame transmission section to resume the frame transmission.

8. The terminal apparatus according to claim 1, wherein the communication control section gives the communication system to be suppressed an opportunity of frame transmission by causing the coexistence header transmission section not to transmit the coexistence header.

9. The terminal apparatus according to claim 8, wherein the communication control section causes the coexistence header transmission section to transmit the coexistence header if the communication control section suppresses the frame transmission again after the communication control section gives an opportunity of the frame transmission to the communication system.

10. The terminal apparatus according to claim 1, said terminal apparatus further comprising:
a frame transmission section for transmitting a frame to another terminal apparatus on a communication system to which both said terminal apparatus and the other terminal apparatus belong, in accordance with an instruction of the communication control section,
wherein the communication control section causes the frame transmission section to transmit an informing frame containing information about a time for which frame transmission is suppressed in the communication system to be suppressed.

11. The terminal apparatus according to claim 1, wherein:
in the communication system to be suppressed, a priority is set in a frame to be transmitted; and
the coexistence header generation section sets in the coexistence header a highest priority in the communication system to be suppressed.

12. The terminal apparatus according to claim 1, said terminal apparatus further comprising:
an other-system detection section for detecting the presence of another communication system; and
an operation mode switch section for switching said terminal apparatus to a coexistence operation mode in which, when the other-system detection section detects the other communication system, another terminal apparatus, which belongs to the communication system to be suppressed, is suppressed from frame transmission, where the other communication system is the communication system to be suppressed, and switching said terminal apparatus to an independent operation mode in which, when the other-system detection section detects no other communication system, the other terminal apparatus is not suppressed from frame transmission,
wherein the communication control section executes transmission of the coexistence header only in the coexistence operation mode.

13. The terminal apparatus according to claim 1, further comprising:
a coexistence header storage section for storing a definite number of coexistence headers,
wherein the coexistence header generation section generates the coexistence header with reference to the coexistence header storage section.

14. The terminal apparatus according to claim 13, wherein the coexistence header storage section stores only one coexistence header.

15. The terminal apparatus according to claim 1, wherein the coexistence header is at least one of a preamble and a header of the frame in the communication system to be suppressed.

16. The terminal apparatus according to claim 1, wherein:
in the communication system to be suppressed, a priority is set in a frame to be received; and
the coexistence header generation section sets in the coexistence header a highest priority in the communication system to be suppressed.

17. A communication network comprising:
a control terminal apparatus and a controlled terminal apparatus;
said control terminal apparatus comprising:
a coexistence header generation section for generating at least a portion of a head portion of a frame used in a communication system to be suppressed from frame transmission, as a coexistence header;
a coexistence header transmission section for transmitting the coexistence header generated by the coexistence header generation section in a manner which enables the controlled terminal apparatus, which belongs to the to-be-suppressed communication system, to receive the coexistence header;
a coexistence header transmission timing determination section for determining a timing of transmitting the coexistence header; and
a communication control section for causing the coexistence header transmission section to transmit the coexistence header generated by the coexistence header generation section at the timing determined by the coexistence header transmission timing determination section; and
said controlled terminal apparatus comprising:
a frame transmission section for framing data to be transmitted and transmitting the framed data; and
a communication control section for controlling the frame transmission by the frame transmission section,
wherein the communication control section causes the frame transmission section to suspend the frame transmission when the coexistence header transmitted by the control terminal arrives during the frame transmission by the frame transmission section, and when transmission of the coexistence header is completed, causes the frame transmission section to resume the frame transmission.

18. The communication network according to claim 17, wherein the controlled terminal previously recognizes the timing of transmitting the coexistence header based on information described in a control frame.

19. The communication network according to claim 17, wherein the controlled terminal previously recognizes the timing of transmitting the coexistence header based on a predetermined rule.

20. A method for causing a plurality of different communication systems to coexist on a common communication medium, comprising:

generating at least a portion of a head portion of a frame used in a communication system to be suppressed from frame transmission as a coexistence header;

transmitting the generated coexistence header in a manner which enables a terminal apparatus belonging to the to-be-suppressed communication system to receive the coexistence header;

determining a timing of transmitting the coexistence header; and controlling the transmitting of the generated coexistence header so as to cause the generated coexistence header to be transmitted at the determined timing.

21. An integrated circuit for use in a terminal apparatus connectable to a communication network capable of comprising a plurality of different communication systems, comprising:

a coexistence header generation section for generating at least a portion of a head portion of a frame used in a communication system to be suppressed from frame transmission, as a coexistence header;

a coexistence header transmission section for transmitting the coexistence header generated by the coexistence header generation section in a manner which enables a different terminal apparatus, which belongs to the communication system to be suppressed, to receive the coexistence header;

a coexistence header transmission timing determination section for determining a timing of transmitting the coexistence header; and a communication control section for causing the coexistence header transmission section to transmit the coexistence header generated by the coexistence header generation section at the timing determined by the coexistence header transmission timing determination section.

22. A program embodied on a computer-readable medium, for use with a terminal apparatus connectable to a communication network comprising a plurality of different communication systems, said program instructing:

a coexistence header generation section of the terminal apparatus to generate at least a portion of a head portion of a frame used in a communication system to be suppressed from frame transmission, as a coexistence header;

a coexistence header transmission section of the terminal apparatus to transmit the coexistence header generated by the coexistence header generation section in a manner which enables a different terminal apparatus, which belongs to the to-be-suppressed communication system, to receive the coexistence header;

a coexistence header transmission timing determination section of the terminal apparatus to determine a timing of transmitting the coexistence header; and a communication control section of the terminal apparatus to cause the coexistence header transmission section to transmit the coexistence header generated by the coexistence header generation section at the timing determined by the coexistence header transmission timing determination section.

* * * * *